US011257109B2

(12) United States Patent
Peterson et al.

(10) Patent No.: US 11,257,109 B2
(45) **Date of Patent: *Feb. 22, 2022**

(54) METHOD AND SYSTEM FOR LEAD BUDGET ALLOCATION AND OPTIMIZATION ON A MULTI-CHANNEL MULTI-MEDIA CAMPAIGN MANAGEMENT AND PAYMENT PLATFORM

(71) Applicant: Thryv, Inc., D/FW Airport, TX (US)

(72) Inventors: Stephanie Peterson, Oak Creek, CO (US); Or Yogev, Santa Monica, CA (US)

(*) Notice: Subject to any disclaimer, the term of this patent is extended or adjusted under 35 U.S.C. 154(b) by 13 days.

This patent is subject to a terminal disclaimer.

(21) Appl. No.: 16/857,643

(22) Filed: Apr. 24, 2020

(65) Prior Publication Data

US 2020/0342491 A1 Oct. 29, 2020

Related U.S. Application Data

(62) Division of application No. 16/119,888, filed on Aug. 31, 2018, now Pat. No. 10,685,376.

(Continued)

(51) Int. Cl.

*G06Q 30/02* (2012.01)
*G06Q 10/04* (2012.01)

(Continued)

(52) U.S. Cl.

CPC ....... *G06Q 30/0244* (2013.01); *G06F 16/283* (2019.01); *G06N 20/00* (2019.01);

(Continued)

(58) Field of Classification Search

CPC ..... G06Q 30/02–0277; G06Q 30/0273; G06Q 10/04; G06F 16/283; G06F 16/435; G06N 20/00

See application file for complete search history.

(56) References Cited

U.S. PATENT DOCUMENTS 8,818,839 B2 8/2014 Leff et al.
9,886,700 B1 2/2018 Allouche (Continued)

FOREIGN PATENT DOCUMENTS

WO 2016065153 A2 4/2016

OTHER PUBLICATIONS

Weinguo Liu "Online Advertisement Campaign Optimization" SOLI IEEE Conference Paper Published in: 2007 IEEE International Conference on Service Operations and Logistics, and Informatics (pp. 1-4) Publication Date: Aug. 1, 2007 Conference. (Year: 2007).*

(Continued)

*Primary Examiner* — Raquel Alvarez

(74) *Attorney, Agent, or Firm* — Greensfelder, Hemker & Gale, P.C.; Mark E. Stallion

(57) ABSTRACT

A method and apparatus for managing and integrating lead sources for a marketing/advertisement campaign on a platform that allocates and optimizes lead source budgets and provides a customer service and payment processing function. The present technology as disclosed and claimed herein provides a platform that is a customer retention and customer management system that is automated to provide lead estimations and optimizations to allocate and optimize lead source budgets where the system has a learning function that improves over time.

24 Claims, 99 Drawing Sheets

COMPLETE ESTIMATOR

Related U.S. Application Data

(60) Provisional application No. 62/673,672, filed on May 18, 2018.

(51) Int. Cl.
*G06N 20/00* (2019.01)
*G06F 16/28* (2019.01)

(52) U.S. Cl.
CPC ......... *G06Q 10/04* (2013.01); *G06Q 30/0242* (2013.01); *G06Q 30/0243* (2013.01); *G06Q 30/0273* (2013.01)

(56) References Cited

U.S. PATENT DOCUMENTS

| | | | |
|---|---|---|---|
| 9,904,930 | B2 | 2/2018 | Ogawa |
| 10,685,376 | B2 | 6/2020 | Peterson et al. |
| 2007/0245035 | A1 | 10/2007 | Rezaei et al. |
| 2011/0161159 | A1 | 6/2011 | Tekiela et al. |
| 2015/0254709 | A1 | 9/2015 | Carlyle et al. |
| 2016/0071117 | A1 | 3/2016 | Duncan |
| 2017/0358013 | A1 | 12/2017 | Vierra |

OTHER PUBLICATIONS

Ghosh et al, IP.Com "Going Viral: The Epidemiological Strategy of Referral Marketing" Aug. 11, 2018 (Year: 2018).*
International Searching Authority/U.S Patent and Trademark Office, International Search Report and Written Opinion from International Application No. PCT/US2019/031563, dated Jul. 22, 2019, 17 pages.

* cited by examiner

NEW CLIENT ESTIMATION MODEL EXAMPLE

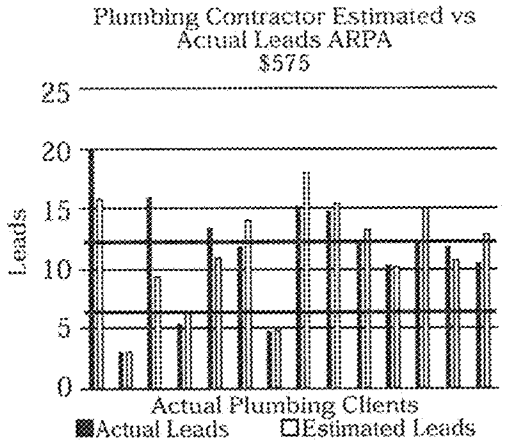

Regression Statistics

| | |
|---|---|
| Multiple R | 0.885254 |
| R Square | 0.783674 |
| Adjusted R Square | 0.648471 |
| Standard Error | 6.094158 |
| Observations | 14 |

ANOVA

| | df | SS | MS | F | Significance F |
|---|---|---|---|---|---|
| Regression | 5 | 1076.33 | 215.2659 | 5.79626 | 0.01487 |
| Residual | 8 | 297.1101 | 37.13876 | | |
| Total | 13 | 1373.44 | | | |

| | Coefficient S | Standard Error | t Stat | P-value | Lower 95% | Upper 95% | Lower 95.0% | Upper 95.0% |
|---|---|---|---|---|---|---|---|---|
| Intercept | 44.69237 | 6.469119 | 6.908573 | 0.000123 | 29.77456 | 59.61019 | 29.77456 | 59.61019 |
| GEO Index | 0.81552 | 2.025644 | 4.402598 | .0697787 | -5.48666 | 3.855622 | -5.48666 | 3.855622 |
| Avg Rating | -5.1291 | 2.004006 | -2.55942 | 0.033677 | -9.75034 | -0.50785 | -9.75034 | -0.50785 |
| Num ratings | 0.133503 | 0.337713 | 1.395314 | 0.702943 | -0.64527 | 0.912271 | -0.64527 | 0.912271 |
| Years in business | -0.44373 | 0.425006 | -2.05262 | 0.323268 | -1.42743 | 0.532696 | -1.42743 | 0.532696 |
| Organic clicks | -0.00799 | 0.050225 | -1.1591 | 0.877535 | -0.12391 | 0.107829 | -0.121381 | 0.107829 |

- Standard approach: Range 6-12- leads
  - Low estimate: 80% of clients achieve
  - High estimate: 50% of clients achieve
  - Total variance on test set from midpoint esimate: 54
- Client adjusted approach: Range 3-18 leads
  - Total variance on test set: 27
  - Reduced total variance by 50%

FIG. 5A

NEW CLIENT ESTIMATION MODEL EXAMPLE

- Standard approach: Range 6-12- leads
  - Low estimate: 80% of clients achieve
  - High estimate: 50% of clients achieve
  - Total variance on test set from midpoint estimate: 54
- Client adjusted approach: Range 3-18 leads
  - Total variance on test set: 27
  - Reduced total variance by 50%

NEW CLIENT ESTIMATION MODEL EXAMPLE

| Regression Statistics | |
|---|---|
| Multiple R | 0.885254 |
| R Square | 0.783674 |
| Adjusted R Square | 0.648471 |
| Standard Error | 6.094158 |
| Observations | 14 |

ANOVA

| | df | SS | MS | F | Significance F |
|---|---|---|---|---|---|
| Regression | 5 | 1076.33 | 215.2659 | 5.79626 | 0.01487 |
| Residual | 8 | 297.1101 | 37.13876 | | |
| Total | 13 | 1373.44 | | | |

| | Coefficients | Standard Error | t Stat | P-value | Lower 95% | Upper 95% | Lower 95.0% | Upper 95.0% |
|---|---|---|---|---|---|---|---|---|
| Intercept | 44.69237 | 6.469119 | 6.908572 | 0.000123 | 29.77456 | 59.61019 | 29.77456 | 59.61019 |
| CEO Index | 0.81552 | 2.025644 | 4.402598 | .0697787 | -5.48666 | 3.855622 | -5.48666 | 3.855622 |
| Avg Rating | -5.1291 | 2.004006 | -2.55942 | 0.033677 | -9.75034 | -0.50785 | -9.75034 | -0.50785 |
| Num ratings | 0.133503 | 0.337713 | 1.395314 | 0.702943 | -0.64527 | 0.912271 | -0.64527 | 0.912271 |
| Years in business | -0.44373 | 0.425006 | -2.05262 | 0.323268 | -1.42743 | 0.532696 | -1.42743 | 0.532696 |
| Organic clicks | -0.00799 | 0.050225 | -1.1591 | 0.877535 | -0.12381 | 0.107829 | -0.121381 | 0.107829 |

FIG. 5C

FIG. 11A
MAINTAIN
25 Leads
$1,000
GROW
44 Leads
$2,000
LEADER
61 Leads
$3,000
MAINTAIN: 25 Leads /Mo
25
13
Leads
ROI 5:1
$415
43%
Thryv Starter
Search engines
Extended Search Network
Print Campaign
Mobile Retargeting

Sales Force)

| Field Name | Data Type | Null? | Default Value | Direction/ Comments |
|---|---|---|---|---|
| BusinessName | STRING | N | | INPUT (From Sales Force) |
| Address | STRING | N | | INPUT (From Sales Force) |
| BusinessPhone | STRING | N | | INPUT (From Sales Force) |
| WebsiteURL | STRING | N | | INPUT (From Sales Force) |
| DexMasterRefID | STRING | N | | INPUT (From Dex) |
| ClientName | STRING | N | | INPUT (From Sales Force) |
| ClientID | STRING | N | | INPUT (From Sales Force) |
| ContactName | STRING | N | | INPUT (From Sales Force) |
| Email | STRING | N | | INPUT (From Sales Force) |
| OpportunityID | STRING | N | | INPUT (From Sales Force) |

FIG. 12

| Field Name | Data Type | Null? | Default Value | Direction/ Comments |
| --- | --- | --- | --- | --- |
| DexMasterRefID | STRING | N | | INPUT |
| ESS Content | COMPLEX | N | | OUTPUT / Complex Object that contains all of the data needed to display the top half of the ESS Listing. |
| Images | COMPLEX | N | | OUTPUT / An array of images associated with this listing that can also be used on the other channels. Will need an imageid, and url to image. |
| DexMasterRefID | STRING | N | | OUTPUT |

FIG. 13

| Field Name | Data Type | Null? | Default Value | Comments |
| --- | --- | --- | --- | --- |
| CategoryID | INT | N | | INPUT |
| Latitude | STRING | N | | INPUT |
| Longitude | STRING | N | | INPUT |
| Radius | INT | N | | INPUT Radius around Lat/ Long in KM |
| DexMasterRefID | STRING | N | | INPUT |
| EstimationID | STRING | N | | OUTPUT |
| DexMasterRefID | STRING | N | | OUTPUT |
| ExpirationDate | Date | N | | OUTPUT |
| PackageInfo (PI) | ARRAY OF OBJECTS | N | | OUTPUT / Described Below |
| PI.PackageID | STRING | N | | OUTPUT |
| PI.PackageName | STRING | N | | OUTPUT |
| PI.PackageCPM | DECIMAL | N | | OUTPUT |
| PI.PackageCPC | DECIMAL | N | | OUTPUT |
| PI.PackageCPL | DECIMAL | N | | OUTPUT |
| PI.PackageMin | INT | N | | OUTPUT / Minimum Budget |
| PI.PackageMax | INT | N | | OUTPUT / Maximum Budget |
| PI.PackageStart | INT | N | | OUTPUT / Starting Budget |

FIG. 14

| Field Name | Data Type | Null? | Default Value | Comments |
|---|---|---|---|---|
| DexMasterRefID | STRING | N | | INPUT |
| PackageID | STRING | N | | INPUT |
| Budget | INT | N | | INPUT |
| EstimationID | STRING | N | | INPUT |
| StartDate | DATE | N | | INPUT |
| OrderID | INT | N | | INPUT / iPromote Order ID |
| Latitude | STRING | N | | INPUT |
| Longitude | STRING | N | | INPUT |
| Radius | INT | N | | INPUT Radius around Lat/ Long in KM |
| Categories | ARRAY | N | | INPUT / Array of Category IDs |

FIG. 15

| Field Name | Data Type | Null? | Default Value | Comments |
|---|---|---|---|---|
| OrderID | INT | N | | INPUT / iPromote™ Order ID |
| EstimationID | STRING | N | | INPUT |
| DexMasterRefID | STRING | N | | INPUT |
| Budget | DECIMAL | N | | INPUT / Total Amount of Money allocated to iPromote™ for this Campaign over a 30 day period. |
| EndDate | DATE | N | | INPUT |
| primaryAreaCode | int | N | | INPUT / Primary Area Code for number allocation |
| secondaryAreaCodes | Array of Int | Y | | INPUT / if populated will use to provision numbers if none are available in the primary area code. |

FIG. 16

| Field Name | Data Type | Null? | Default Value | Comments |
|---|---|---|---|---|
| OrderID | INT | N | | INPUT / iPromote™ Order ID |
| EstimationID | STRING | N | | INPUT |
| DexMasterRefID | STRING | N | | INPUT |
| Budget | DECIMAL | N | | INPUT / Total Amount of Money allocated to iPromote™ for this Campaign over a 30 day period. |
| EndDate | DATE | N | | INPUT |
| primaryAreaCode | int | N | | INPUT / Primary Area Code for number allocation |
| secondaryAreaCodes | Array of Int | Y | | INPUT / if populated will use to provision numbers if none are available in the primary area code. |

FIG. 17

Reps Trained In

Budget Management Process

METHOD AND SYSTEM FOR LEAD BUDGET ALLOCATION AND OPTIMIZATION ON A MULTI-CHANNEL MULTI-MEDIA CAMPAIGN MANAGEMENT AND PAYMENT PLATFORM

ROSS REFERENCE TO RELATED APPLICATIONS

This application is a Divisional Continuation Application of U.S. application Ser. No. 16/119,888, filed Aug. 31, 2018, entitled Method And System For Lead Budget Allocation And Optimization On A Multi-Channel Multi-Media Campaign Management And Payment Platform, which claims priority to and the benefit of U.S. Provisional Patent Application Ser. No. 62/673,672, filed May 18, 2018, entitled Method And System For Lead Budget Allocation And Optimization On A Multi-Channel Multi-Media Campaign Management And Payment Platform, all of which are incorporated by reference herein in their entirety.

BACKGROUND

Field

This technology as disclosed herein relates generally to generating and managing advertisement leads and, more particularly, to budget allocation and lead source optimization for generating leads.

Background

Managing and monetizing Cost-Per-Click (CPC) and Pay Per Call (PPC) advertising has revolutionized direct marketing to consumers on the internet and has significantly grown advertisement offerings beyond traditional print directories and online directories. Also, Display Ads are an integral part of many online advertising campaigns. The CPC and PPC and Display Ad platforms have been added to traditional online listings and other online tools to create multiple avenues for online marketing. As compared to other areas of online advertising, CPC, PPC and Display Ads are a relatively new technology area that is unique to a wide area network (WAN) environment, such as an internet environment, however continuous improvements are needed to increase the efficiency of the technology. Today PPC, CPC and Display Ads are fundamental to the monetization of search-engine results, social media platforms and fundamental to driving qualified traffic to websites in order to grow a business's customer base. E-commerce sites and large brand sites were the first to adopt PPC as a marketing/advertising strategy, however, small and medium sized businesses have also followed this direction. Effectively managing an online advertising budget has also become essential to any business, large or small, such that the maximum number of customer leads are generated for the amount of budget being spent for online advertising. Therefore, continuous improvement in online targeted advertisement is needed and improvement in strategically selecting the lead sources for which one will spend their advertisement budget, whether, search engines, social or other lead sources. Unfortunately, online advertising, as mentioned, is difficult to manage, particularly for a small business.

There are multiple types of cost-per-action online advertising and multiple sources from which leads can be generated and multiple ways to manage the spend of an online advertisement campaign and each are hard for a small business to manage, and it is even more difficult to understand how to allocate an advertising budget among the various pay-per-action channels or lead sources, plus traditional print and online directories, and to analyze results in a useful way, especially when what the advertiser is really interested in is LEADS—those consumers who took an action that more strongly indicated an intention to engage with their business.

In addition to being able to optimize advertising campaigns based on analysis of their performance results in relation to generating actual or potential LEADS individually and being able to allocate spend accordingly across multiple types of campaigns, it would also be helpful if the advertising spend could be adjusted to pace incoming leads more regularly, and if the number of leads expected to be generated with a particular media budget could be more dependably predicted based on various factors known about the business prior to running any campaigns and receiving actual feedback from their performance. Also, once leads are generated from multiple campaigns, SMBs need a unified system in which to manage them, into which campaign-generated leads are automatically input, and that can also be coordinated with the optimization of later advertising campaigns to those leads or customers or potential ones with similar characteristics. In addition to not being able to effectively optimize advertising campaigns in relation to generating actual or potential LEADS, also small businesses don't have the ability to manage leads and budget allocations dynamically, and it would be helpful if the number of leads expected to be generated with a particular media budget could be more dependably predicted prior to running any campaigns and receiving actual feedback from their performance. Small businesses don't have the tools to manage multiple campaign media channels and lead estimates.

A small business values direct customer interaction through a phone call or email, and regards a click to a website as only the first step in the sale conversion funnel. Measuring the conversion from clicks to calls as well as understanding the conversion of calls to customers realized as well as repeat customers realized is necessary to properly manage the PPC campaign and ensure positive return-on-advertiser-spend (ROAS) or more traditionally referred to as return on investment (ROI). Although PPC has revolutionized direct marketing to consumers on the internet and has significantly grown advertisement offerings beyond traditional print directories and online directories, it has made it more difficult for small businesses to manage and more difficult to decide what is the best mix of advertisement offerings for an individual business owner. This places the burden on the small business owner to collect data and run complex analytical calculations on a regular basis beyond just determining the effectiveness of traditional print directories and online directories. If the calculations are flawed because of lack of data or scarcity of quality data, the business owner may overspend for traffic that does not deliver ROAS or underspend and not receive any traffic. PPC along with Display Ads, and social media and of course of traditional print directories and online directories can make developing an effective strategy a daunting task, particularly for a small business owner.

The primary challenge with PPC for a small business is that the business owner is interested in leads, such as phone calls, emails, filled out lead forms requesting services—action that more strongly indicate consumers who wish to engage with a business- and less interested in just website clicks or display ad impressions. The pay-per-click model has been modified to other models, for example, the payper-call (PP-Call) model where a business sets up a campaign similar to a PPC campaign but is bidding for calls not clicks. While these models may be more attractive to the small business owner, these models do not solve their problem of providing visibility into the call volume (or lead volume) that will be delivered and the effective cost-per-lead incurred. Nor do these platforms help them to predict and manage leads effectively. In addition, leads are delivered in unpredictable bursts that can overwhelm a small business owner's ability to process them and can results in waste. Also, there are the various cost per call (CPC), cost per 1000 impressions (CPM), cost per lead models that are currently being utilized.

From the perspective of a small business owner what is needed is a method and a system that more accurately estimates and predicts lead volume and that provides price transparency of the effective cost-per-lead and the ability to leverage and effectively manage all lead sources, including Tier 1 and Tier 2 lead sources, online and print directory/listing lead source, social media lead sources and others. What is further needed is a method and system that delivers the leads consistently throughout the duration of the advertisement campaign and that provides a wide range of lead sources for a campaign.

Another concern of business owners is managing the bidding or auction process for on-line keyword search engines. Businesses often will bid on keywords for search engine providers such that there advertisement or website is at the top of the list of search results when a user enters a search query using certain keywords. The problem, is managing and allocating budget for the bidding process to be cost effective and achieve the greatest result. To address this concern businesses often hire marketing consulting firms to manage the bidding process. The consulting firms manage the pay-per-click ad campaigns and the bidding process in order to achieve the businesses' click-through realization goals. The consulting firms often use rule based algorithms to establish and maintain keyword bidding. However, managing the bidding process has its difficulties, particularly if the consulting firm is managing multiple businesses that are very similar.

Managing customer retention is also a large part of what a business needs. A customer retention management system is needed that manages a data base of all clients of a business, and that provides the ability to reach out to those clients, send out emails to those clients, send that text messaging, and initiate marketing campaigns. In addition to managing customer retention there is also a need for businesses to have the ability to take payments, creating an estimate for an advertising campaign and/or invoice a customer when an advertisement campaign is purchased by a business. In addition to end customer retention, businesses also need to manage and set appointments with their end customer. Having greater efficiency in these areas can allow businesses to proactively increase their customer base.

A better apparatus, system and/or method is needed for improving the management of customer retention, the management of lead sources, budget allocation and management of online advertisement campaigns.

SUMMARY

The technology as disclosed and claimed herein includes a method and apparatus for managing and integrating a plurality of different types of lead sources for an online marketing/advertisement campaign on a customer relationship and customer retention platform, that provides lead estimates and that allocates and optimizes lead source budgets and provides a customer service and a payment processing function. There are various lead sources including print directories, online internet based directory platforms, Tier 1 and Tier 2 search engine lead sources based on purchase of keywords, Display Ads and social media platforms. However, there is currently no platform that integrates in network and third party lead source channels on a customer management platform in combination with internal enterprise lead sources that also provides estimation, allocation and optimization of lead source budgets, client relationship management and payment processing. The present technology as disclosed and claimed herein provides a platform that is a customer retention and customer management system that is automated to provide lead estimations and optimizations to allocate and optimize lead source budgets where the system has a learning function that improves over time. The customer relationship and customer retention platform server system as disclosed and claimed herein, is modified to include a Lead Estimator and Budget Allocation Application Engine processing on a Lead Estimator and Budget Allocation Server communicably coupled on a wide area network through a Data Exchange to one or more third party servers providing externally integrated lead sources and other functionality to provide a platform that provides lead estimates and that allocates and optimizes lead source budgets for integrating and generating both internally generated lead and externally generated third party leads and provides a customer service and a payment processing function.

The technology utilizes historical lead source data integrated with internal enterprise and external lead source generating systems, where the historical lead source data is gathered from both internal enterprise lead sources and external third party lead sources. The historical lead source data includes one or more of performance data and demographic data. The system assesses an individual business's need and based on historical data relating to that particular business or businesses with similar firmagraphics (demographics for a business entity) and selects and integrates a plurality of types of lead sources that are optimized to meet the business need, whether to maintain the business's current presence in the marketplace or grow the businesses presence in the marketplace, or lead in the marketplace. The system can utilize and integrate any combination of lead source channels whether internal or external in order to develop a customized and optimized a lead source mix with the appropriate lead source budget spend.

The system also has the functionality to plug in the results from external and internal lead sources and from best-in-class marketing platforms that develop and managed search bid/budget, display ads, directories and social media marketing campaigns for businesses. The system as described and claimed herein is a network hub having integrated user interface tools for sales force representatives, learning tools, estimation tools and performance tracking tools that can, via an application interface layer (API), leverage plug in 3rd party services, including 3rd party lead source channels and can leverage the optimization results provided by these plugins when a budget is input and the system network hub can further perform secondary optimizations when integrating with other lead sources, whether internal enterprise lead sources, external lead sources, marketing platforms or otherwise, and ultimately decide whether to allocate any budget to these external third party plug-ins as well as whether to allocate budget to the network hub's internal enterprise lead sources.

The ultimate lead source optimization is lead source agnostic to perform the best optimization. The plug-in functionality allows for continuous refinement of the system as newer best-in-class marketing platforms and lead source channels are developed. The system provides an aggregated estimator tool across various marketing platforms and various lead sources both internal to the network hub and external via API layers and a Data Exchange. For one implementation of the technology, the API layer is provided by a data exchange, which is a system and process of taking data structured under a source data schema (in this case—source data from 3$^{rd}$ party providers) and transforming the source schema into a data structured under the schema of the target (in this case—the target is the internal Estimator Tool Engine processing on a Estimator Tool Server network environment), so that the target data is an accurate representation of the source data, while also being readily useable by the target.

A data exchange allows data to be shared seamlessly between various servers/computers on a wide area network, whether internal to the enterprise hub or external and between the various source and target program tools residing and operating at either the source or at the target. For one implementation of the technology, the data exchange may interface with a plurality of sources and targets, each having unique data formats or schema. The data exchange for one implementation includes an exchange format or interchange format for a single domain, and where the exchange includes routines that translate each and every source schema to each target schema by using the interchange format as an intermediate step. Leveraging a data exchange facilitates access to 3$^{rd}$ party data for use by the Estimator tool.

The system also leverages demographic and thermographic marketing data when performing the optimization combined with various firmagraphic data such as size of business, customer base, business reviews, years in business and the like. The system can extract such data dynamically from 3$^{rd}$ party lead source providers and/or extract the data from internal network lead sources that are generated. Please note, however, that the 3$^{rd}$ party providers versus the internal sources as described in the various implementation and embodiments described and claimed herein can vary and can be swapped without departing from the scope of the invention.

Therefore, the system leverages and integrates internal network individual lead sources with 3$^{rd}$ party provided platforms that provide lead sources and has the ability to scale up to add new lead sources or add merchant platforms, or these sources and platforms are seamlessly removed or simply not allocated budget by the customer relationship and customer retention platform system due to under performance or other parameters. For one implementation of the technology, the system includes a front end sales basing component that presents packages to the business customers and the customer sales force representatives, which can be delivered and presented on a mobile device via a sales force user interface in a desktop type environment on a mobile device. The front end tool can present lead estimations to be generated by the systems and the package to achieve such leads, which includes an integrated combination of lead sources internal to a network and third party lead sources external the network.

For one implementation of the technology, the system includes a payment processing component that is utilized once the business representative decides on a marketing/advertising package and the sales representative has entered the order. The system also has the flexibility to customize packages based on the business need. The package orders are transmitted from the front end and payment processing occurs via credit card or other payment method. The payment processing tool is used for billing and for one implementation of the technology, is connected to a tool that allows the rep to scan credit cards without keeping the number stored anywhere. The payment processing tool that is processing on a payment processing server is provided in one implementation by an internal enterprise server or in another implementation via a third party service provider. Orders are then fulfilled through individual lead sources such as Tier 1 or Tier 2 or directory campaigns, or merchant platforms for search, display and/or social.

One implementation of the system includes a call tracking and reporting component. There are multiple integration points for call tracking for automated line provisioning. The customer relationship and customer retention platform system reports data to customers through a drive dashboard but also inputs the information into an estimator database. The customer relationship and customer retention platform system provides visibility into all the calls that come in if they choose call recording. The system will also track any other type of lead including any emails or form fills or appointments. The system effects pulling in the data that can be appendaged to any of the leads generated for the customer to provide them more information about their potential customers and that will be housed in the system dash board. A 3$^{rd}$ party provider is utilized for one implementation to assist with pulling such data.

There is a master algorithm based on an estimator model including geographic information, category/type, budget level, and/or business history. The master algorithm based on the estimator model creates an estimator function, which provides a lead budget estimate. One implementation of the estimator function (estimator tool) includes a multivariate adaptive regression methodology, sequential covering rule building, decision trees and a K-mean clustering method of vector quantization for cluster analysis for data mining. The estimator tool and budget allocation tool also utilize a learning function that uses actual historical data.

One implementation of the technology is a customer management platform including one or more communicably coupled enterprise servers forming and internal to an internal enterprise network, where said one or more communicably coupled enterprise servers communicably coupled to one or more external 3$^{rd}$ party servers configured to create and fulfill advertisement campaigns configured to source advertisement leads, where said one or more communicably coupled enterprise servers are communicably coupled to the one or more external 3$^{rd}$ party servers through one or more data exchange API translation layers, where the one or more data exchange API translation layers separate the enterprise servers and the internal enterprise network from the one or more external 3$^{rd}$ party servers. For one implementation of the technology one or more communicably coupled enterprise servers including an estimator application database and estimator application server programmed and controlled by an estimator application tool stored on said estimator application server, where said estimator application tool having program instructions that process on said estimator application server to thereby control the estimator application server and database to communicate through the one or more communicably coupled data exchange API translation layers to the one or more 3$^{rd}$ party servers, to initiate the one or more external 3$^{rd}$ party servers to assemble one or more lead source generating advertisement campaigns, and to receive at said estimator application database and server, external lead source based campaign information.

One implementation includes an estimator application tool having further program instructions that process on said estimator application server to thereby control the estimator application server and database to initiate the one or more communicably coupled enterprise servers to assemble one or more internal lead source generating advertisement campaigns, and to receive internal lead source based campaign information and to calculate a lead estimate based on the received internal and external lead source based campaign information for the one or more lead source generating advertisement campaigns including a combination of internal and external lead sources and to generate budget allocations among one or more internal network lead sources and one or more external network lead sources, where the estimator application tool processing on the estimator application server includes a machine learning routine that perform predictive analytics and a budget allocation routine having program instructions that parses a budget between the one or more lead sources based upon performance.

For one implementation of the technology, a customer management platform includes a sales force user interface platform including a business information server and business information database, and a browser based user interface presented on a user device and communicable with the business information server thereby retrieving business contact information and presenting to a user a selectable business contact. For one implementation of the technology an estimator and budget allocation server communicably coupled to the sales force interface platform and thereby receiving a selected business contact; and said estimator and budget allocation server communicably coupled to one or more external $3^{rd}$ party servers configured to fulfill advertisement campaigns and source advertisement leads, where said estimator and budget allocation server is communicably coupled to the one or more external $3^{rd}$ party servers through one or more data exchange API translation layers, and where the one or more data exchange API translation layers separate the estimator and budget allocation server from the one or more external $3^{rd}$ party servers. The estimator and budget allocation server for one implementation has program instructions that process on said estimator and budget allocation server to thereby control the estimator application server and database to communicate through the one or more communicably coupled data exchange API translation layers to the one or more $3^{rd}$ party servers, to initiate the one or more $3^{rd}$ party servers to assemble one or more lead source generating advertisement campaigns for the selected business contact, and to receive at said estimator application database and server, external lead source based campaign information for the selected business.

For one implementation the estimator and budget allocation server has further program instructions that process on said estimator and budget allocation server to thereby control the estimator and budget allocation server and database to initiate the one or more communicably coupled internal enterprise servers to assemble one or more internal lead source generating advertisement campaigns for the selected business contact, and to thereby receive internal lead source based campaign information and to thereby calculate a lead estimate based on the $3^{rd}$ party and internal lead source based campaign information; and the 3rd party servers having a $3^{rd}$ party user interface function communicable with the browser based user interface presented on a user device to thereby present to the user lead source based campaign information and a lead estimate.

One implementation of the technology as disclosed and claimed is customer management platform including an internal customer service server configured on and internal to an internal enterprise network. For one implementation an internal campaign provisioning server has search, display ad and social functions that source an internally generated lead. A sales force user interface platform is provided including a business information server and business information database, and a browser based user interface presented on a user device and communicable with the business information server to thereby retrieve business contact information and to thereby present to a user a selectable business contact. For one implementation an estimator and budget allocation server communicably coupled to the sales force interface platform and to thereby receive a selected business contact. The estimator and budget allocation server has program instructions that process on said estimator and budget allocation server to thereby control the estimator and budget allocation server and database and to initiate the one or more communicably coupled internal campaign provisioning servers to assemble one or more internal lead source generating advertisement campaigns for the selected business contact, and to thereby receive internal lead source based campaign information and to thereby calculate a lead estimate. The user interface function is communicable with the browser based user interface presented on a user device to thereby present to the user lead source based campaign information and a lead estimate. For one implementation a data exchange API translation layer, is provided where the data exchange API translation layer separates the estimator and budget allocation server from external $3^{rd}$ party servers configured to fulfill advertisement campaigns and source advertisement leads. The estimator and budget allocation server has program instructions that process on the estimator and budget allocation server to thereby selectively control the estimator and budget allocation server and database to access $3^{rd}$ party servers configured to fulfill advertisement campaigns and source advertisement leads. The estimator and budget allocation server has further program instructions that process to there by combine internal and third party.

The features, functions, and advantages that have been discussed can be achieved independently in various implementations or may be combined in yet other implementations further details of which can be seen with reference to the following description and drawings.

These and other advantageous features of the present technology as disclosed will be in part apparent and in part pointed out herein below.

BRIEF DESCRIPTION OF THE DRAWINGS

For a better understanding of the present technology as disclosed, reference may be made to the accompanying drawings in which:

FIGS. 5A, 5B and 5C are an illustration of a new client estimation model example that provides estimated compared to actual leads for a business category and actual data from tracked clients;

FIG. 12 is an illustration of a data format for entries by a sales representative and a Client I.D. and an Opportunity I.D.;

FIG. 13, is an illustration of a data format of the data accessed from the customer listing;

FIG. 14 is an illustration for a data format for three estimation packages;

FIG. 15 is an illustration of the data format specification for customer checkout;

FIG. 16 is an illustration of a data format for an API call that is made to initiate the campaign with 3$^{rd}$ party providers as well as with enterprise lead source solutions; and FIG. 17 is an illustration of a data format for an API call that is made to initiate the campaign with 3$^{rd}$ party providers as well as with enterprise lead source solutions.

FIG. 35A thru 351 is an illustration of the post order process flow;

Figure 1:
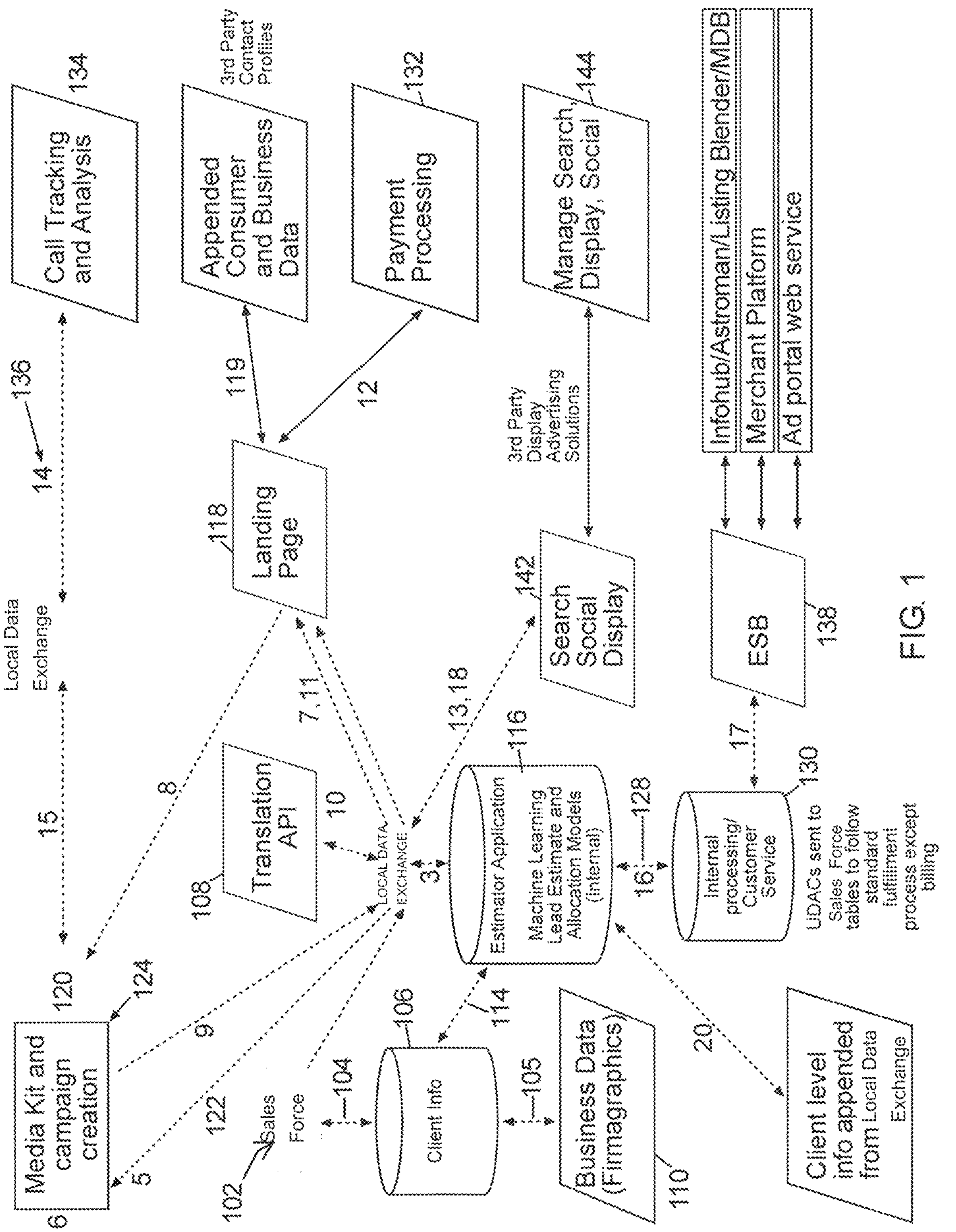
FIG. 1 is an illustration of a customer relationship and customer retention platform network environment and the various interfaces to internal enterprise platforms and external platforms.

While the technology as disclosed is susceptible to various modifications and alternative forms, specific implementations thereof are shown by way of example in the drawings and will herein be described in detail. It should be understood, however, that the drawings and detailed description presented herein are not intended to limit the disclosure to the particular implementations as disclosed, but on the contrary, the intention is to cover all modifications, equivalents, and alternatives falling within the scope of the present technology as disclosed and as defined by the appended claims.

DESCRIPTION

According to the implementation(s) of the present technology as disclosed, various views are illustrated in FIGS. 1-44 and like reference numerals are being used consistently throughout to refer to like and corresponding parts of the technology for all of the various views and figures of the drawing. Also, please note that the first digit(s) of the reference number for a given item or part of the technology should correspond to the Fig. number in which the item or part is first identified.

The customer management and customer retention platform server system leverages and integrates internal network individual lead sources with 3$^{rd}$ party provided lead source platforms that provide both internal and external lead sources respectively and the system as disclosed and claimed has the ability to scale up to add new third party lead sources or add internal network merchant platforms, and/or these sources and platforms are seamlessly removed by the system due to under performance or other parameters. The internal network severs process and execute a lead estimator engine and a budget allocation engine function for managing advertisement campaigns. The internal network servers also track all performance data and utilize historical performance data to perform a learning function to improve the estimator and budget allocation functions. The internal network servers perform the lead estimator function and budget allocation function for internal network lead source merchant platforms, but also leverages external network lead sources with third party provided lead source platforms.

The customer management and customer retention platform server system leverages both internal and external platforms to execute a comprehensive advertisement campaign. For one implementation, the server system network leverages best-in-class external platforms to provide the Tier 1 search, display ad and social portions of an advertisement campaign. Concurrently a portion of the advertisement campaign is executed by internal network lead sources such as one or more of Tier 2 search and display, and online listings. The internal network estimator and budget allocation server communicates with a third party lead source platform through a data exchange API translation layer. For one implementation of the technology, the system includes a front end sales component that presents packages to the business customers and the customer representatives, which for one implementation is delivered and presented on a mobile device via a sales force user interface in a desktop type environment on a mobile device. The front end tool can present lead estimations to be generated by the system when executing the campaign package to achieve such leads.

Referring to FIGS. 18 and 19, one implementation for a process to utilize the system includes a sales force representative user interface whereby a user is prompted with a display on a mobile computing device or other computing device, which provides search entry fields for initiating a search to look up business data. The user is provided the option to search by business name, contact name, business category, geographic category and other relevant categories. The user enters the search parameters and the sales force user interface initiates a query and search to a client information database. For one implementation, the sales force user interface also initiates a search and query to a third party provider of business data firmagraphics. The sales force user interface receives one or more search results providing a listing of one or more businesses resulting from the search. The user selects the appropriate business and the data is transmitted to the estimator and budget allocation server. For one implementation of the process utilizing the system, the sales force user interface function directs the user's mobile device or other computing device to a URL for a temporary landing page where basic marketing information can be provided that is useful for a sales representative who uses the tool for selling ad campaigns to clients.

While the temporary landing page is being presented, parallel processing is performed whereby the estimator and budget allocation server transmits the business data firmagraphics including geo to one or more third party lead source provider platforms. This business data is transmitted through a data exchange and requests the third party platform to create and provide an advertisement campaign package that is a combination of categories from the lead source channels that the third party platform has the ability to provide. The third party platform transmits the data representative of the campaign package back through the data exchange and to the estimator and budget allocation server. The estimator tool and budget allocation tool residing and executing on the server generates lead estimates and optimized budget allocations for the third party campaign package and in parallel and in combination with the estimator tool and budget allocation tool generates lead estimates and budget allocations for in-network lead source channels, thereby generating a combined set of lead estimates and budget allocations for a combined campaign which includes both external third party lead sources and in-network lead sources.

For one implementation, the complete estimate and budget allocation is transmitted from the estimator and budget allocation server through the data exchange to the third party platform. The third party platform receives the information and launches and populates a user interface at a defined web based URL. The estimator and budget allocation server further transmits a message to the user's mobile device or other computing device thereby redirecting the mobile device from the landing page to the third party providers site where the campaign data is presented for selection.

Figure 11A:
FIGS. 11A, 11B and 11C are illustrations of the summary display presented to the sales representative which provide a summary of the proposed campaign package, the lead estimates and options for maintaining, growing or leading.
Figure 11B:
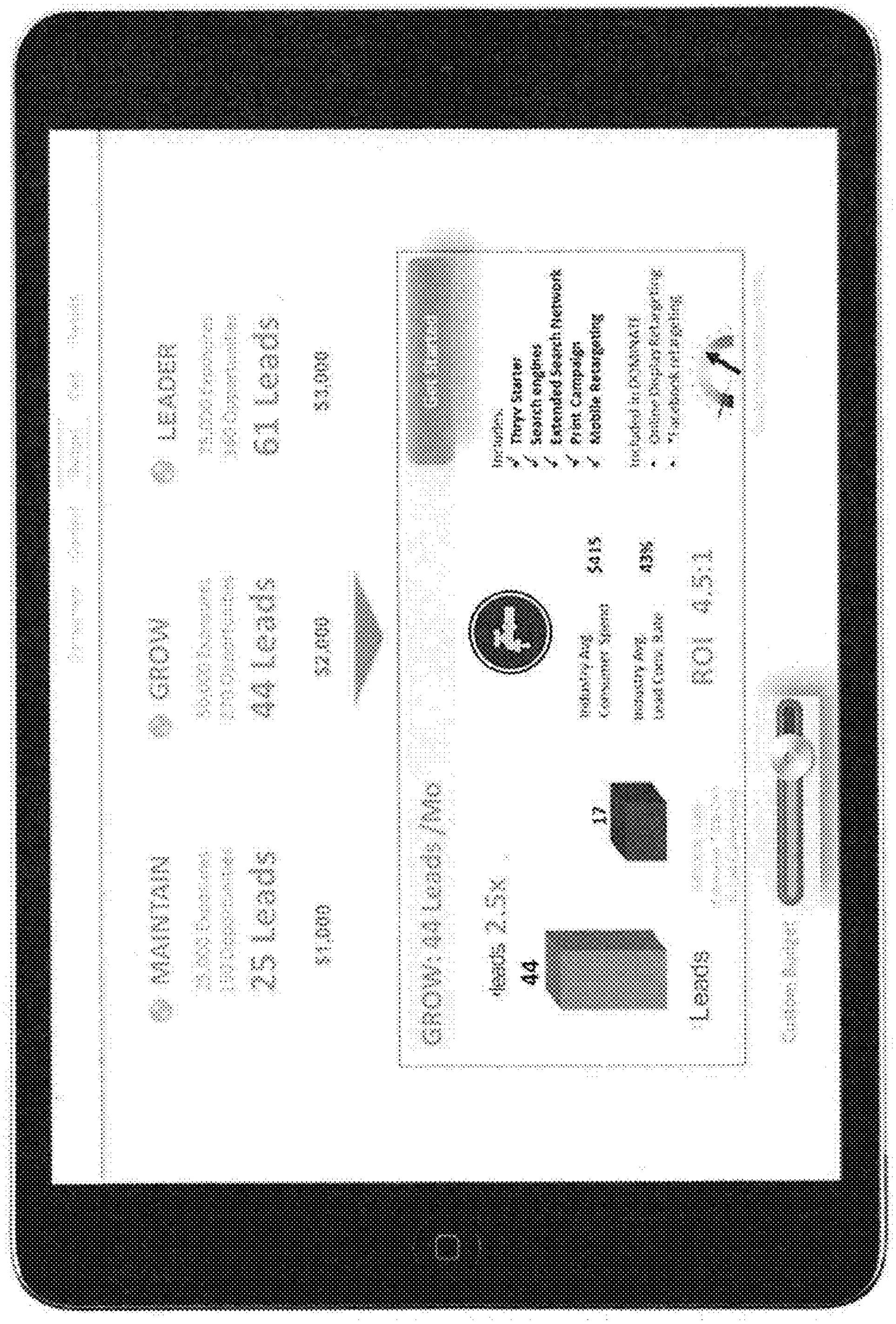
Figure 11C:
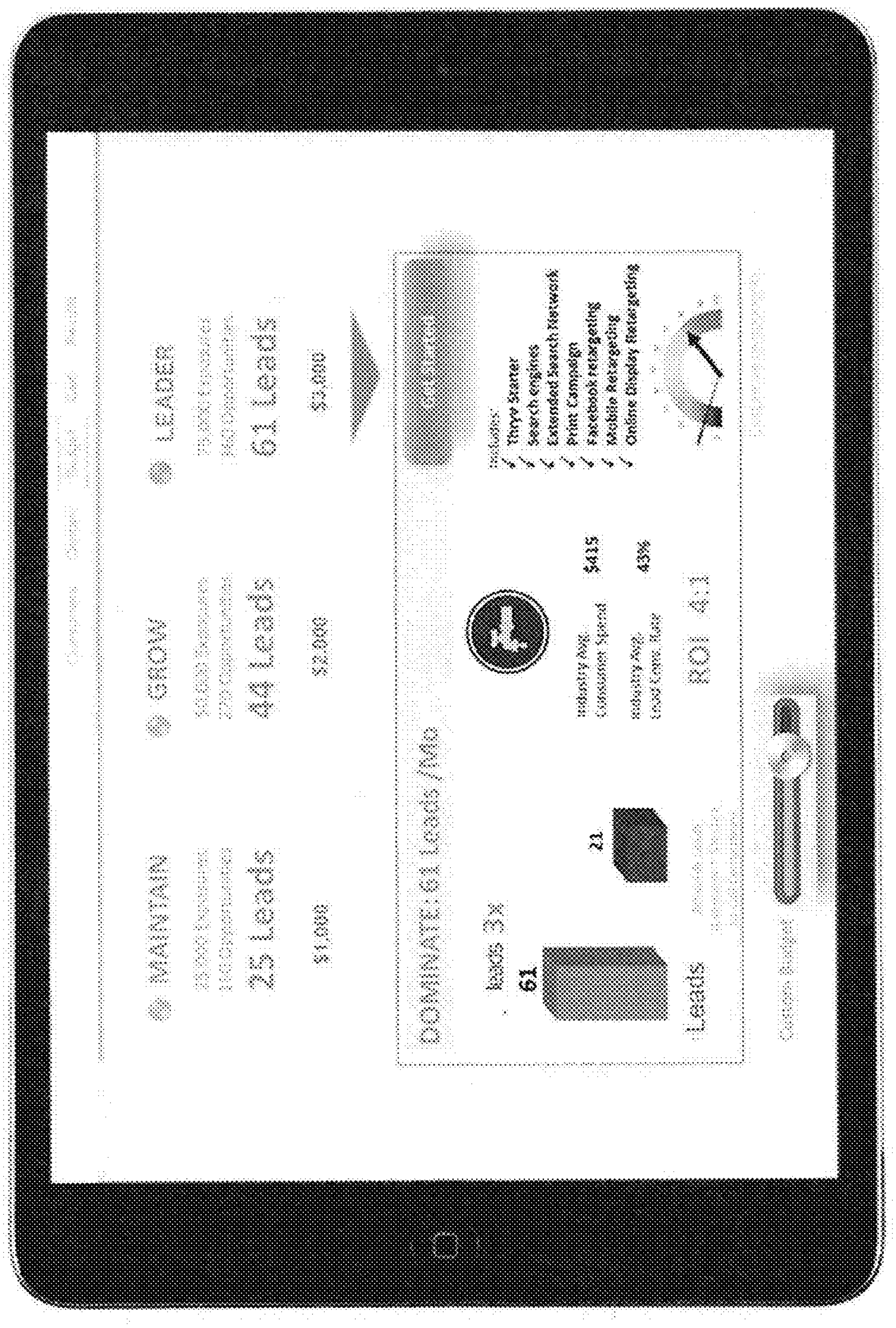
Figure 18A:
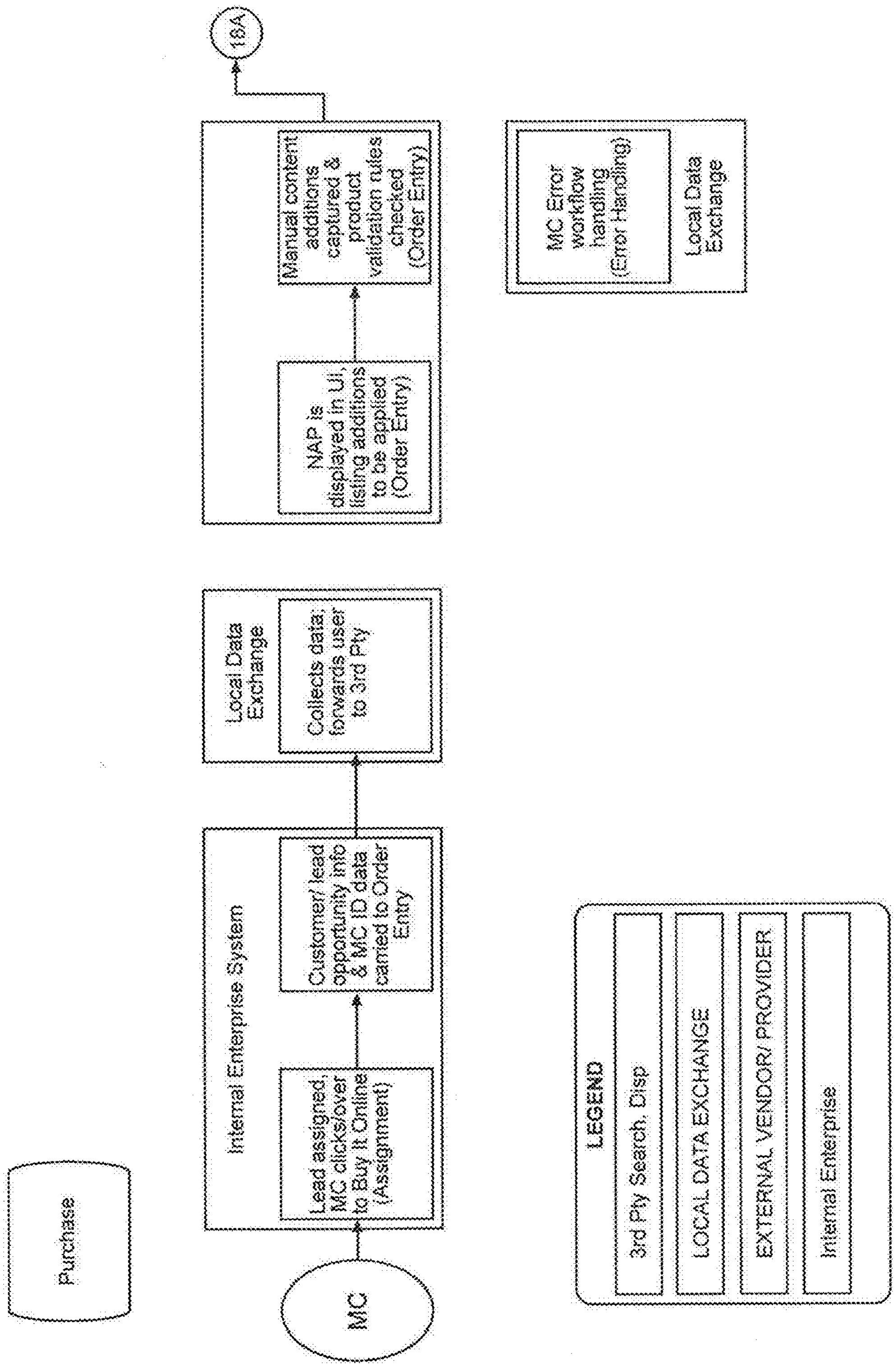
FIG. 18A thru 18D is an illustration of a functional flow for campaign purchase.
Figure 18B:
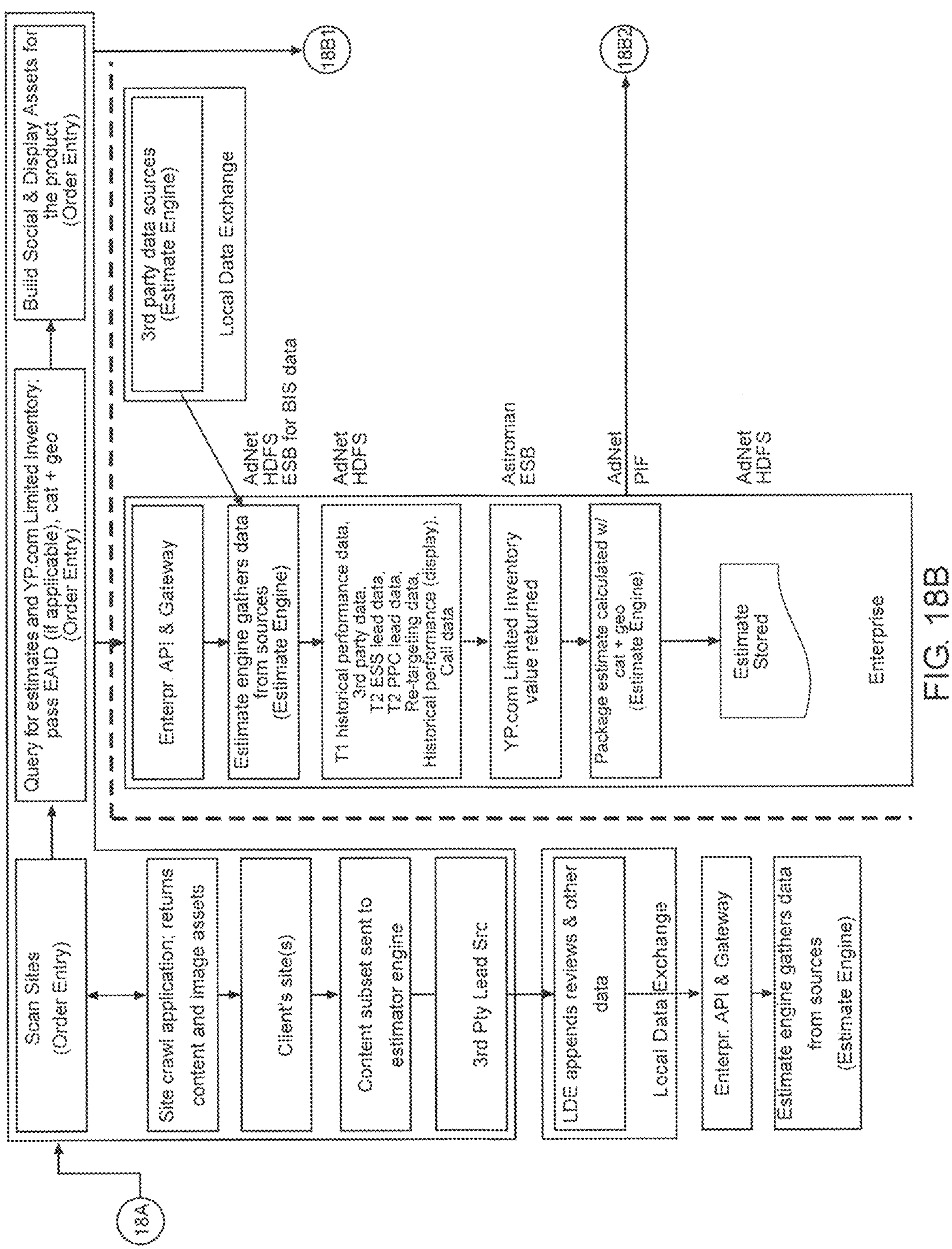
Figure 18C:
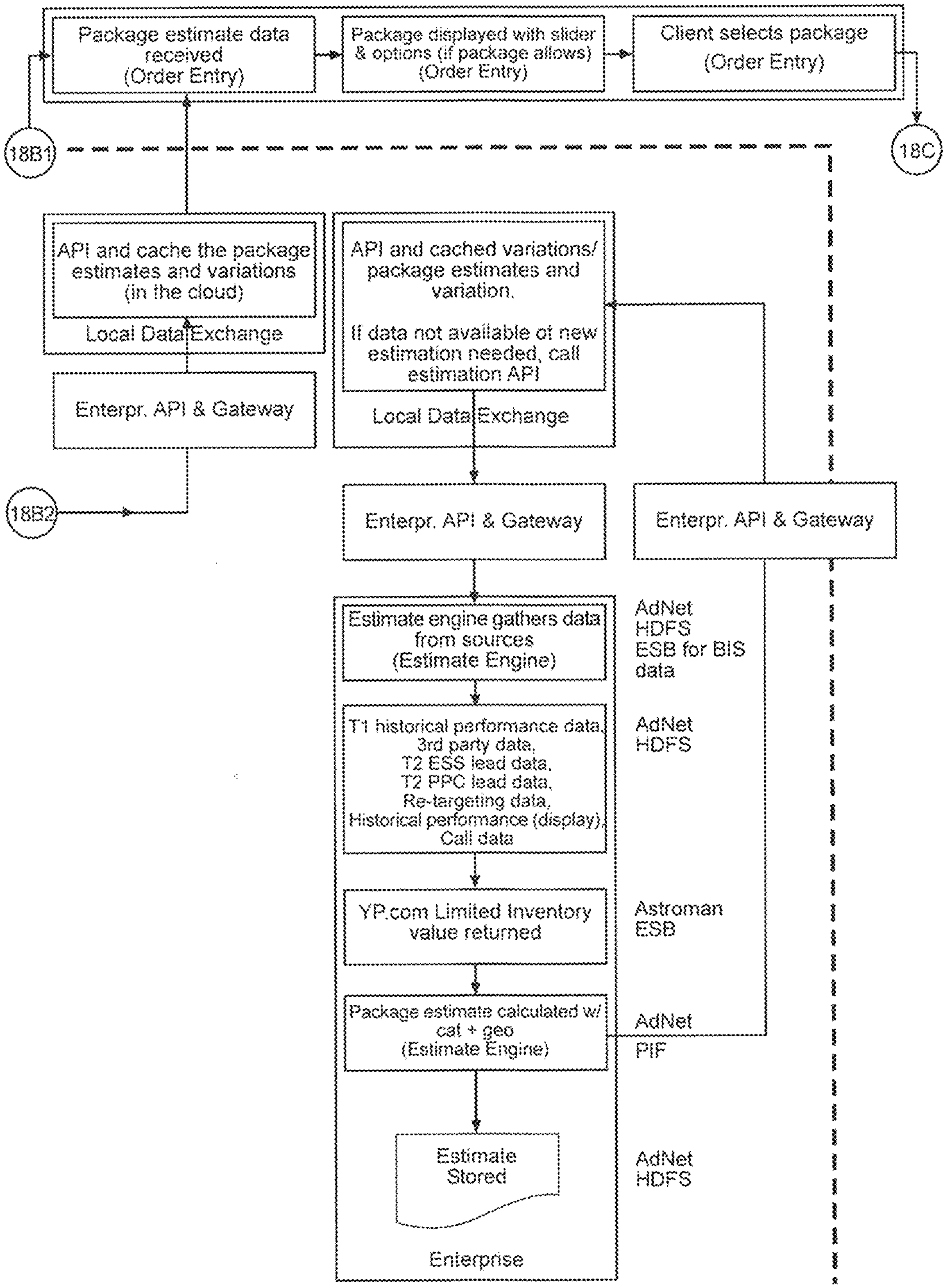
Figure 18D:
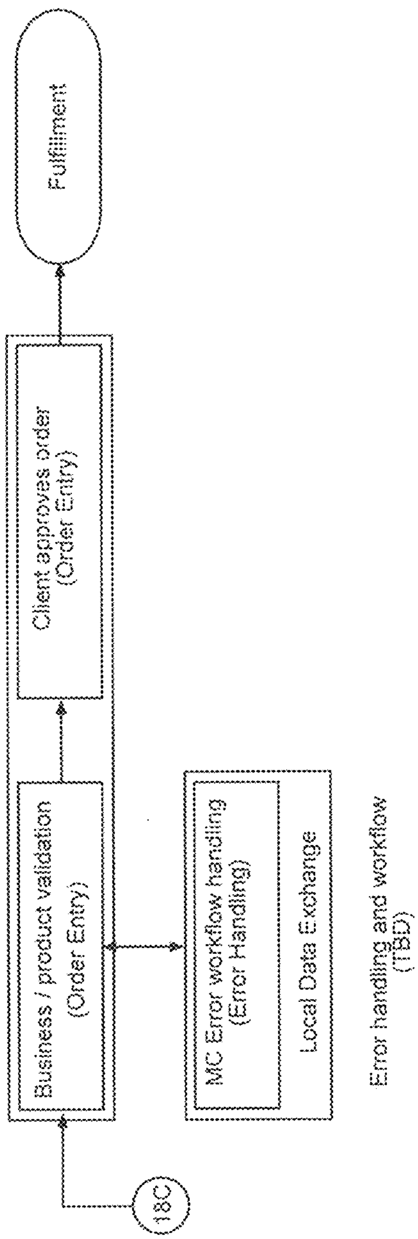

For one implementation, the user, who for example is a sale representative selling ad campaigns to businesses, shows the display of the mobile device to the client where the display graphically presents the proposed campaign including lead estimates and budget. Referring to FIGS. 11A thru 11C, the user is prompted with an active user interface element to select the campaign. If the campaign is selected, the user interface of the mobile device is redirected to a payment processing site where the payment is processed. Once the payment is processed, the user is prompted with an active user interface element to select and launch of the campaign. If the active element for launch campaign is selected, the campaign fulfillment process is initiated with the third party and internal providers. Performance tracking is initiated and analysis of performance data begins.

One implementation of the present technology as disclosed comprising a business management platform, which teaches a system and method for a fully integrated business management platform that is comprised of individual components that collectively provide a consistent end user experience. The technology as disclosed and claimed produces a lower cost development and ongoing support in the SaaS industry to provide small to medium sized businesses an affordable solution that compiles the most widely used daily functionality requirements into a single platform. The methodology allows for an ongoing lifespan in the marketplace. The technology provides the ability to plug in new code bases and unplug code bases as needed. One implementation of the technology provides a scheduling system, which allows the technology to be a unique offering that automatically distributes hyperlinks across online listing sites to collect appointments real time. One implementation of the technology provides business owners with the ability to use credit card scanning technology. The technology is a client relationship system that also includes a full integration social management solution, which automatically schedules content.

The details of the technology as disclosed and the various implementations and embodiments can be better understood by referring to the figures of the drawing. Referring to FIG. 1, an illustration of a network environment and the various interfaces is provided. For one implementation of the technology, a sales representative logs into the sales force user interface 102, by entering the appropriate credentials such as a user I.D. and password. The sales force business look up engine 102 residing on a client side server accesses business data such as name off business, address and telephone number. Once logged in, a search tool is displayed on the user interface where the sales representative is prompted with an entry element/entry field, where the sales representative enters the name of a business or a contact for the business for an existing or a prospective client. The sales force user interface 102 initiates and transmits a business query 104 and/or 105 to retrieve the business's firmagraphics (the demographics for the business) responsive to the sales representative's entry. The query is transmitted to and received by a business data server 106, which retrieves the business's firmagraphics from a business data server's database if the business entered by the sales representative already has stored firmagraphics in the firmagraphics database.

For one implementation of the technology, the business data server 106 also accesses the Application Interface (API) management layer 108, or data exchange, and transmits the business query through the API management layer to a $3^{rd}$ party business firmagraphics provider 110 and retrieves a response from the $3^{rd}$ party provider containing the business's firmagraphics, target buyers and lead scoring information. For one implementation of the technology, the API layer is provided by a data exchange, which is a system and process of taking data structured under a source data schema (in this case source data from $3^{rd}$ party providers) and transforming the source schema into a data structured under the schema of the target (in this case the internal Estimator tool network environment), so that the target data is an accurate representation of the source data, while also being readily useable by the target. A data exchange allows data to be shared seamlessly between various servers/computers on a wide area network and between the various source and target program tools residing and operating at either the source or at the target. For one implementation of the technology, the data exchange may interface with a plurality of sources and targets, each having unique data formats or schema. The data exchange for one implementation includes an exchange format or interchange format for a single domain, and where the exchange includes routines that translate each and every source schema to each target schema by using the interchange format as an intermediate step. Leveraging a data exchange facilitates access to 3rd party data for use by the Estimator tool and any other internal enterprise tools processing on the internal enterprise server network.

Once the business firmagraphics has been retrieved, the sales force user interface displays a prompt, including a selectable display element to the sales representative indicative of the business firmagraphics being retrieved. The selectable display element when selected by the sales representative through the sales force user interface initiates the creation and transmission of a message 114 including a sales representative I.D., a business/client I.D. and the business firmagraphics, including Name, Address and Phone Number (NAP). For one implementation of the technology, the message 114 is transmitted to and received by an Estimator Tool residing and executing on the Estimator Application Server 116 and database. For one implementation, the message 116 is transmitted in URL parameters through the data exchange API endpoint. The sales force user interfaced tool operating in the desktop type environment on the mobile device prompts the data exchange to create a unique message I.D. that is included in the message 114 to Estimator Tool. Once the message is transmitted, the sales force user interface redirects to a new site and displays a main landing page 118 while the Estimator tool inputs the data from the message, transmit the data through the data exchange to a server side third party server, and performs the estimation.

The Estimator tool includes a learning function that executes and performs a machine learning analytics algorithm on historical lead performance data. The machine learning function processes on the server and inputs the performance data into the Estimator tool. The estimator tool also includes lead source budget allocation modeling tool that is processing on the server, which models various different allocations across categories and individual lead sources or channels and utilizes regression algorithms to optimize the allocations and budgets across lead sources. The regression analysis is a form of a predictive modelling technique which investigates the relationship between a dependent (lead target) and independent variable (s) (lead predictor). This technique is used for forecasting, time series modelling and finding the causal effect relationship between the variables. Responsive to receiving data from the Estimator Application server 116 relating to business firmagraphics as provided by sales force, a third party campaign creation server generates a third party campaign package of categories relating to relating to search, display and social for the identified business firmagraphics. The third party campaign package of categories is passed back through the data exchange to the Estimator Application server on the client side. The Estimator tool creates a unique estimate and budget allocation customized and packaged for the selected business/client, which includes both the third party categories and the in network client side lead sources. The Estimator tool passes an estimate and budget allocation back, along with the client fields, through the data exchange to the third party provider on the server side. The estimator server tool automatically accesses the API management layer 108 through which the data exchange passes 122 the estimate and budget allocation, the unique desktop I.D. that was created and the business informatics to a 3rd party server, which provides display advertising solutions based on business firmagraphics. The estimator tool and budget allocation tool 3rd party service receives the combined campaign including third party lead source platform categories and internal lead source platform categories and the third party platform creates a campaign user interface presentation of a campaign to be implemented across various lead sources, geographic demographics and display ads, where the presentation includes lead estimates and budget allocation. The third party server populates a user interface with multiple campaign package options including lead estimates and budget allocations.

Once a 3rd party server populates the user interface with the campaign options, the 3rd party server generates a campaign package summary user interface display that is transmitted 124 and displayed via a URL site that is accessible remotely via a mobile device such that the sales representative is presented with the campaign options for review. A selectable display element is also displayed to submit an order to launch the selected campaign being presented. If the display element is selected, the 3rd party server 120 receives a message indicative of the selection and generates a campaign record responsive to the selection. The campaign record generated is passed 126 through the data exchange along with the client I.D., lead categories, firmagraphics, key words and display ads. For using on the sales force user interface, the data exchange translates and converts the format and nomenclature of the firmagraphics and other information from the 3rd party service provider to the format and nomenclature as utilized by the Estimator tool and that can ultimately be presented on the user interface. The data exchange passes 128 the information to a customer service tool residing and executing on a customer service server 130 and database, where the information includes a rate, a package I.D. and a customer I.D. Similar to accessing 3rd party service providers 120, 3rd party social and display ad providers 142 and 144 can be leveraged. For one implementation of the technology the user interface, which presents the campaign options and selection elements are performed by the internal enterprise server network.

For one implementation of technology, a payment processing tool is included. The estimator tool accesses the API management layer 108 through which the system accesses a 3rd party payment platform for payment of a selected campaign. The Estimator tool transmits a message with the order information including the rate to the payment platform 132, which generates a payment user interface display that is transmitted through the data exchange to the desktop environment and presented to the user for receiving method of payment information and transmitting the information back to the payment platform 132. The desktop environment presents on the sales force user interface the start campaign information. For one implementation of the technology, the data exchange also provisions and initiates through the API management layer 108 call tracking by transmitting a message 136 to a 3rd party call tracking provider 134 for analysis. The user interface launches the campaign by sending a message through the data exchange that also initiates launching the campaign by accessing through the API layer 3rd party service providers and/or by passing information through the enterprise level service bus 138 to internal applications for launching Tier 1, Tier 2, directory listing and other enterprise level campaigns. For one implementation of the technology, the search, display and social campaign functions are fulfilled by the third party service provider 120; and Extended Search Solutions are performed by the client side internal processing and merchant platform. The user interface for the payment processing function in one implementation is performed by a 3rd party payment processing platform, however, for yet another implementation the payment processing function is performed by the internal enterprise server network.

The Data Exchange separates the client side enterprise solution servers from the third party provider's servers which provide search, display and social campaign solutions. For one implementation of the technology Data Exchange and translation API Layer, which performs formatting, translation and consolidation of the data, provides a communication conduit between the client side enterprise servers and the external server side third party provider servers. The actual building of the entire campaign, including Tier 2 and Tier 1 campaigns and estimates is performed by the internal enterprise server network. For one implementation, the initial landing page is generated by the internal network servers. The landing page in flow is for sales rep selling product to a client and is an entry point that then goes to a UI generated by a third party platform.

Leveraging a third party platform's site to generate and populate a user interface for presenting the campaign package options along with lead source estimates and budget is useful because the third party lead sources are being leveraged. However, for one implementation of the system, this user interface as well as any other user interface described herein can be generated and populated by the internal enterprise server network. However, for the primary implementation described herein, the Media Kit and Campaign creation to build out the UI is performed by a third party platform. Business information sent is transmitted back and forth through the data exchange (name, address, telephone number) to media kit campaign creation of the third party platform, which looks up business, then sends back campaign categories for the business and the estimator tool generates the estimate, then the estimate is sent back to third party platform having multiple lead source channels (search, social, display), then third party platform builds out a custom UI.

The system network estimator tool monitors, retrieves and stores performance data from the third party platform for future campaign estimates. When estimates are sent back out through the data exchange to the third party platform, it is for all of the lead source products and not just the third party lead sources, such that the third party platform has access to best analytics available on the internal enterprise server system platform. Some portions of the estimate and campaign is for internal lead sources and some are external third party. This system methodology is useful because the system can leverage best-in-class third party search, display and social platforms while not totally relying upon them because many third party platforms don't use estimates at all and don't perform a robust performance tracking analytic.

The estimator and budget allocation tools processing on the estimator and budget allocation server updates the campaign budget periodically, such as for example, updating daily. The desktop environment accesses the API management layer to communicate the daily budget information to the 3rd party service providers. Lead source data is tracked and is stored for future reference by the machine learning engine and the budget allocation models. The internal network integrates other products with the third party executed campaign, like internal network tier 2 search and display, Extended Search Solutions (ESS), listings, and the like.

The third party provider upon receiving business data informatics 122 also performs data scraping to find information regarding the businesses in order to then better pick categories along with geographic parameters. The third party platform sends back the lead source and campaign information 124 to the estimator, which creates and estimates for both third party lead sources and internal lead sources. For example, the third party platform provides 5 categories of lead sources with geo. The estimates that are passed back to the third party providers include multiple channels.

The user interface for one implementation provides a slider function (See FIGS. 11A thru 11C for an illustration of the user interface element for the slider function) for increasing or decreasing lead estimates/budgets. For one implementation, the Tier 1, Social, and Display campaign 142 is fulfilled and executed by the third party and tier 2, extended search solution and other channels 138 are fulfilled and executed through the internal network and traditional channels. The internal network manages budget adjustments for both internal and external campaign fulfillments daily 144. Default allocations for budget, for one implementation of the technology, are initially set and then when a statistically relevant amount of data has been collected the budgets are adjusted. Performance Data is fed back daily at the category level as well as at the individual lead source level and budget allocation is adjusted accordingly.

One embodiment of the technology uses an API specification that provides support in creating web services for the Estimator communications with the front end sales force user interface according to a Representational Stat Transfer (REST) architectural pattern. For example a Java REST API is utilized for the Estimator's communication with the front end to simplify the deployment of the web service client and endpoints. As previously described, for one implementation of the technology, the Estimator tool includes a machine learning function.

For one implementation of the technology, the machine learning function includes a scientific computation package, an optimization tool box, a statistical analysis tool box, a database operation package, a database communication package and a parallel processing toolbox for multi-processing. For one implementation of the Estimator tool, the Estimator tool includes budget allocation models that are based on a hierarchical non-linear regression, predictive cost leads relationship at 3 layers of the geo-category, geo-parent-category, and the national-parent category for each of 3 channels. A "client score" is layered on to adjust Geo Category estimates. Various predictor variables are utilized including variance in Review Ratings (Median, Min, Max), Years In Business and Number Of Employees (or other metric for the size of the business). For clients that are already in the system and who currently have call tracking in place, the tracking data overrides all other variables being considered in the Client Score adjustment. For one implementation of the system Initial Budget Allocation Models are built using historical call and click data from historical enterprise products including directories and tier 2 searches.

Performance improvements due to omni-channel optimization will be captured through ongoing model optimizations (machine learning).

Figure 2:
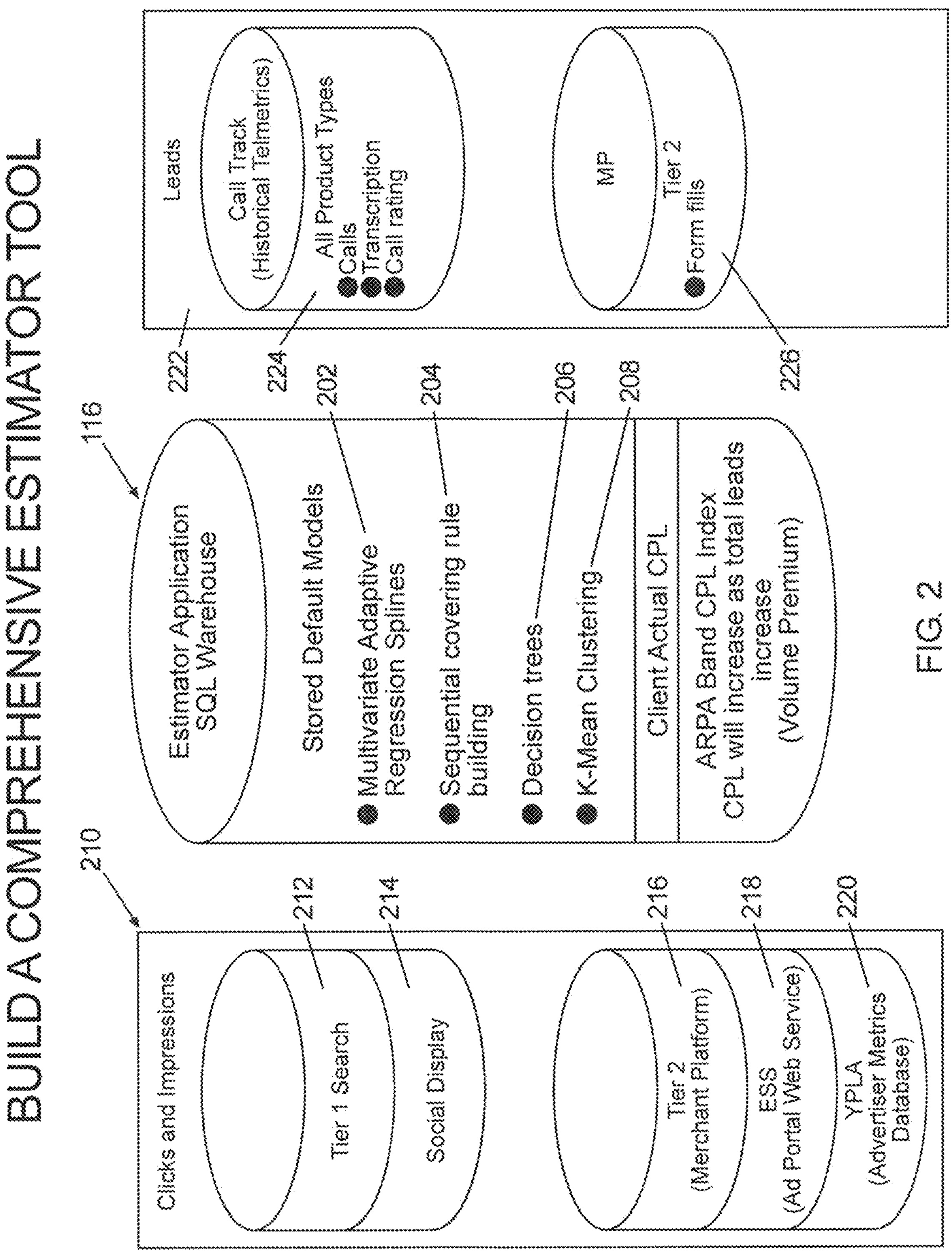
FIG. 2 is an illustration of the Estimator Tool that is an application that is hosted and executes on an Estimation SQL Server Warehouse.
Figure 3:
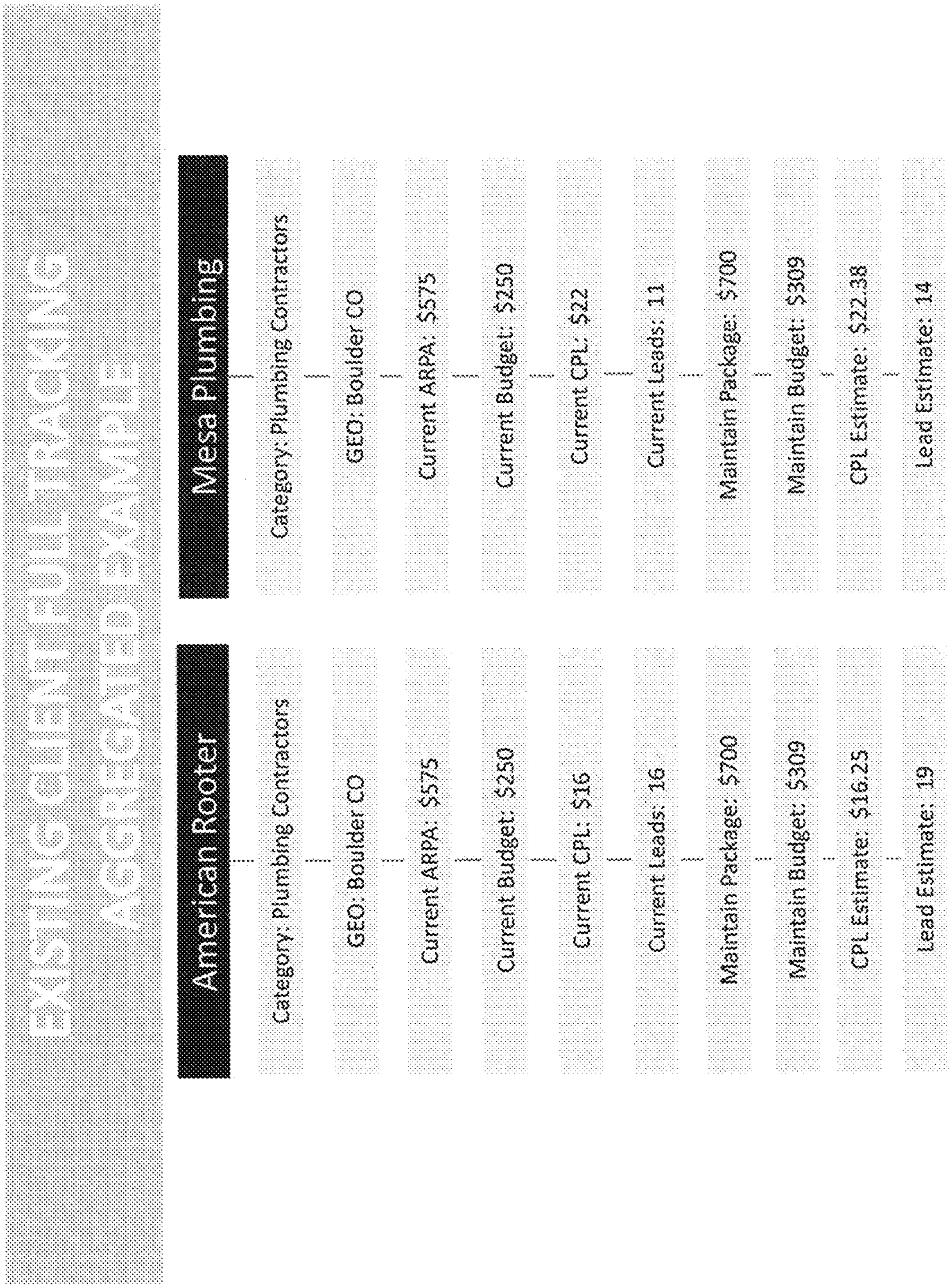
FIG. 3 is, an illustration of aggregated full tracking of an existing client.

Referring to FIG. 2, the Estimator Tool is an application that is hosted and executes on an Estimation SQL Server Warehouse 116. The Estimator tool includes Multivariate Adaptive Regression Splines 202, Sequential covering rule building 204, decision trees 206 and K-Mean clustering 208. The Estimator tool receives inputs regarding clicks and impressions 210 relating to Tier 1 searching 212, Social Media and Display Ads 214. The Estimator tool also receives Tier 2 Merchant Platform inputs 216, as well as inputs from the Ad Portal Web Service 218 and the advertiser metrics database 220. Lead source information 222 is an input into the Estimator tool including historical telemetrics 224 and Tier 2 form fills 226. FIG. 3 illustrates an example of aggregated full tracking of an existing client.

The Multivariate Adaptive Regression Splines is a form of regression analysis that is a non-parametric regression that is used an extension of linear models that automatically models nonlinearities and interactions between variables, where the regression predictor does not take a predetermined form but is constructed according to information from the historical data. For one implementation of the technology, a sequential coveting Strategy for Inducing Classification rules is utilized. In general, these type of algorithms follow a sequential covering strategy, where a single rule is discovered at each iteration of the algorithm in order to build a list of rules. Such algorithms are successfully applied to discover a list of classification rules. In general, these algorithms follow a sequential covering strategy, where a single rule is discovered at each iteration of the algorithm in order to build a list of rules.

A sequential covering strategy is a classification algorithm used to mitigate the problem of rule interaction, where the order of the rules is implicitly encoded as pheromone values and the search is guided by the quality of a candidate list of rules. For one implementation of the Estimator tool, a k-means clustering method is utilized, which is a method of vector quantization, originally from signal processing, that is popular for cluster analysis in data mining. k-means clustering aims to partition n observations into k clusters in which each observation belongs to the cluster with the nearest mean, serving as a prototype of the cluster. This results in a partitioning of the data space into Voronoi cells, which is a partitioning of a plane into regions based on distance to points in a specific subset of the plane. That set of points (called seeds, sites, or generators) is specified beforehand, and for each seed there is a corresponding region consisting of all points closer to that seed than to any other.

Figure 4:
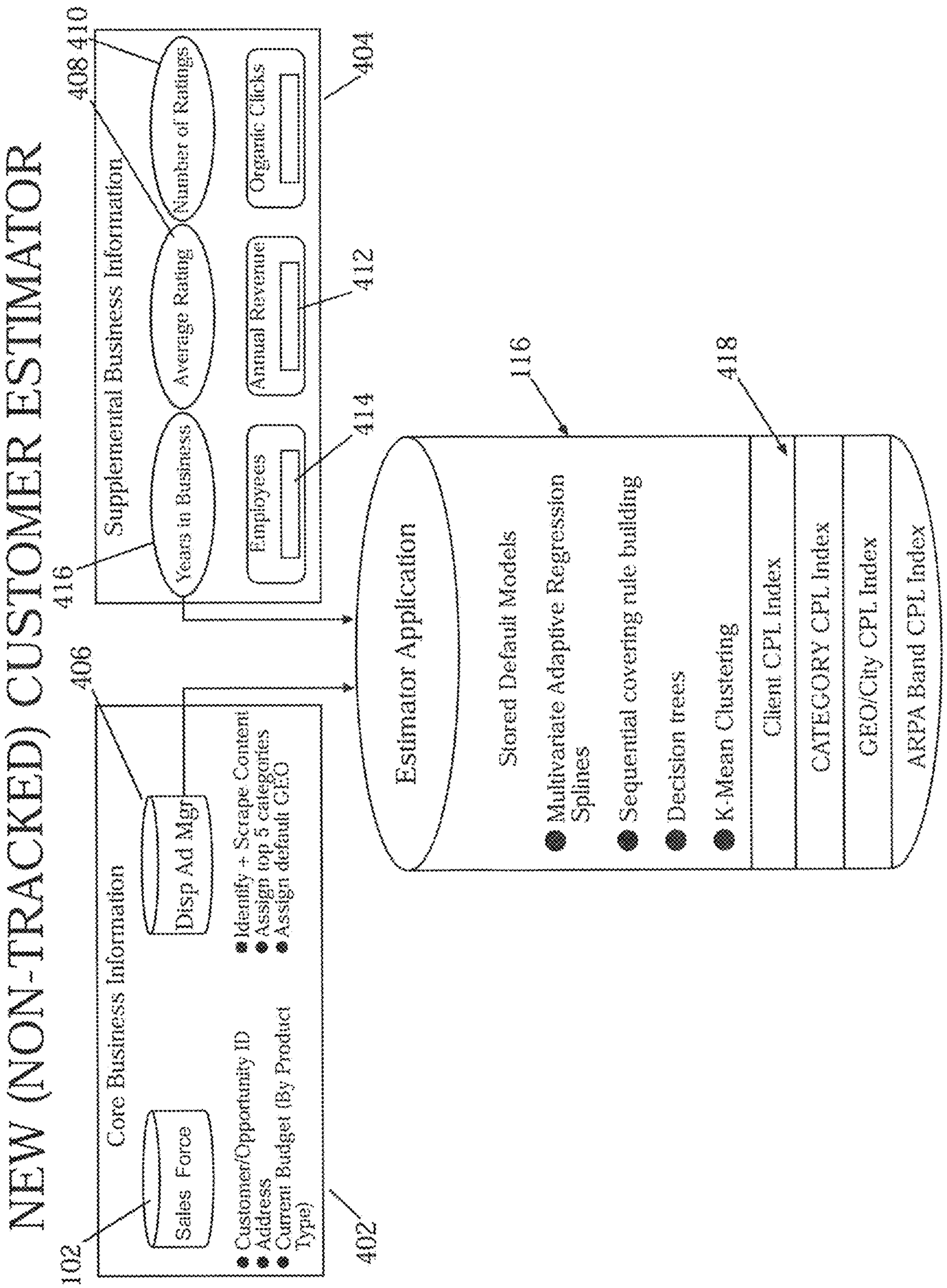
FIG. 4 is an illustration of a new non-tracked customer Estimator tool function.

FIG. 3 illustrates an example of full tracking aggregated. FIG. 4 illustrates a new non-tracked customer Estimator tool function. For one implementation as shown, the Estimator tool 116 receives an input from a core business information 402 portion of the system and supplemental business information 404 portion of the system. For one implementation of the technology, the core business information is provided by the sales force user interface desktop environment 102 and the 3$^{rd}$ party service provider 406. The customer/opportunity I.D. is provided from sales force to the Estimator tool along with address and current budget by product type. The 3$^{rd}$ party service provider identifies and provides "scrape content" that is content taken from other places on the web and can assign geographical parameters and can identify the top categories. The Supplemental Business Information 404 can be accessed from various sources including 3$^{rd}$ party providers of Business Data firmagraphics, search engine average rating 408; Google® Number of ratings 410; and 3$^{rd}$ party firmagraphic data 412, 414 and 416. The Estimator tool generates various calls per lead indexes including client, business category, and geographic indexes 418. The estimator application processes the data.

Figure 5B:
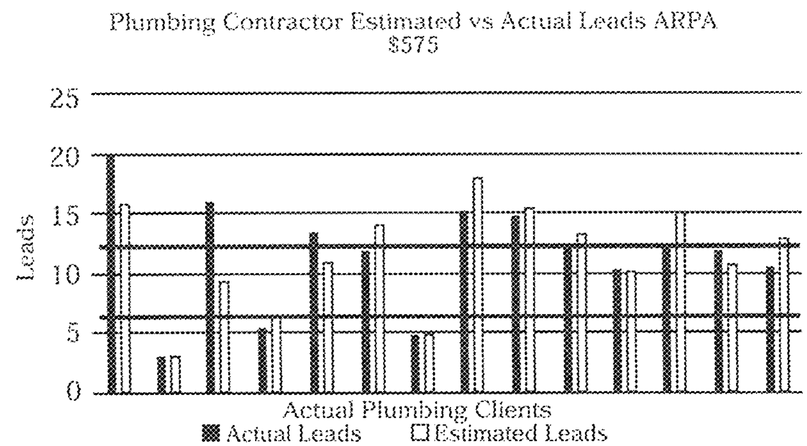
Figure 6:
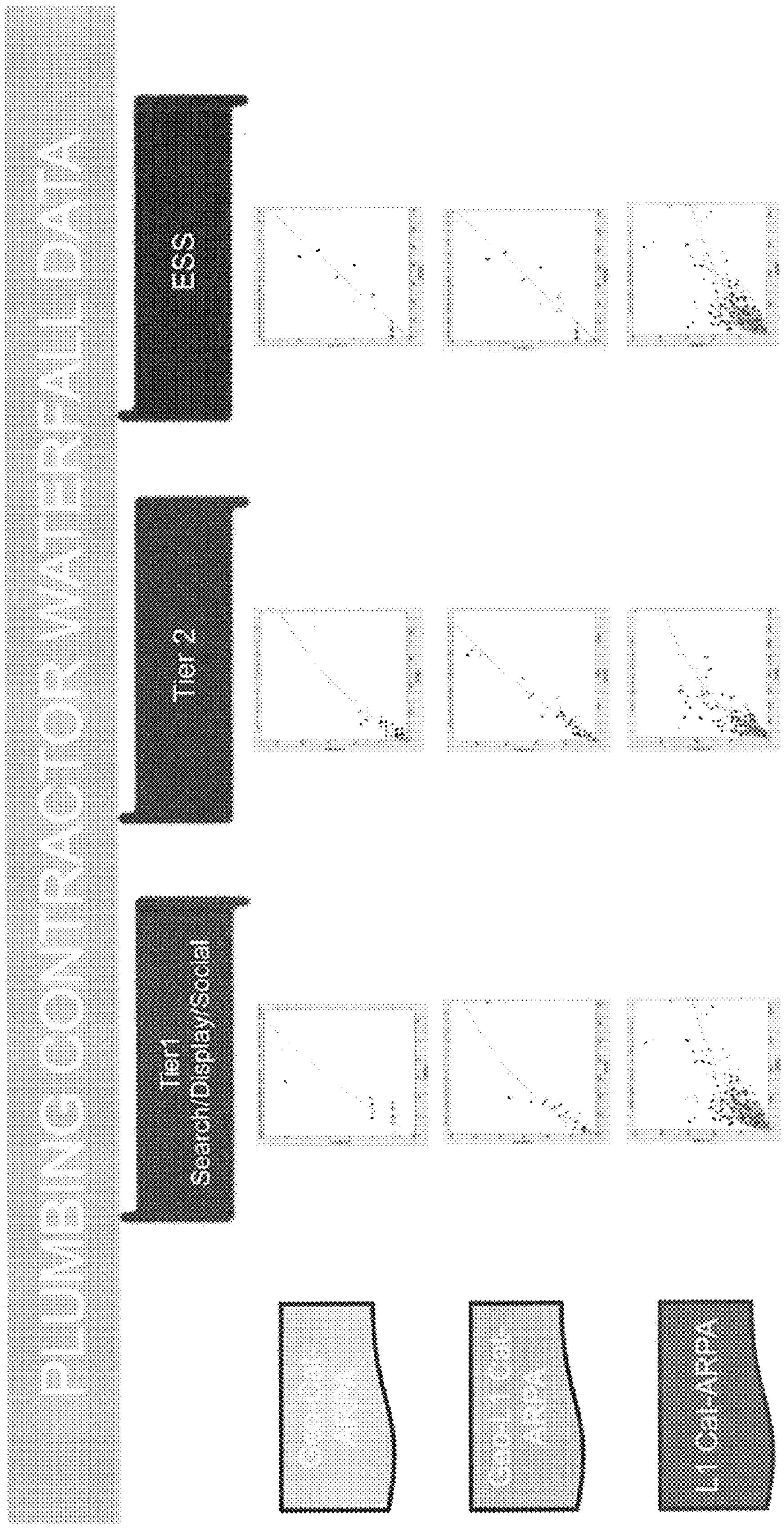
FIG. 6 is an illustration of a waterfall data graph for a business category.

FIGS. 5A, 5B and 5C illustrate a new client estimation model example that provides estimated leads compared to actual leads for a business category and actual data from tracked clients. Actual data from tracked clients is used to build a model and the model is used to estimate call per lead (CPL) for non-tracked client or new clients. The model is built based on a regression statistical model. FIG. 6 illustrates waterfall data for a business category. The bar graph reflects the actual leads versus the leads that had been estimated. By using the actual data and regression statistics, the technology is able to provide estimates that new clients had not been exposed. The three tiers illustrated reflect the method of increasing the Geo Category if not enough data is available by going up to a higher geo to try to achieve significantly relevant data. If there still isn't sufficient data the step can be made to capture the entire category without a geo category limitation.

Figure 7:
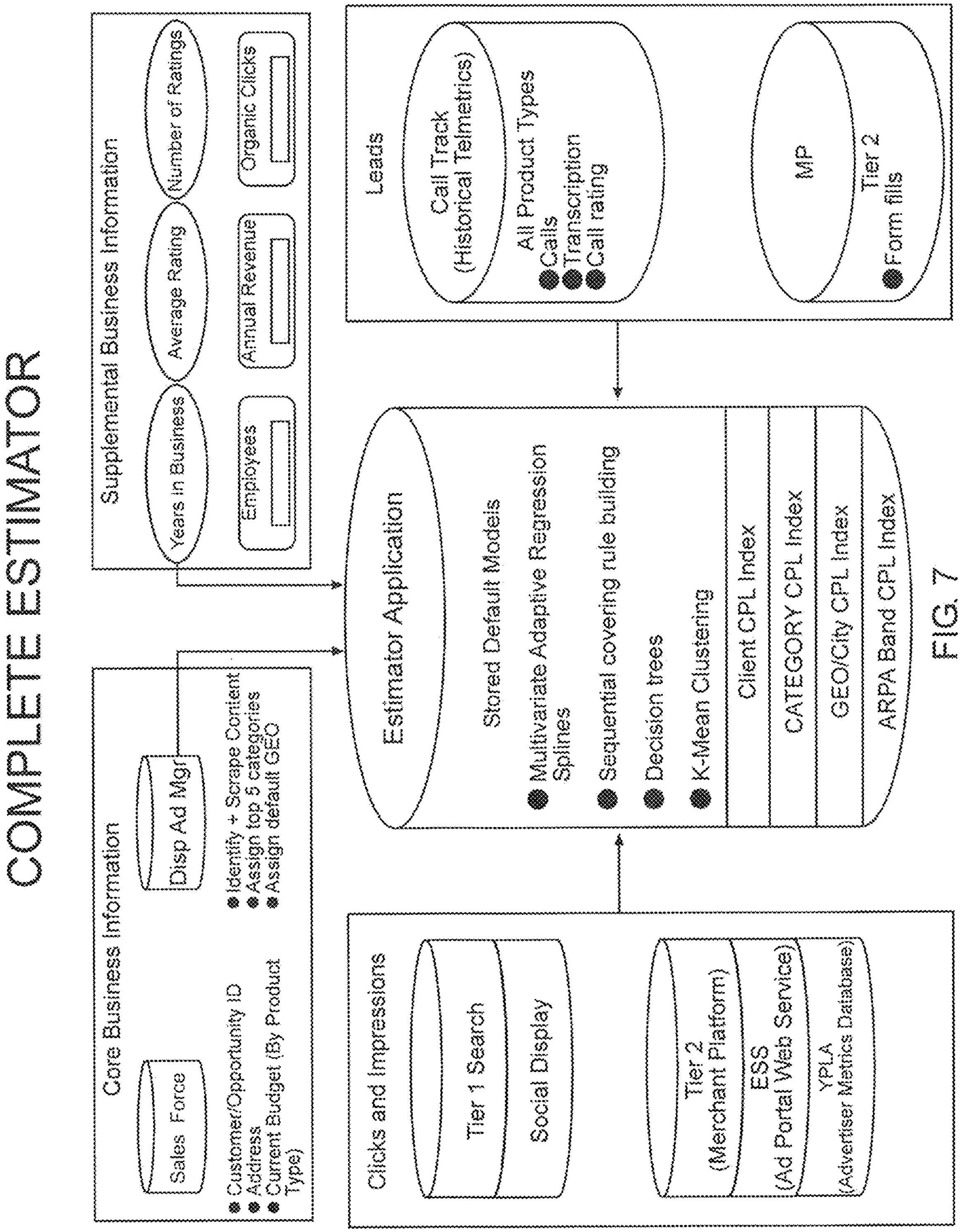
FIG. 7 is an illustration a complete Estimator tool.

FIG. 7 illustrates the completed Estimator tool. The Estimator Tool is an application that is hosted and executes on an Estimation SQL Server Warehouse 116. The Estimator tool includes Multivariate Adaptive Regression Splines 202, Sequential covering rule building 204, decision trees 206 and K-Mean clustering 208. The Estimator tool receives inputs regarding clicks and impressions 210 relating to Tier 1 searching 212, Social Media and Display Ads 214. The Estimator tool also receives Tier 2 Merchant Platform inputs 216, as well as inputs from the Ad Portal Web Service 218 and the advertiser metrics database 220. Leads source information 222 is an input into the Estimator tool including historical telemetrics 224 and tier 2 form fills. For one implementation as shown, the Estimator tool 116 receives an input from a core business information 402 portion of the system and supplemental business information 404 portion of the system.

For one implementation of the technology, the core business information is provided by the sales force user interface desktop environment 102 and the 3$^{rd}$ party service provider 406. The customer/opportunity I.D. is provided from sales force to the Estimator tool along with address and current budget by product type. The 3$^{rd}$ party service provider identifies and provides "scrape content" that is content taken from other places on the web and can assign geographical parameters and can identify the top categories. The Supplemental Business Information 404 can be accessed from various sources including 3$^{rd}$ party providers of Business Data firmagraphics, search engine average rating 408; Number of ratings 410; and 3$^{rd}$ party firmagraphic data 412, 414 and 416. The Estimator tool generates various calls per lead indexes including client, business category, and geographic indexes 418.

Figure 8:
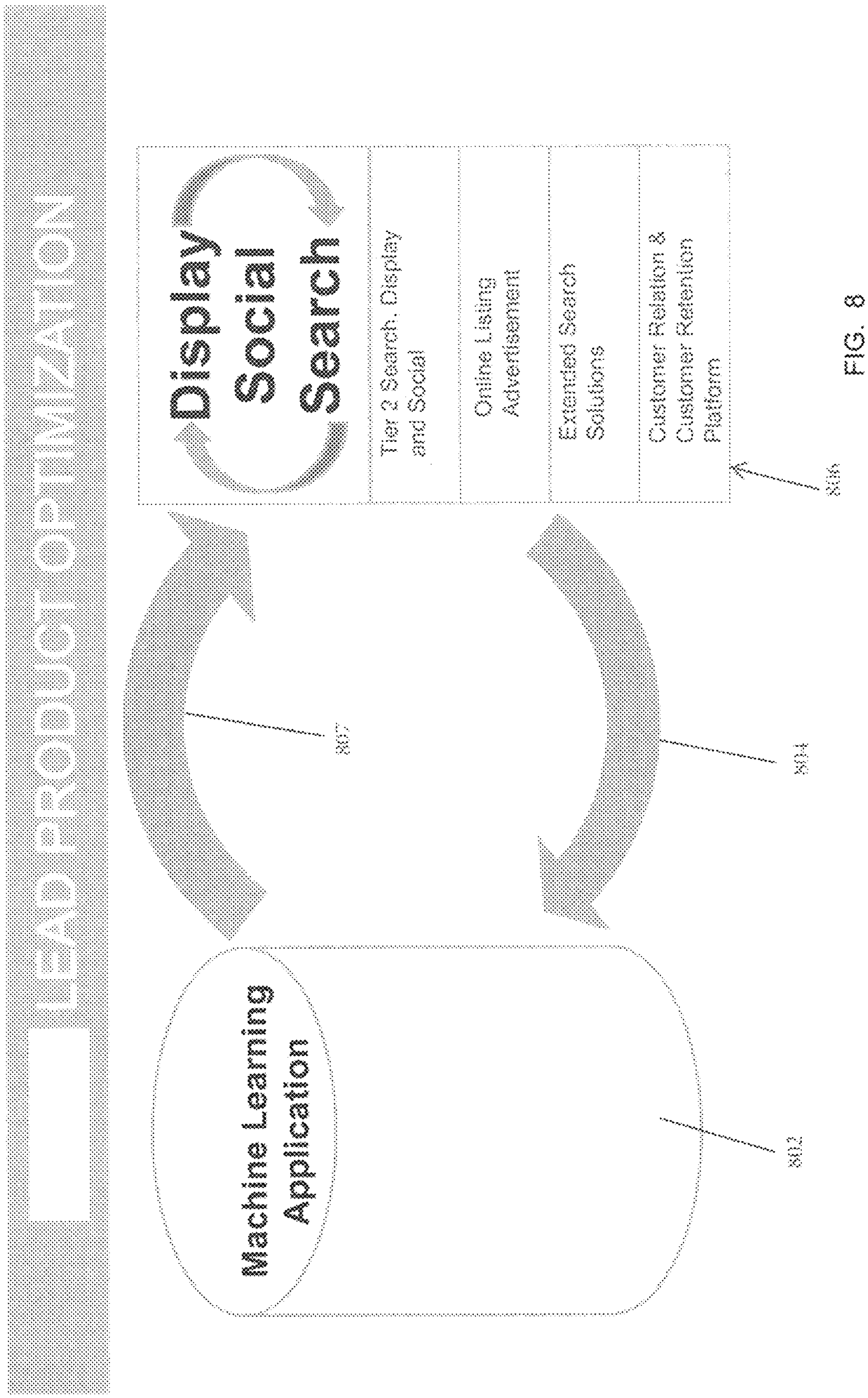
FIG. 8 is an illustration of a machine learning function for lead source product optimization.

FIG. 8 illustrates the machine learning function for lead source product optimization. As illustrated, the machine learning tool 802 receives all of the lead source data 804 from the plurality of lead sources 806 and the machine learning tool takes the data and generates a better model for estimating leads and the machine learning tool transmits 808 updated learning tool input based on previously stored data.

Figure 9:
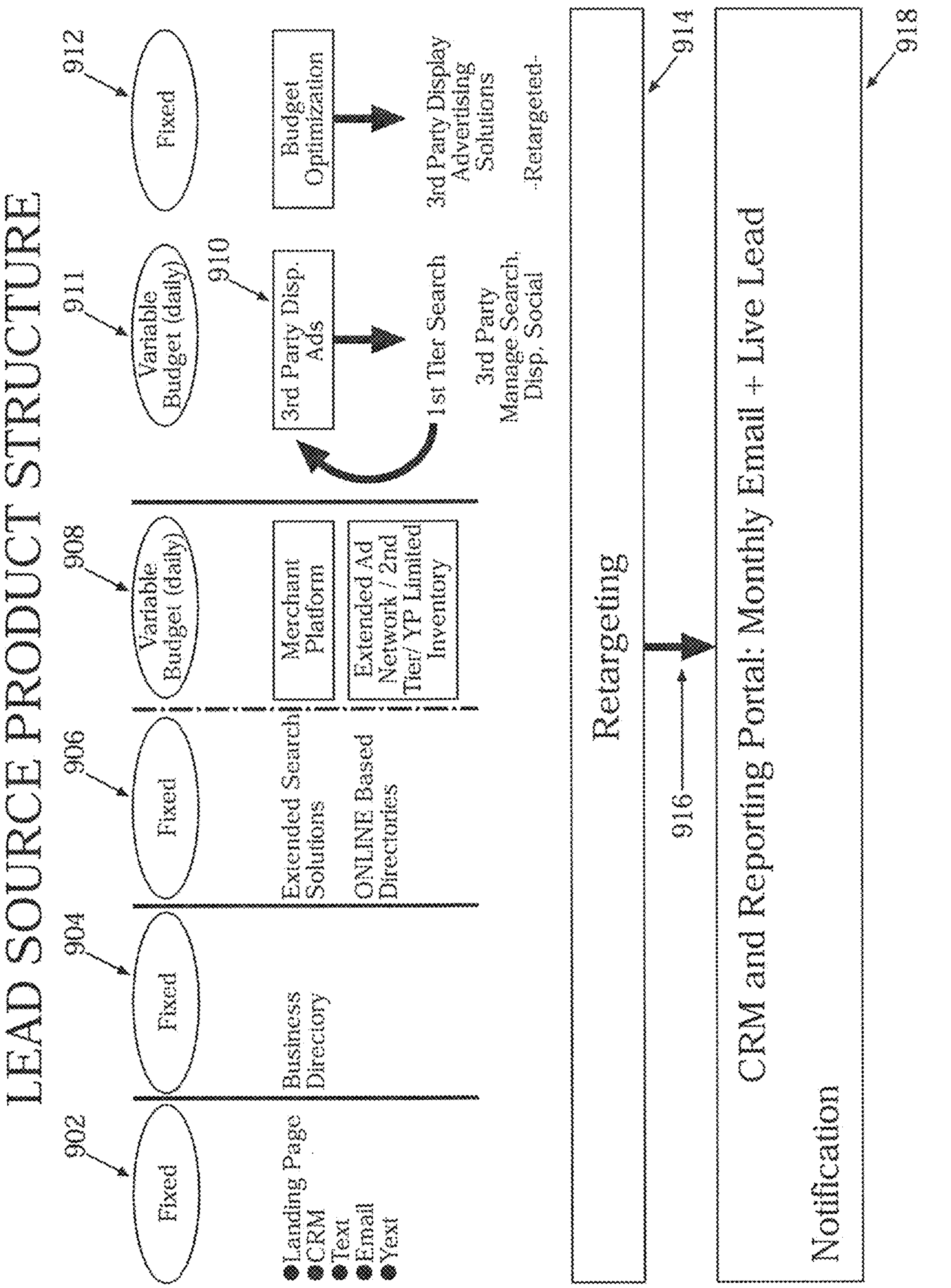
FIG. 9 is an illustration of the lead source product structure.

FIG. 9 illustrates the lead source product structure. On the landing page 902, the client relationship management interface provides for text, email and other client relationship management functions. The estimator tool also has at its disposal fixed business directories 904 as well as online business directories 906 with extended search solutions. There is also a lead source merchant platform 908 for accessing 3$^{rd}$ party extended ad networks, Tier 2 search engines, and other inventory. For one implementation of the technology, 3$^{rd}$ party service provider lead sources 910 is leveraged including 3$^{rd}$ party Tier 1 search engines, Display Ads and Social Media 911 and 912. The budgets for the lead sources can be fixed or variable. Retargeting 914 is communicated 916 to the client relationship manager 918 for reporting.

Figure 10:
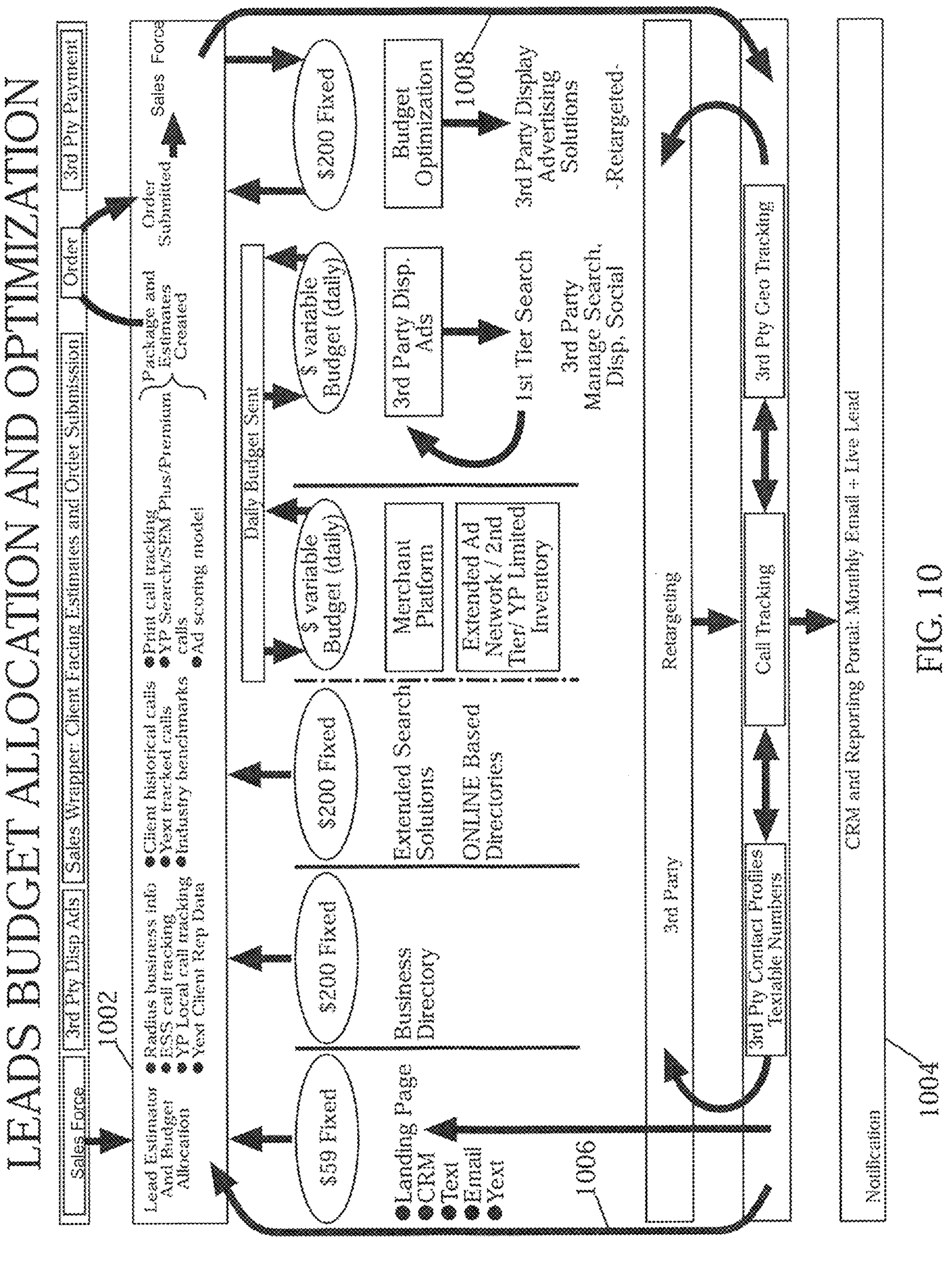
FIG. 10 is an illustration of a lead source budget allocation and optimization.

FIG. 10 illustrates lead source budget allocation and optimization. The lead estimator tool and budget allocation tool layer 1002 is added to the lead source product structure as illustrated in FIG. 10. A call tracking and geo tracking functional layer 1004 has also been added. The tracking 1006 and estimations 1008 are part of a feedback loop for continuous refinement of the estimator model. 3$^{rd}$ party contact profile are also accessed and feed into the client relationship manager. This model illustrates a fixed budget for text, email, business directories and online directories. The budget varies daily for the internal merchant platform and the 3$^{rd}$ Party platforms. Third party contact profiles are tracked, along with call tracking and third party geo tracking. The tracking allows for retargeting certain prospect contacts. The sales force business look up engine residing on a client side server accesses business data such as name off business, address and telephone number. Once logged in, a search tool is displayed on the user interface where the sales representative is prompted with an entry element/entry field, where the sales representative enters the name of a business or a contact for the business for an existing or a prospective client. The sales force user interface initiates and transmits a business query and/or to retrieve the business's firmagraphics (the demographics for the business) responsive to the sales representative's entry. The query is transmitted to and received by a business data server, which retrieves the business's firmagraphics from a business data server's database if the business entered by the sales representative already has stored firmagraphics in the firmagraphics database.

For one implementation of the technology, the business data server also accesses the Application Interface (API) management layer, or data exchange, and transmits the business query through the API management layer to a 3$^{rd}$ party business firmagraphics provider and retrieves a response from the 3$^{rd}$ party provider containing the business's firmagraphics, target buyers and lead scoring information. For one implementation of the technology, the API layer is provided by a data exchange, which is a system and process of taking data structured under a source data schema (in this case source data from 3$^{rd}$ party providers) and transforming the source schema into a data structured under the schema of the target (in this case the internal Estimator tool network environment), so that the target data is an accurate representation of the source data, while also being readily useable by the target. A data exchange allows data to be shared seamlessly between various servers/computers on a wide area network and between the various source and target program tools residing and operating at either the source or at the target. For one implementation of the technology, the data exchange may interface with a plurality of sources and targets, each having unique data formats or schema. The data exchange for one implementation includes an exchange format or interchange format for a single domain, and where the exchange includes routines that translate each and every source schema to each target schema by using the interchange format as an intermediate step. Leveraging a data exchange facilitates access to 3$^{rd}$ party data for use by the Estimator tool and any other internal enterprise tools processing on the internal enterprise server network.

Once the business firmagraphics has been retrieved, the sales force user interface displays a prompt, including a selectable display element to the sales representative indicative of the business firmagraphics being retrieved. The selectable display element when selected by the sales representative through the sales force user interface initiates the creation and transmission of a message including a sales representative I.D., a business/client I.D. and the business firmagraphics, including Name, Address and Phone Number (NAP). For one implementation of the technology, the message is transmitted to and received by an Estimator Tool residing and executing on the Estimator Application Server and database. For one implementation, the message is transmitted in URL parameters through the data exchange API endpoint. The sales force user interfaced tool operating in the desktop type environment on the mobile device prompts the data exchange to create a unique message I.D. that is included in the message to Estimator Tool. Once the message is transmitted, the sales force user interface redirects to a new site and displays a main landing page while the Estimator tool inputs the data from the message, transmit the data through the data exchange to a server side third party server, and performs the estimation.

The Estimator tool includes a learning function that executes and performs a machine learning analytics algorithm on historical lead performance data. The machine learning function processes on the server and inputs the performance data into the Estimator tool. The estimator tool also includes lead source budget allocation modeling tool that is processing on the server, which models various different allocations across categories and individual lead sources or channels and utilizes regression algorithms to optimize the allocations and budgets across lead sources. The regression analysis is a form of a predictive modelling technique which investigates the relationship between a dependent (lead target) and independent variable (s) (lead predictor). This technique is used for forecasting, time series modelling and finding the causal effect relationship between the variables.

Responsive to receiving data from the Estimator Application server relating to business firmagraphics as provided by sales force, a third party campaign creation server generates a third party campaign package of categories relating to relating to search, display and social for the identified business firmagraphics. The third party campaign package of categories is passed back through the data exchange to the Estimator Application server on the client side. The Estimator tool creates a unique estimate and budget allocation customized and packaged for the selected business/client, which includes both the third party categories and the in network client side lead sources. The Estimator tool passes an estimate and budget allocation back, along with the client fields, through the data exchange to the third party provider on the server side. The estimator server tool automatically accesses the API management layer 108 through which the data exchange passes the estimate and budget allocation, the unique desktop I.D. that was created and the business informatics to a 3$^{rd}$ party server, which provides display advertising solutions based on business firmagraphics.

The estimator tool and budget allocation tool 3$^{rd}$ party service receives the combined campaign including third party lead source platform categories and internal lead source platform categories and the third party platform creates a campaign user interface presentation of a campaign to be implemented across various lead sources, geographic demographics and display ads, where the presentation includes lead estimates and budget allocation. The third party server populates a user interface with multiple campaign package options including lead estimates and budget allocations.

FIGS. 11A, 11B and 11C are illustrations of the summary display presented to the sales representative which provide a summary of the proposed campaign package, the lead estimates and options for maintaining, growing or leading in a category. For one implementation of the technology, the summary display user interface provides a main navigation tool bar that provides navigation elements that can be selected for navigation to a different view where the user interface is populated with the appropriately formatted information. With the implementation presented, the navigation bar provides a Consumer, Content, Budget, Cart and Result navigation elements. As illustrated the budget allocation element is selected. In this view, the lead estimates are provided for the three levels, Maintain, Grow and Leader. The bottom window presents the estimated leads by category, the return on investment and the campaign lead source mix. A user interface element is also provided that can be selected to start or initiate a campaign. There is also an active user interface element that provides a slider button for increase or decreasing overall budget allocation. The user selects the user interface element and slides the button to the right to increase the budget.

From the client entry screen of the sales force user interface data field are captured based on entries by a sales representative and a Client I.D. and an Opportunity I.D. is generated. A typical data format is illustrated in FIG. 12. The data is retrieved from the desktop type environment on a mobile device.

A $3^{rd}$ party service provider which provides display advertising solutions based on business firmagraphics has access to an Enterprise Storage Server (ESS) via an API management layer. The $3^{rd}$ party provider makes an API call to read an ESS listing data from a Content Assistant database for preview purposes. The $3^{rd}$ party service provider displays to the user via the sales force user interface at least a portion of the listing data to provide a preview of how a customer listing would appear on the directory pages. The format of the data accessed is illustrated in FIG. 13.

The Estimator tool provides three estimation packages, one where the business wants to grow their number of leads ("grow"); one where the business wants to maintain current level ("maintain"); and one where the business wants to dominate having more leads than others ("dominate"). The packages will provide the cost per 1,000 impressions (CPM); the cost per click (CPC); cost per lead (CPL), minimum budget; maximum budget; and starting budget. The data format specification is illustrated in FIG. 14.

When the user/sales representative has completed the review and selection of the package with the customer, the $3^{rd}$ party service provider server, which provides display advertising solutions, will call the checkout endpoint and send all relevant information back through the API management layer data exchange to the Estimator server, which will initiate the customer checkout, including provision numbers and any other data settings needed for launching the campaign. The data format specification is illustrated in FIG. 15.

Once the customer payment process is complete, an API through the data call is made through the data exchange to initiate the campaign with $3^{rd}$ party providers as well as with enterprise lead source solutions. The data format specification is illustrated in FIGS. 16 and 17.

Referring to FIGS. 18A thru 18D, and FIGS. 19A thru 19D, an illustration of a functional flow for campaign purchase and fulfillment respectively is provided. One implementation for a process to utilize the system includes a sales force user interface whereby a user is prompted with a display on a mobile computing device or other computing device, which provides search entry fields for initiating a search to look up business data. The user is provided the option to search by business name, contact name, business category, geographic category and other relevant categories. The user enters the search parameters and the sales force user interface initiates a query and search to a client information database. For one implementation, the sales force user interface also initiates a search and query to a third party provider of business data firmagraphics. The sales force user interface receives one or more search results providing a listing of one or more businesses resulting from the search. The user selects the appropriate business and the data is transmitted to the estimator and budget allocation server. For one implementation of the process utilizing the system, the sales force user interface function directs the user's mobile device or other computing device to a URL for a temporary landing page where basic marketing information can be provided that is useful for a sales representative who uses the tool for selling ad campaigns to clients.

While the temporary landing page is being presented, parallel processing is performed whereby the estimator and budget allocation server transmits the business data firmagraphics including geo to one or more third party lead source provider platforms. This business data is transmitted through a data exchange and requests the third party platform to create and provide an advertisement campaign package that is a combination of categories from the lead source channels that the third party platform has the ability to provide. The third party platform transmits the data representative of the campaign package back through the data exchange and to the estimator and budget allocation server. The estimator tool and budget allocation tool residing and executing on the server generates lead estimates and optimized budget allocations for the third party campaign package and in parallel and in combination with the estimator tool and budget allocation tool generates lead estimates and budget allocations for in-network lead source channels, thereby generating a combined set of lead estimates and budget allocations for a combined campaign which includes both external third party lead sources and in-network lead sources.

For one implementation, the complete estimate and budget allocation is transmitted from the estimator and budget allocation server through the data exchange to the third party platform. The third party platform receives the information and launches and populates a user interface at a defined web based URL. The estimator and budget allocation server further transmits a message to the user's mobile device or other computing device thereby redirecting the mobile device from the landing page to the third party providers site where the campaign data is presented for selection.

For one implementation, the user, who for example is a sale representative selling ad campaigns to businesses, shows the display of the mobile device to the client where the display graphically presents the proposed campaign including lead estimates and budget. Referring to FIGS. 11A thru 11C, the user is prompted with an active user interface element to select the campaign. If the campaign is selected, the user interface of the mobile device is redirected to a payment processing site where the payment is processed.

Once the payment is processed, the user is prompted with an active user interface element to select and launch of the campaign. If the active element for launch campaign is selected, the campaign fulfillment process is initiated with the third party and internal providers. Performance tracking is initiated and analysis of performance data begins.

Figure 19A:
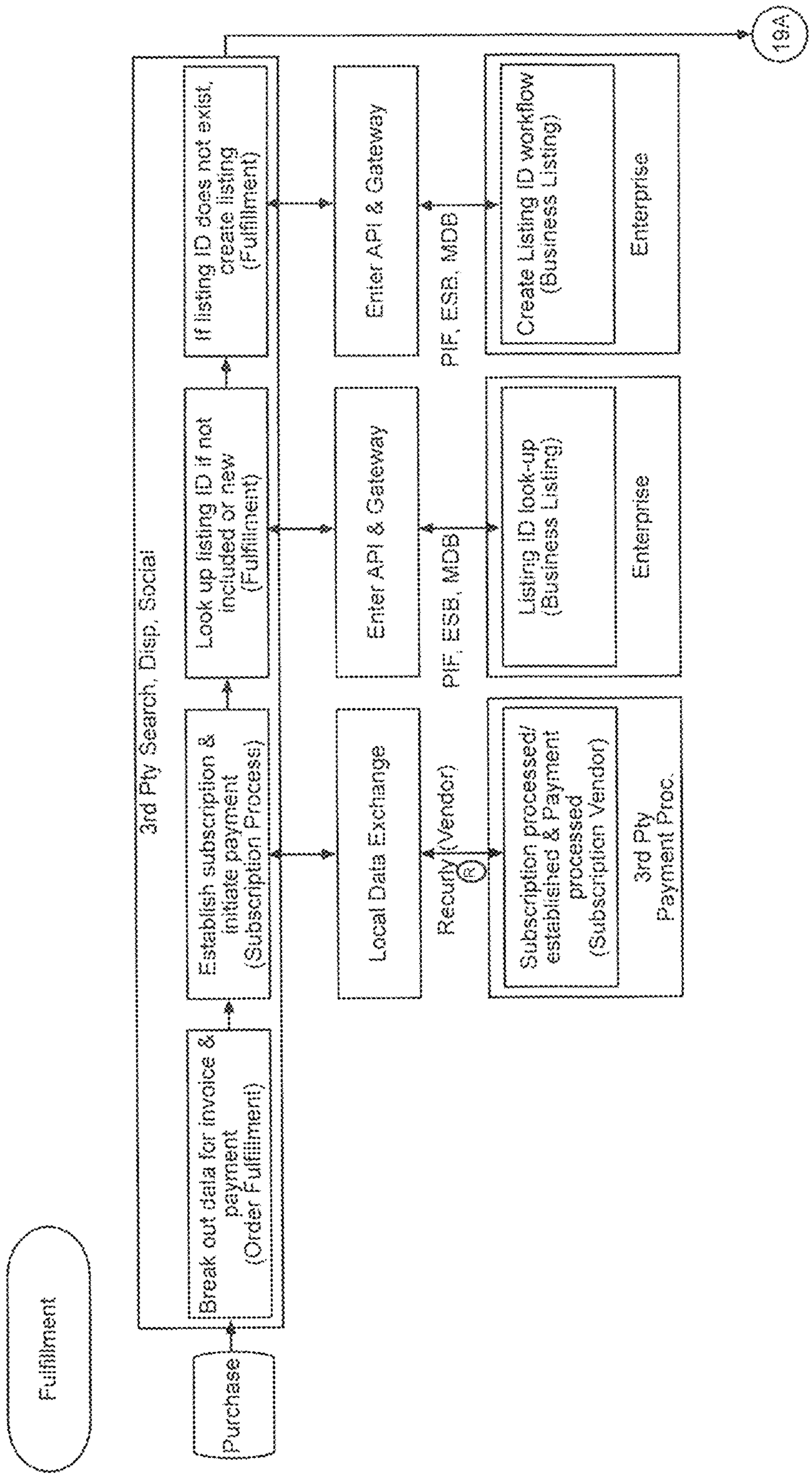
FIG. 19A thru 19D is an illustration of a functional flow for campaign fulfillment.
Figure 19B:
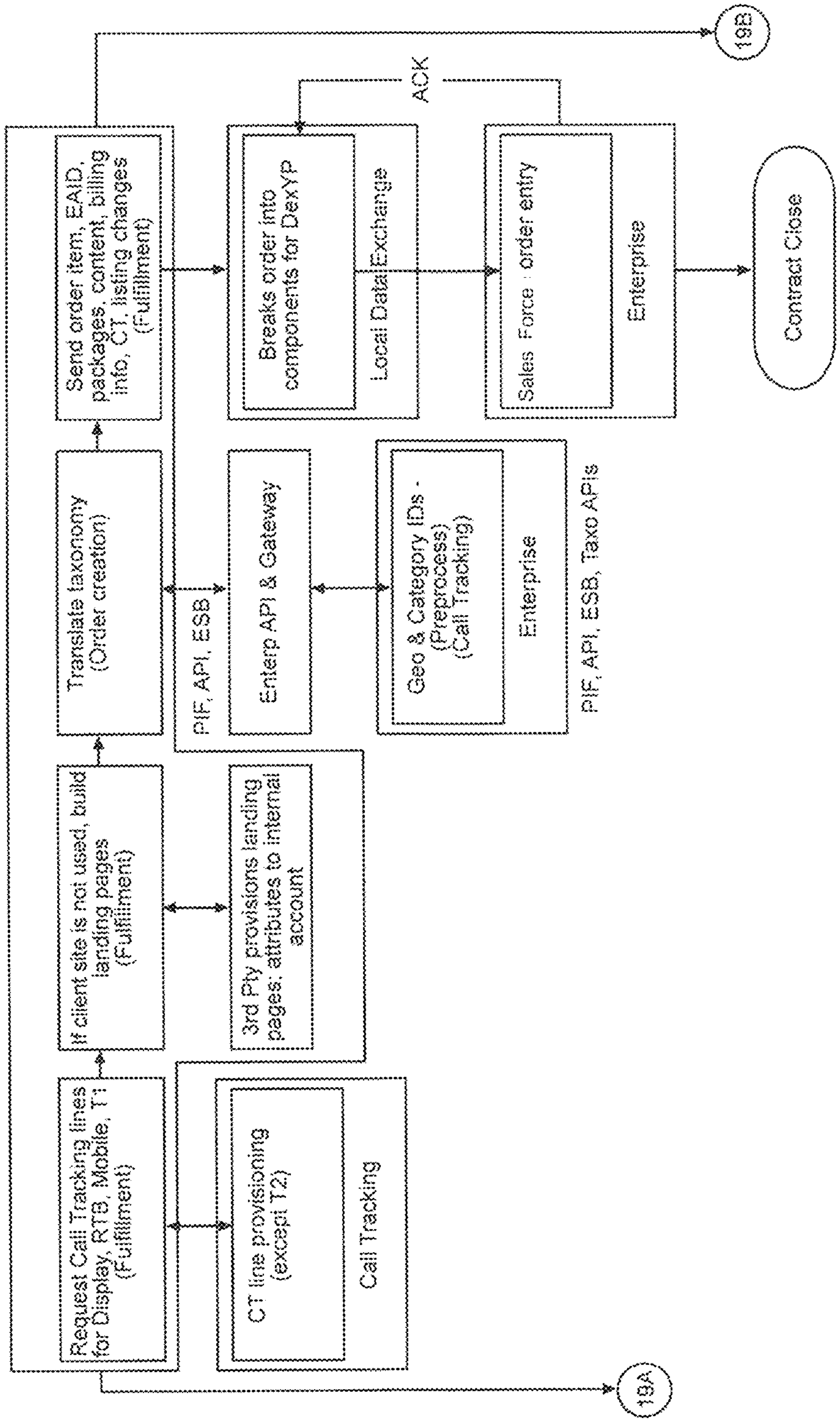
Figure 19C:
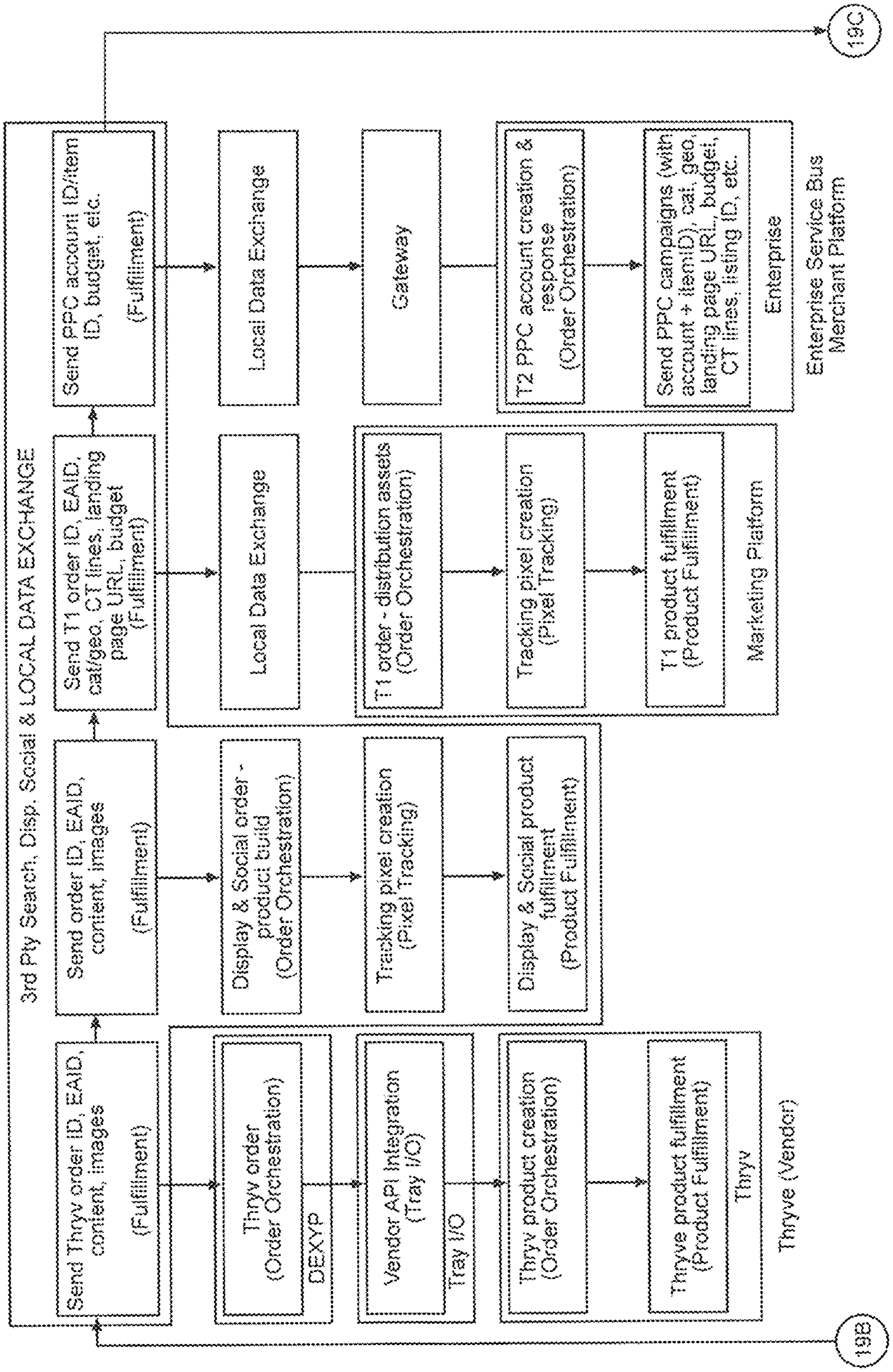
Figure 19D:
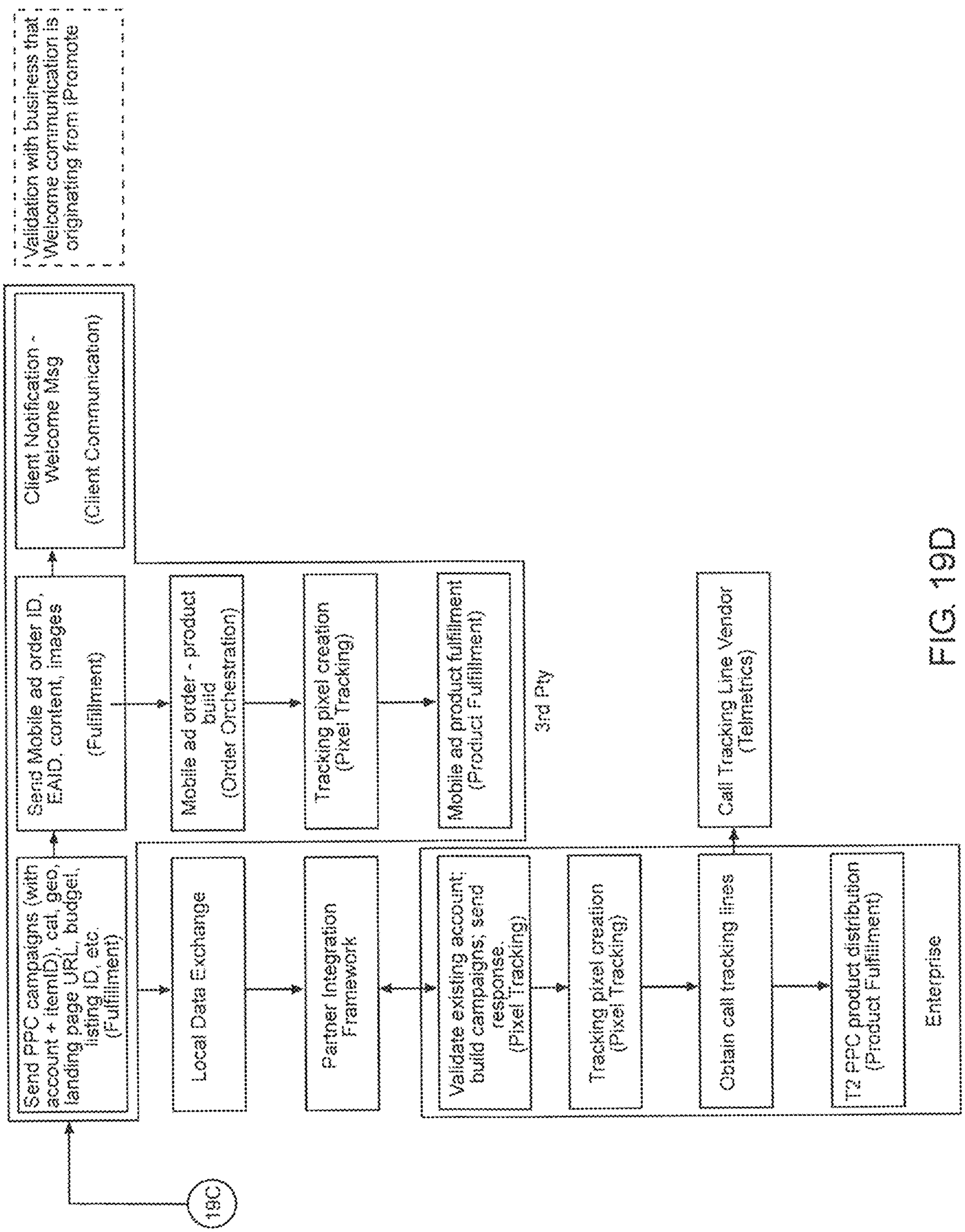

The sales force platform collects data and the enterprise system forwards the data through a data exchange to a third party platform. The 3rd party platform builds the campaigns and generates a user interface for an order entry form. The campaign information is transmitted through the data exchange to the internal enterprise server system network and the estimate engine gathers the campaign data and the historical performance data and calculates and stores the estimates. Any 3rd party lead source estimates are also provide through the data exchange for inclusion and processing by the estimator engine. The estimates are sent back through the data exchange and packages are presented on a user interface for user selection as illustrated in FIGS. 11A through 11C. Once the packages are selected by the user, the functional flow moves on to fulfillment as illustrated in FIGS. 19A through 19C. The 3rd party platforms in combination with the merchant and marketing platforms fulfill the order once the purchase is processed.

Figure 20A:
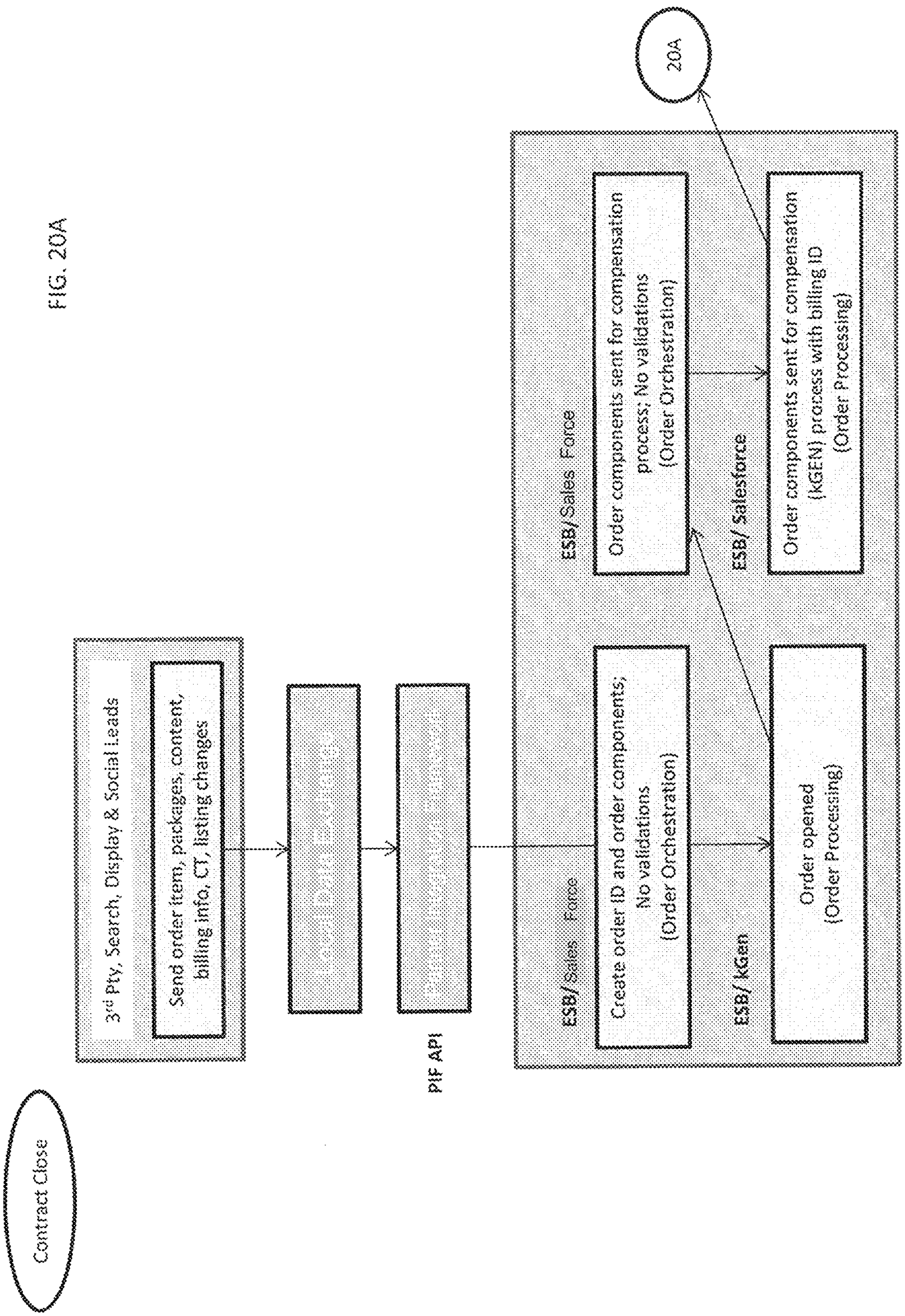
FIG. 20A thru 20C is an illustration of a functional flow for contract close.
Figure 20B:
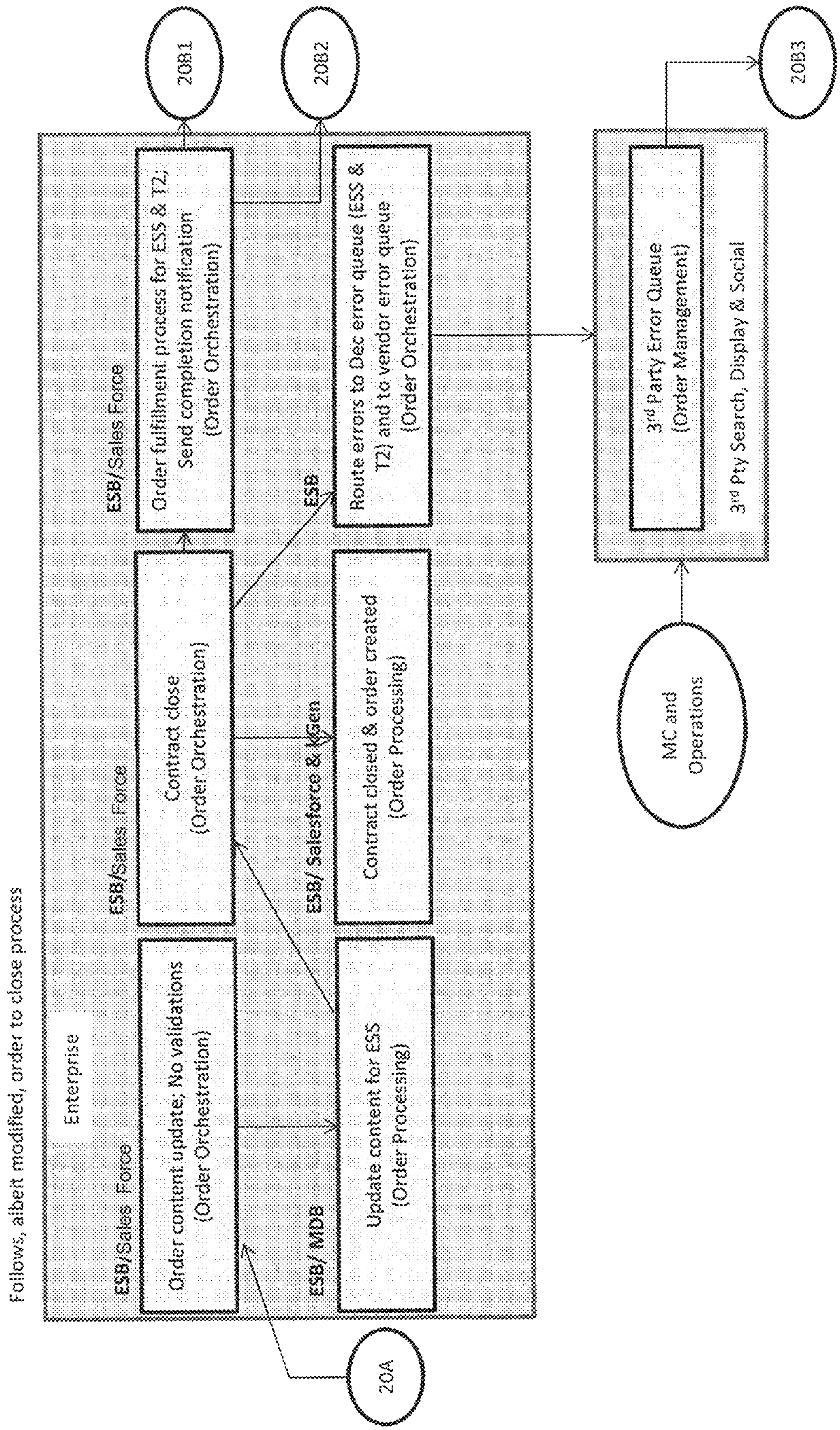
Figure 20C:
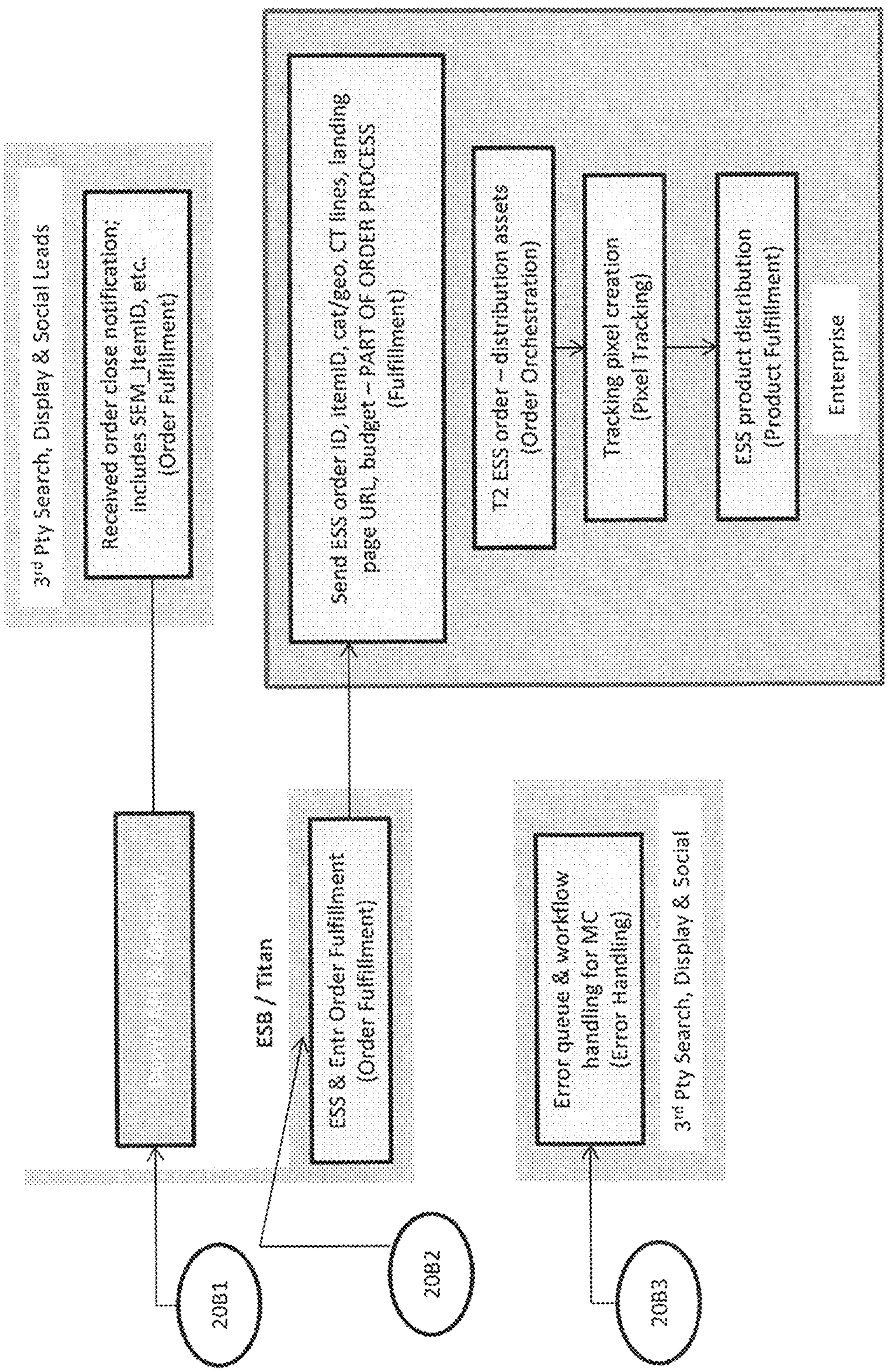
Figure 21A:
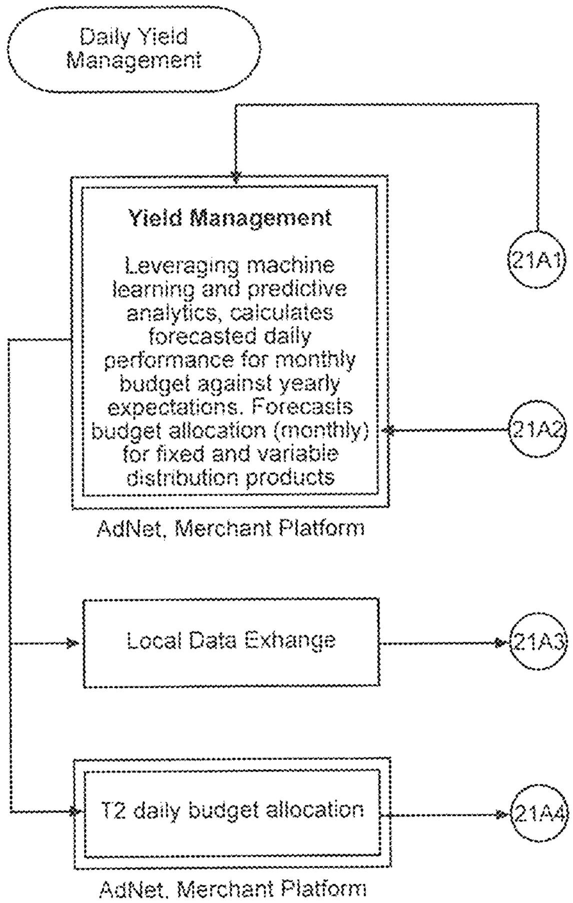
FIG. 21A thru 21D is an illustration of a functional flow for daily yield management.
Figure 21B:
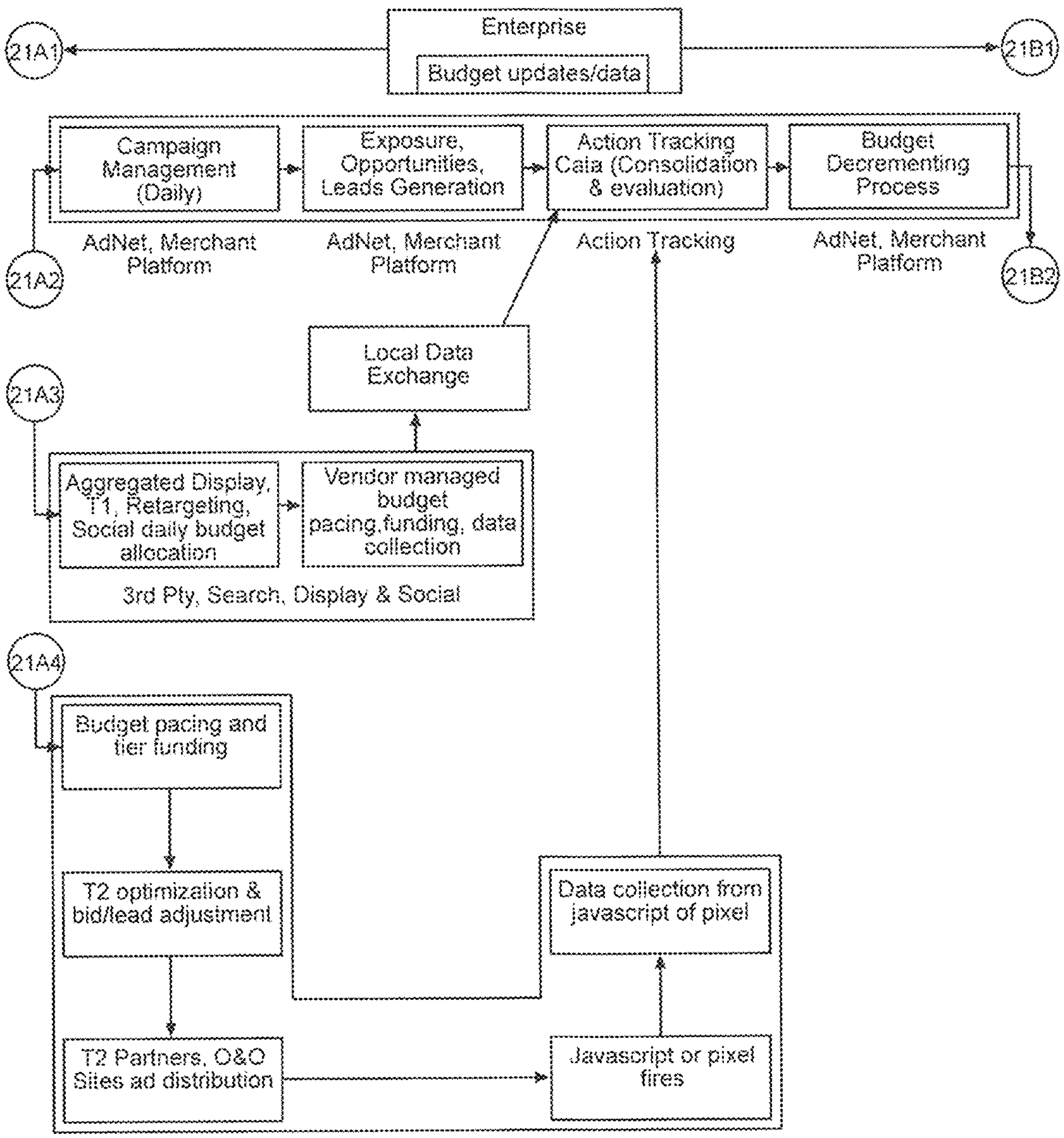
Figure 21C:
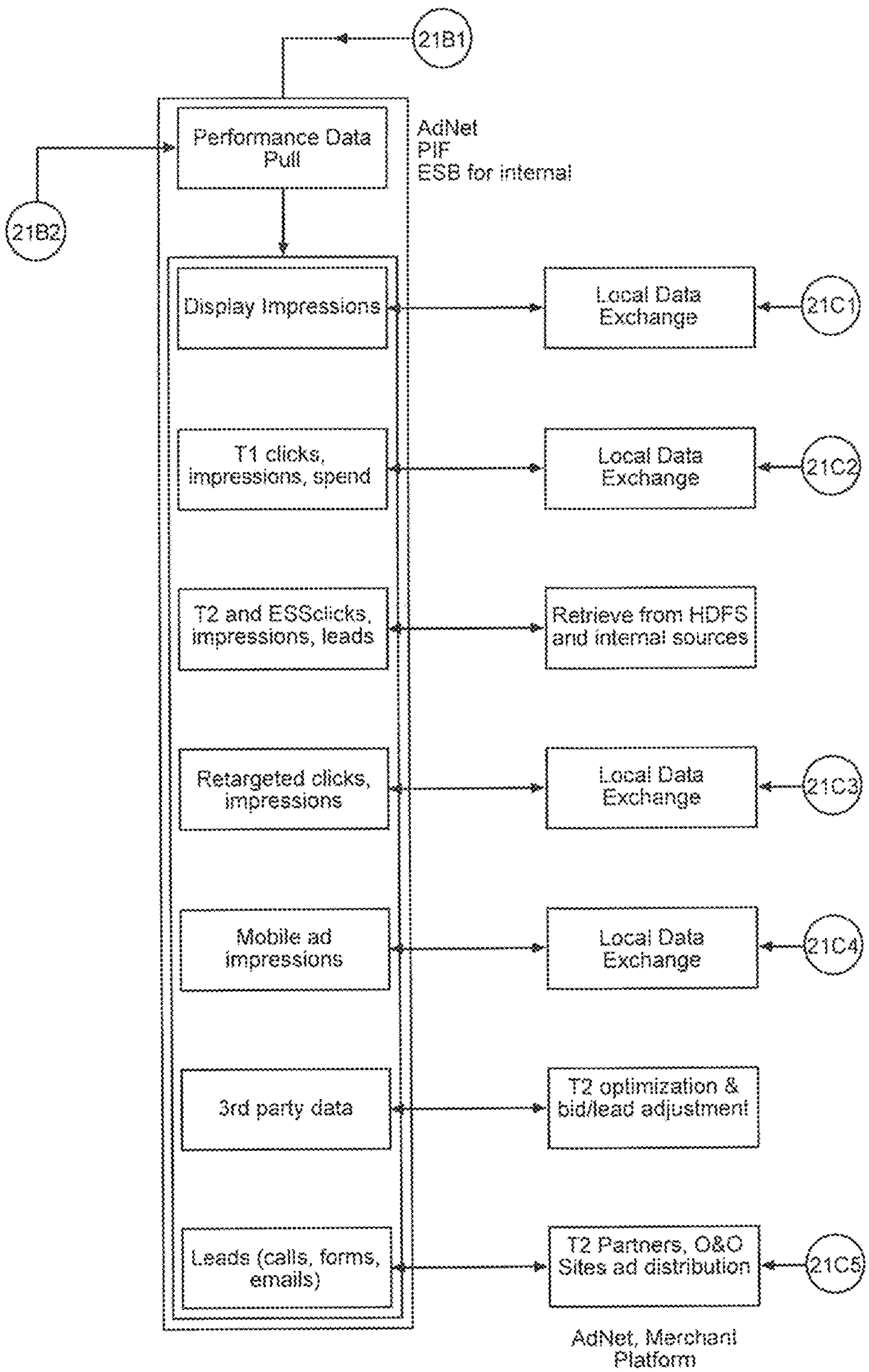
Figure 21D:
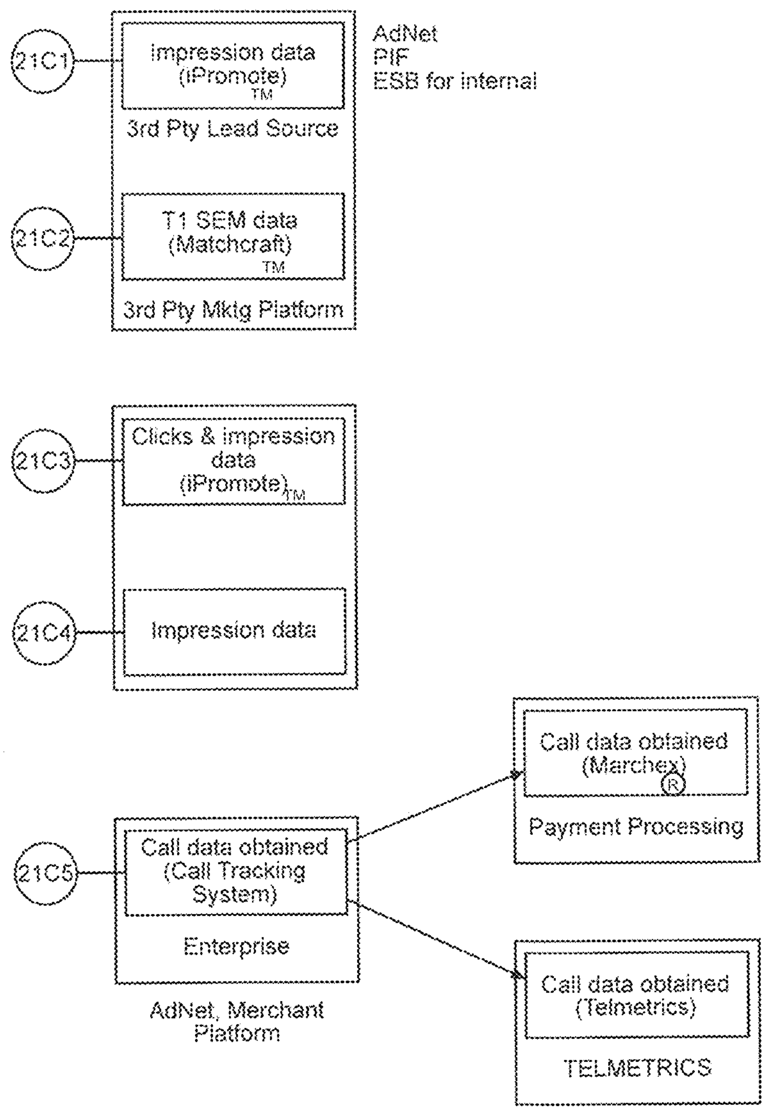
Figure 22A:
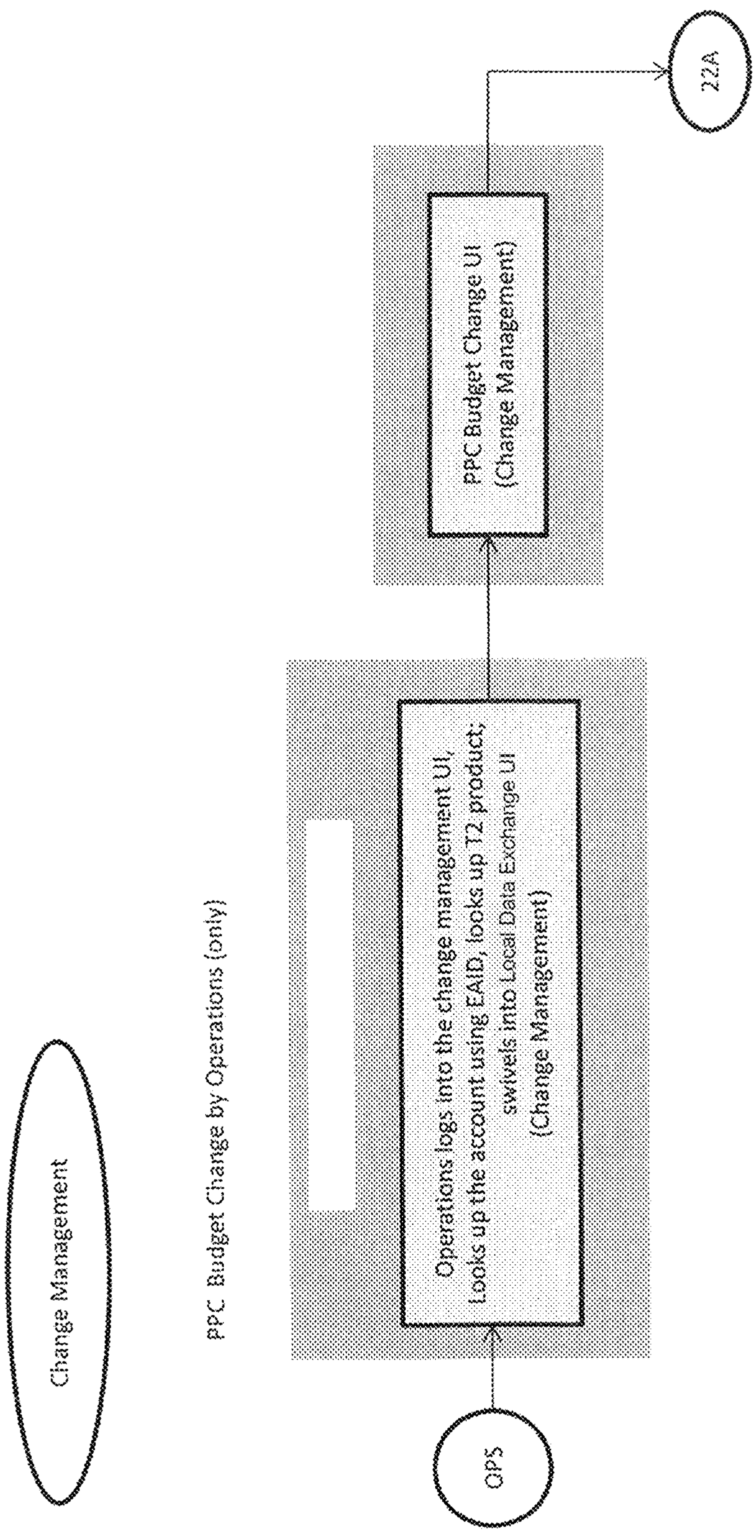
FIG. 22A thru 22C is an illustration of a functional flow for change management.
Figure 22B:
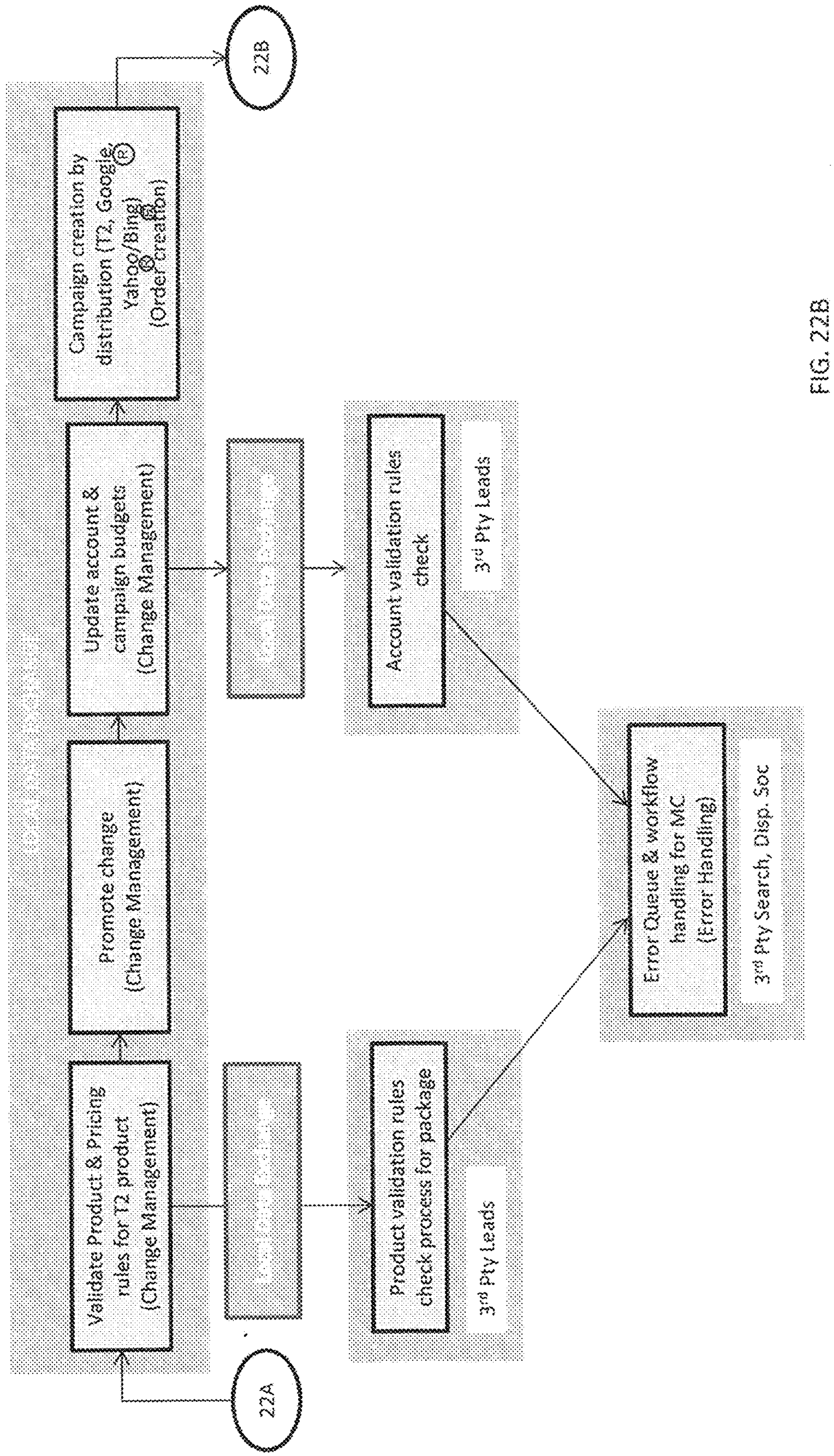
Figure 22C:
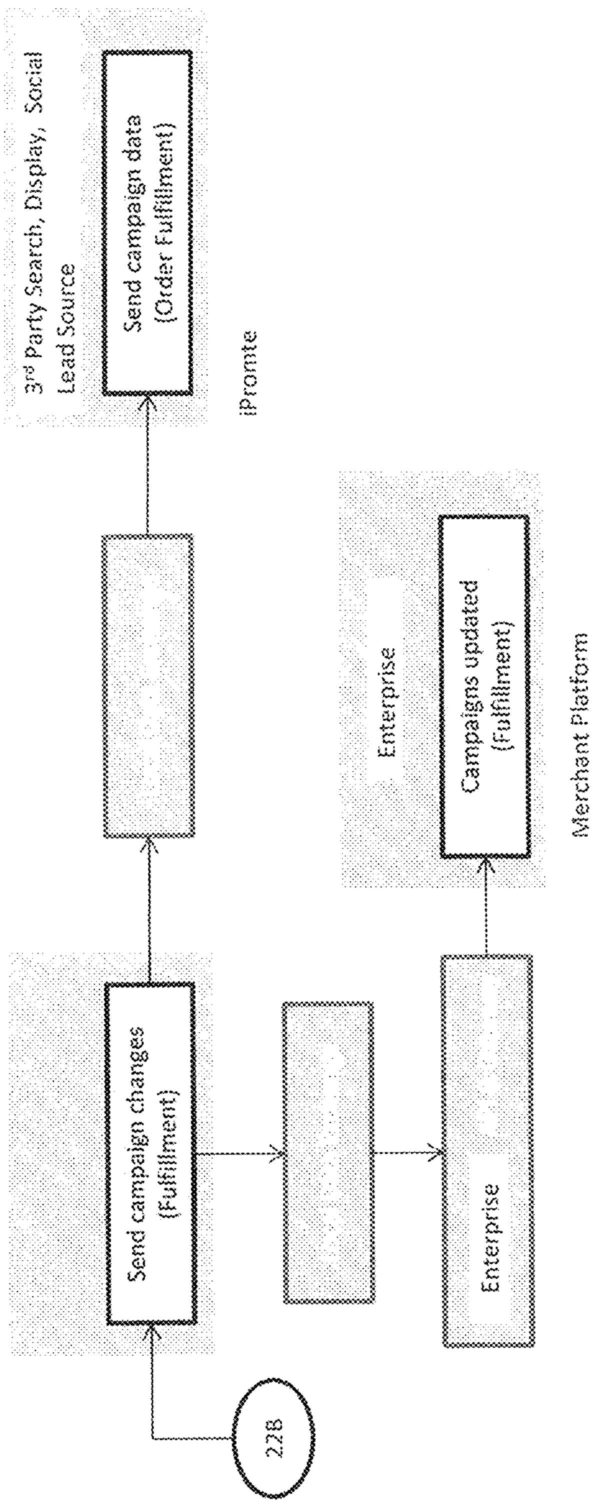
Figure 23A:
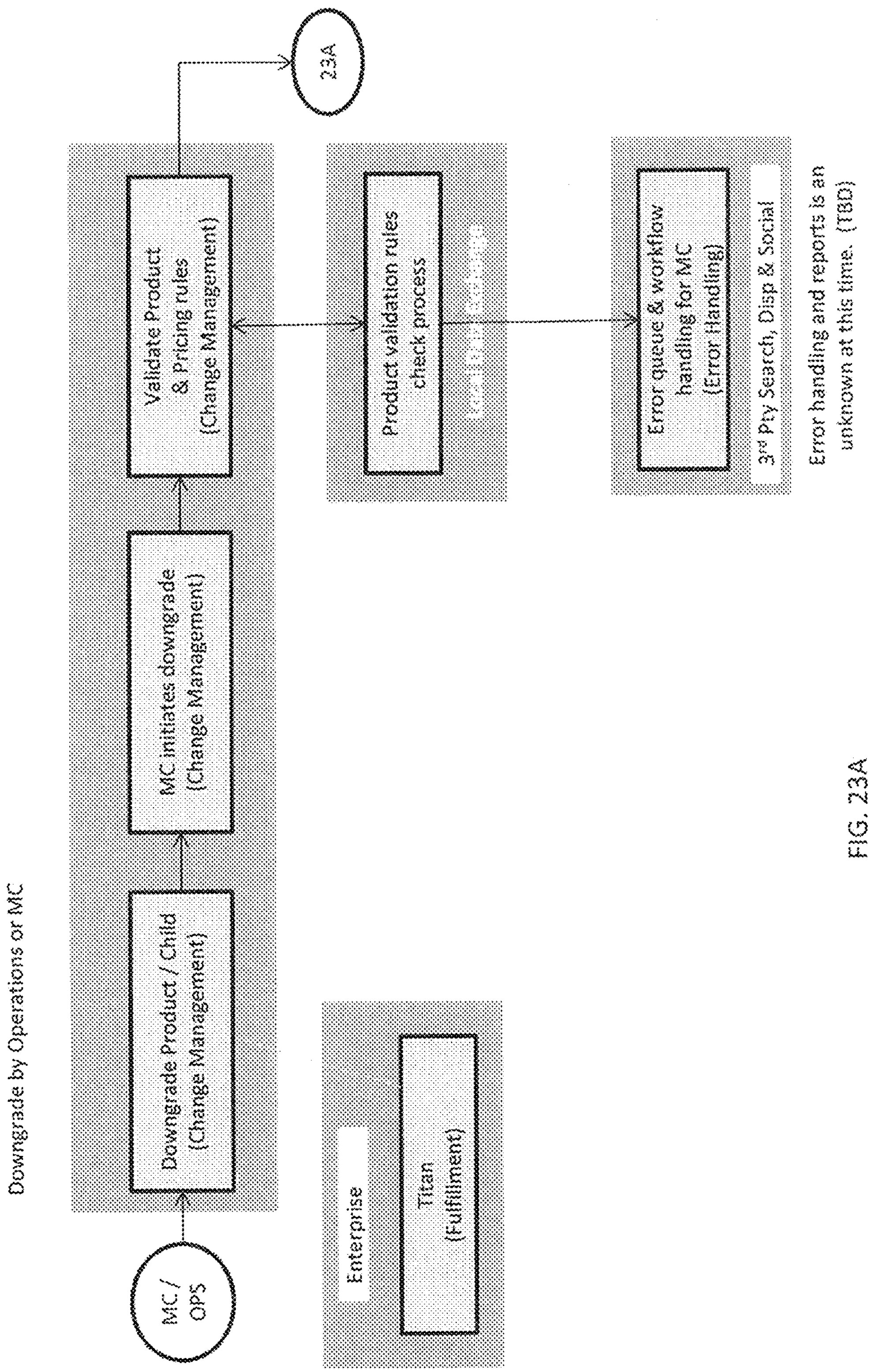
FIG. 23A thru 23C is an illustration of a functional flow for downgrade product budget allocation management.
Figure 23B:
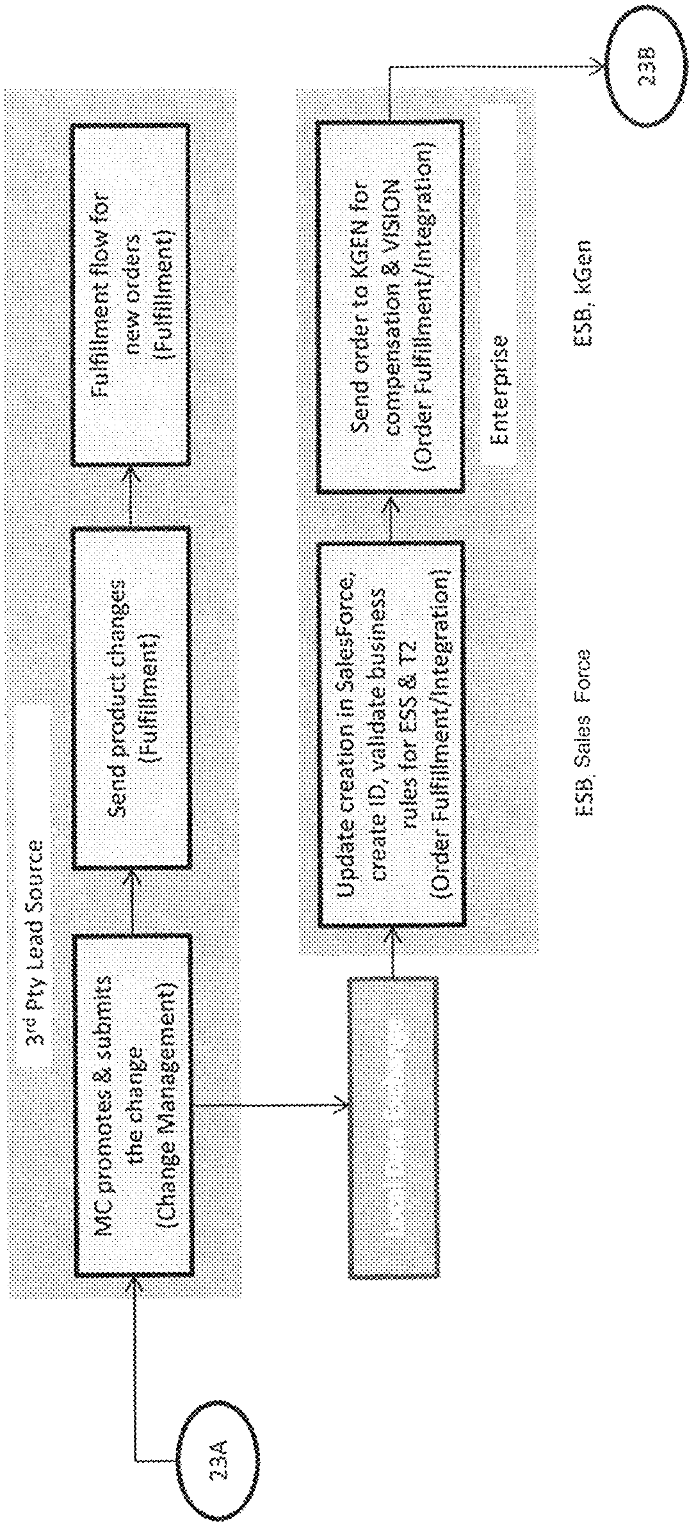
Figure 23C:
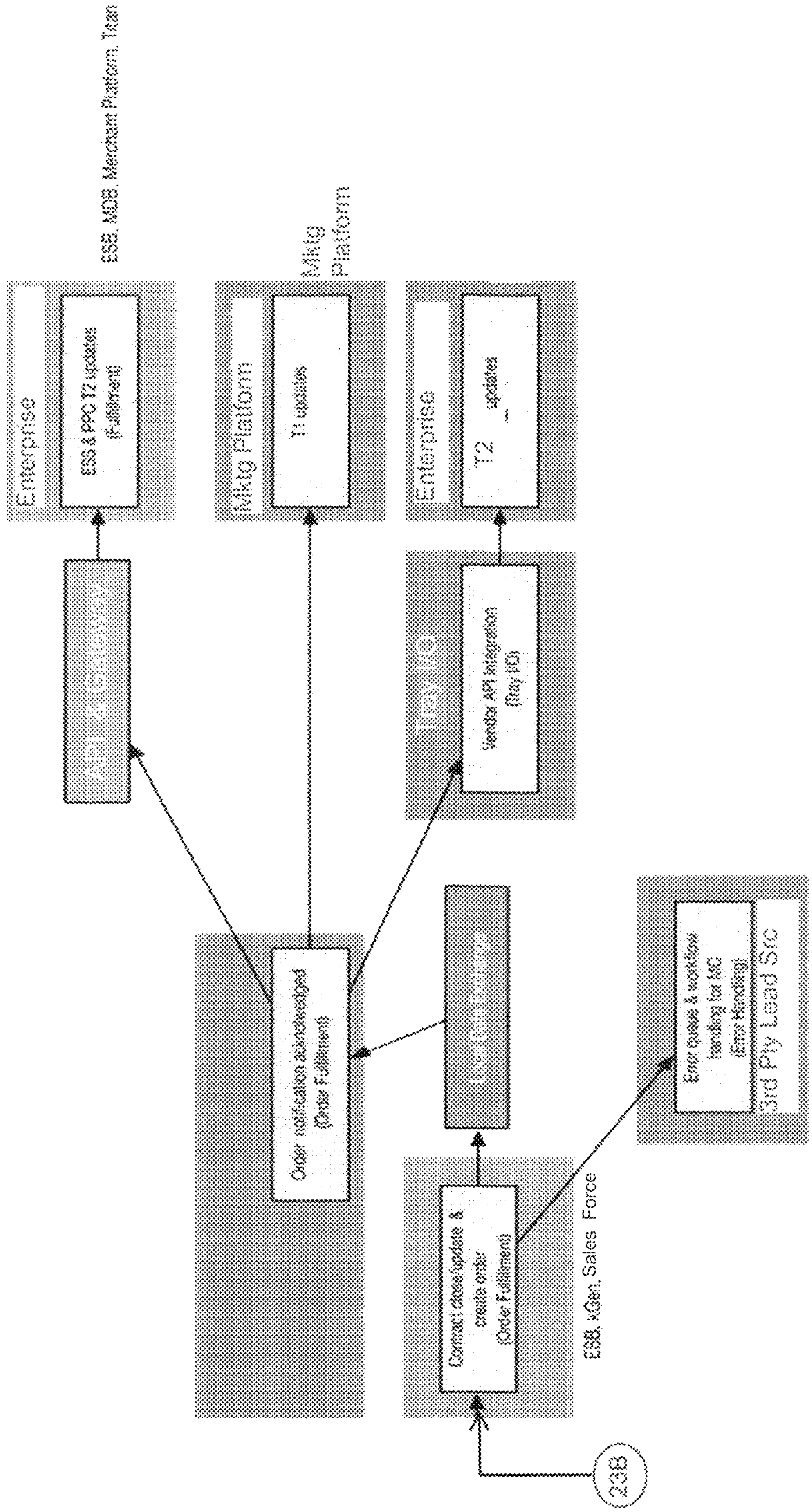
Figure 24A:
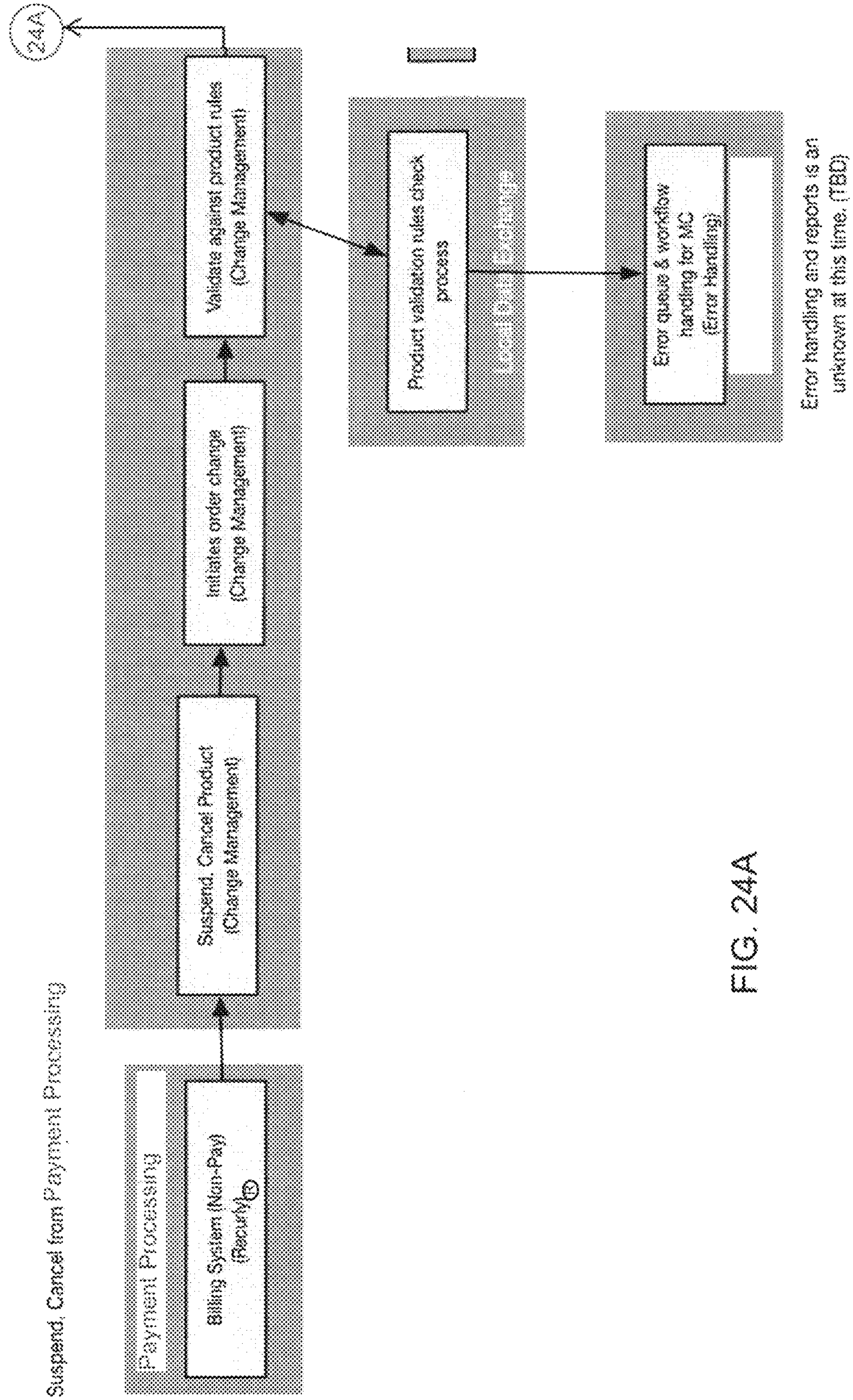
FIG. 24A thru 24C is an illustration of a functional flow for payment processing.
Figure 24B:
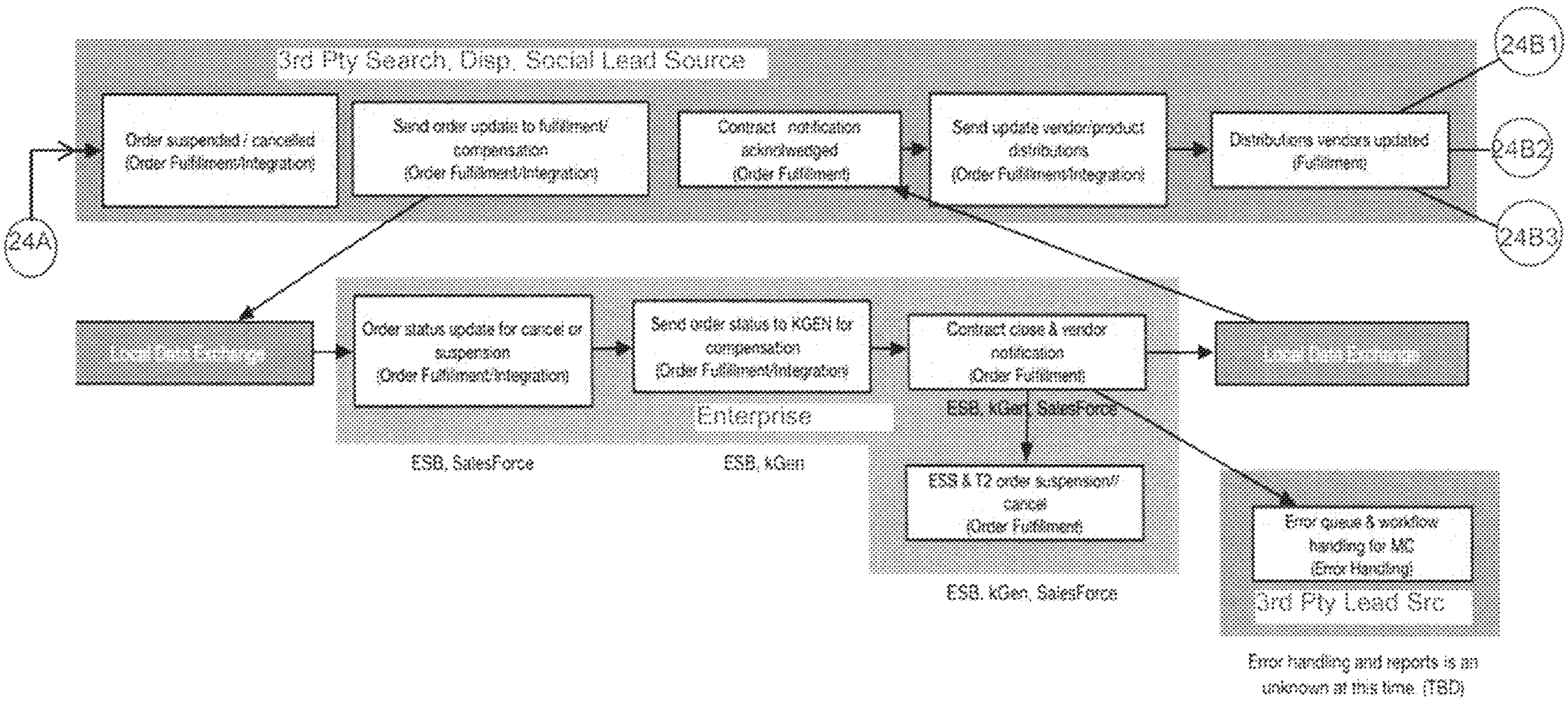
Figure 24C:
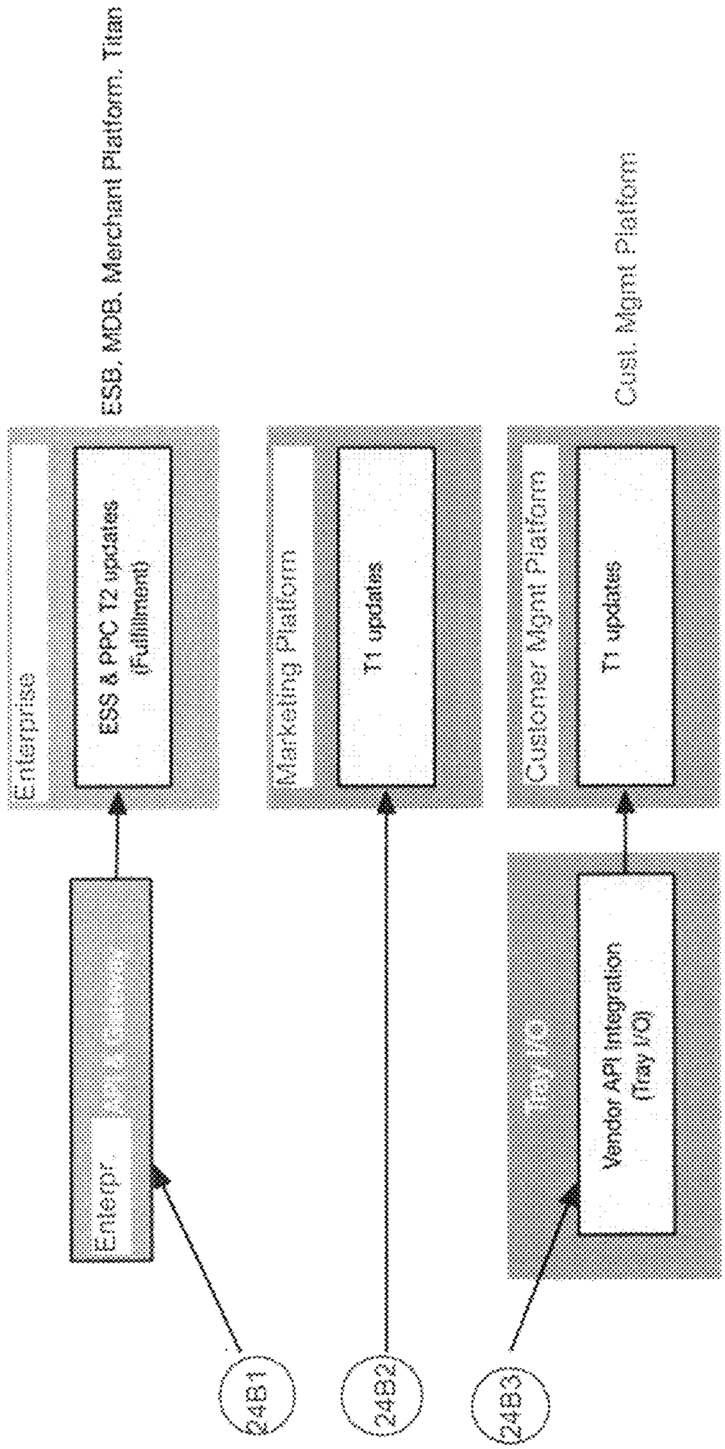
Figure 25A:
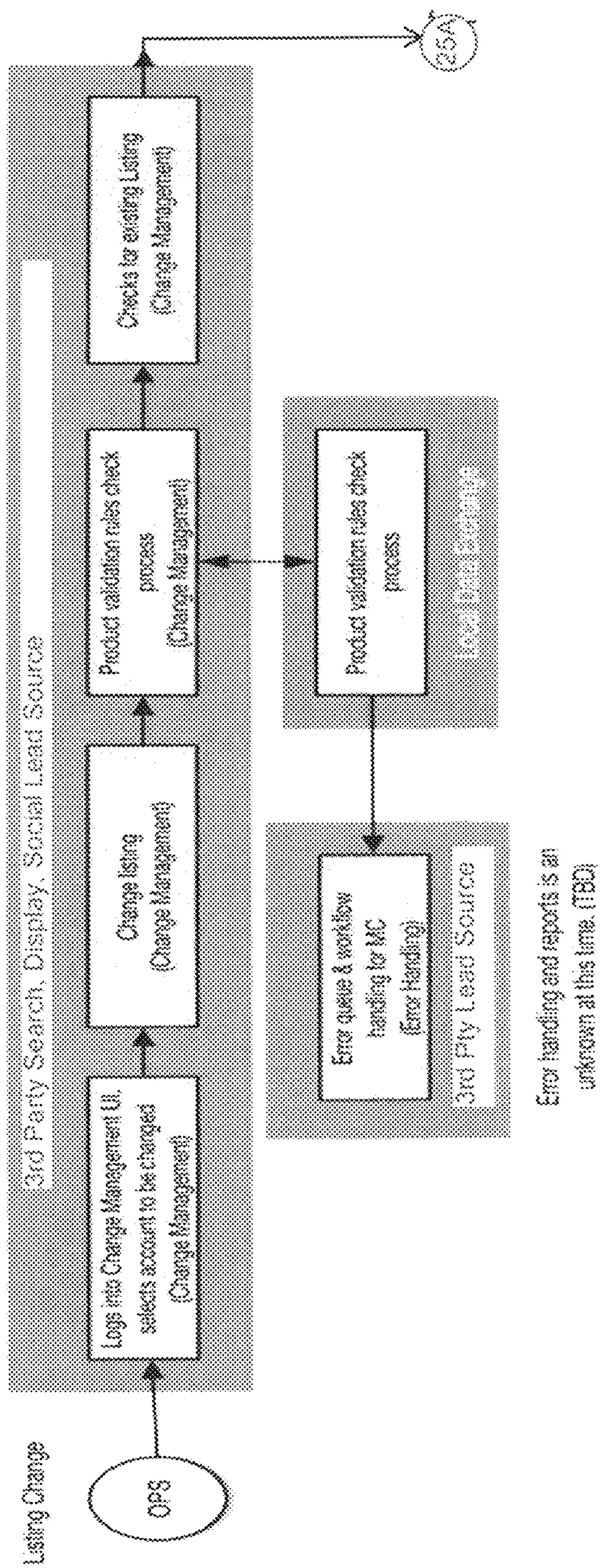
FIG. 25A thru 25D is an illustration of a functional flow for listing change.
Figure 25B:
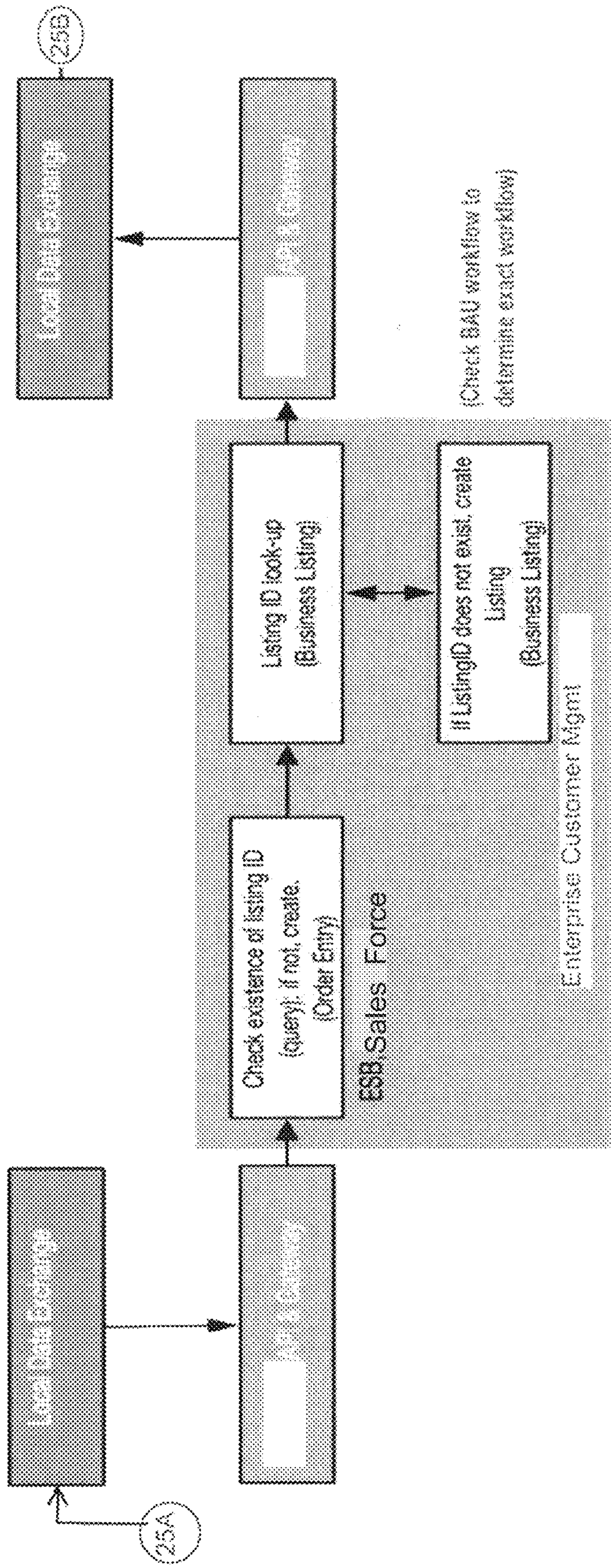
Figure 25C:
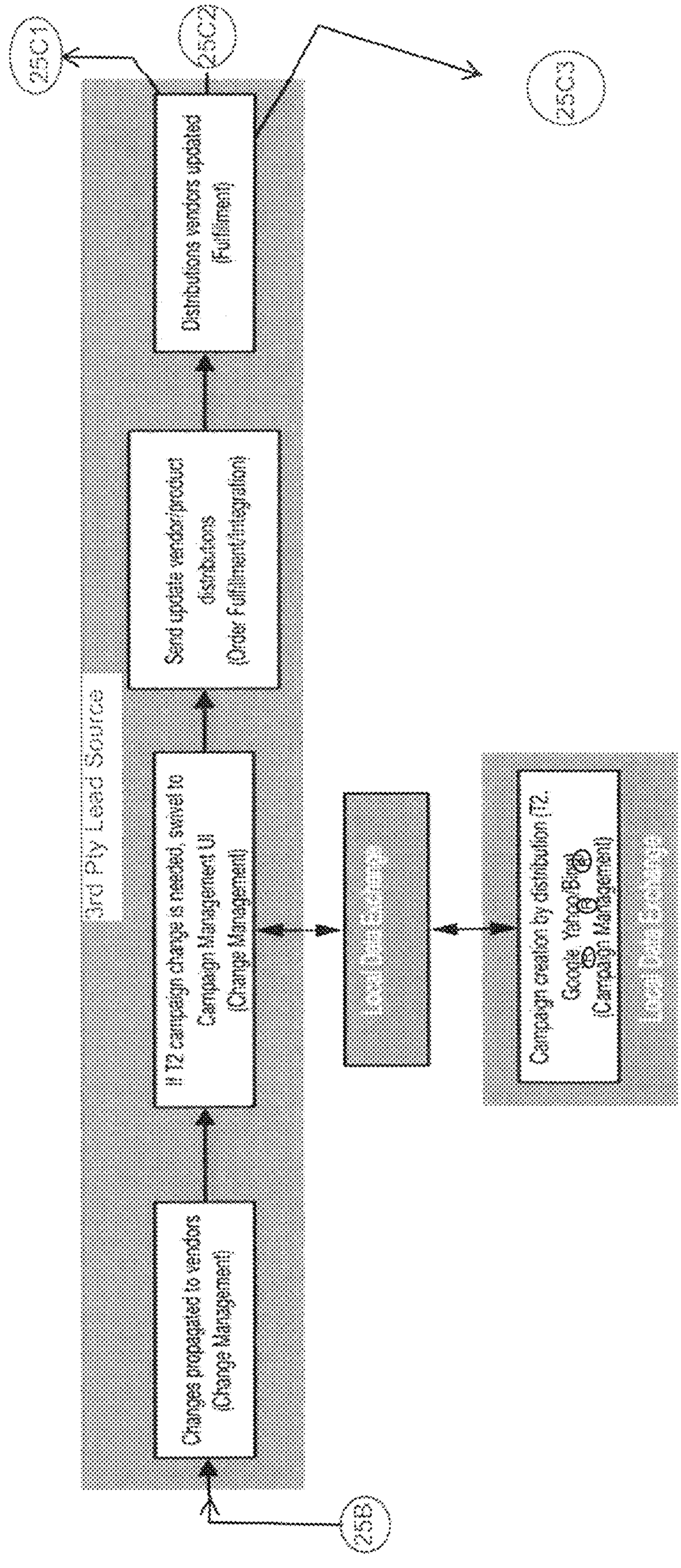
Figure 25D:
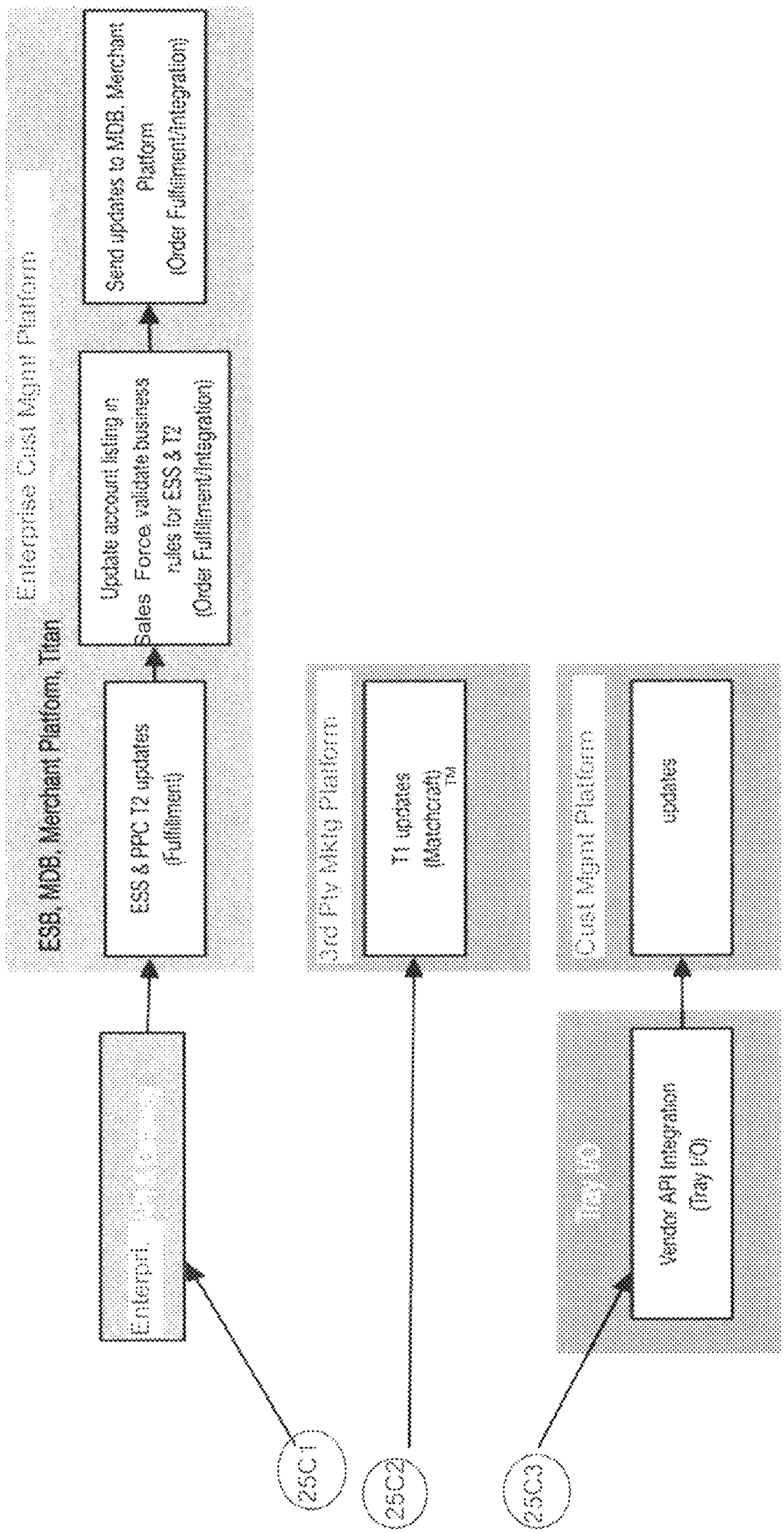
Figure 26A:
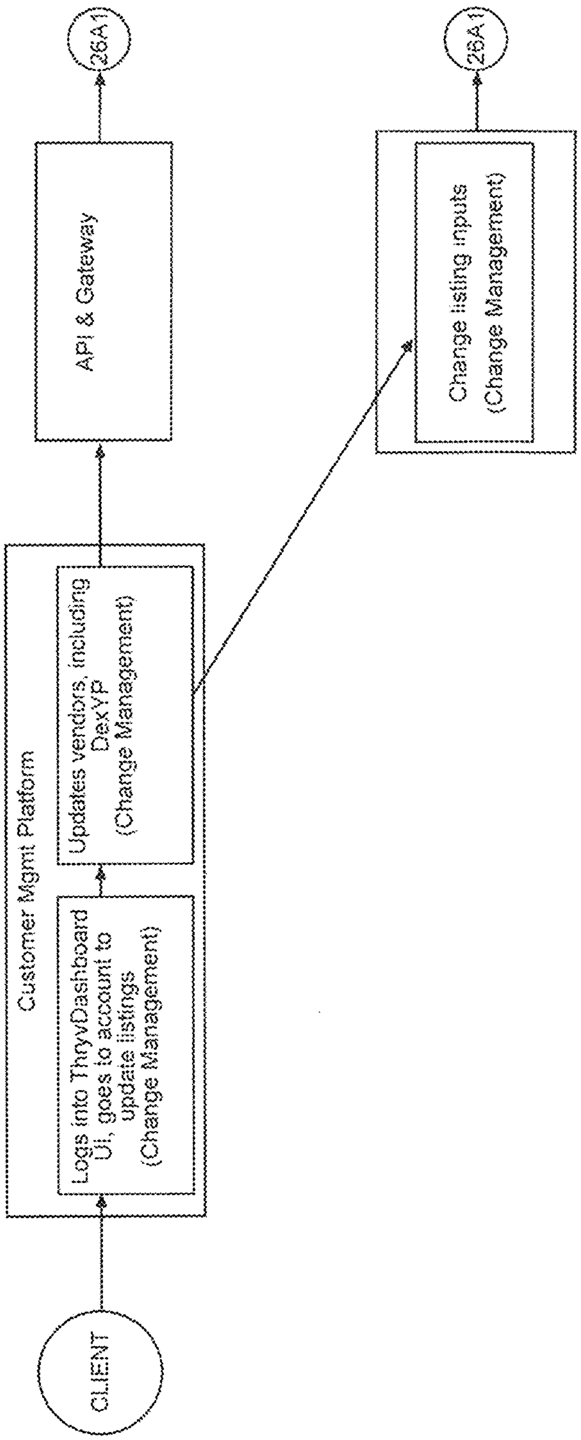
FIG. 26A thru 26D is an illustration of a functional flow for updates.
Figure 26B:
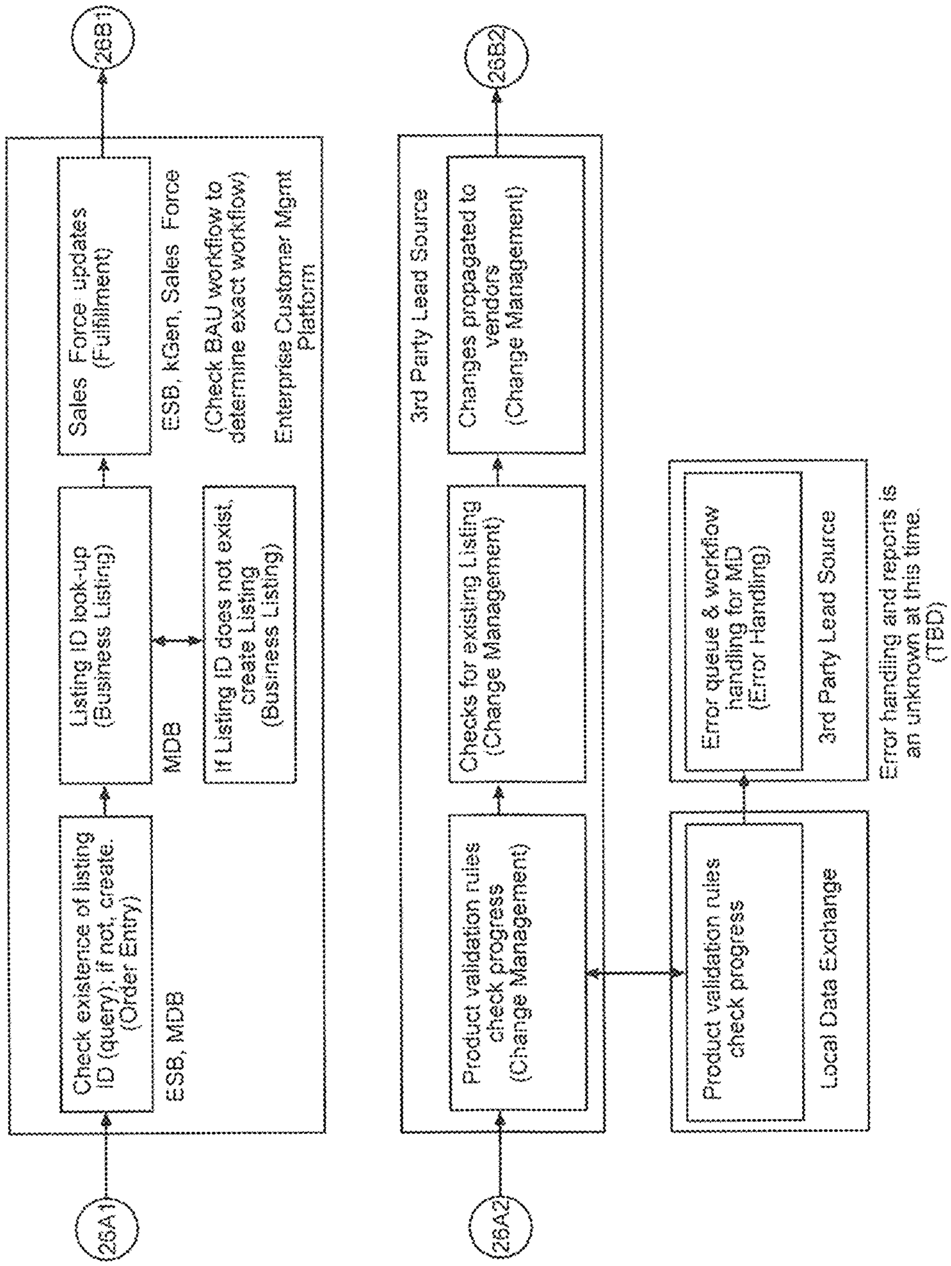
Figure 26C:
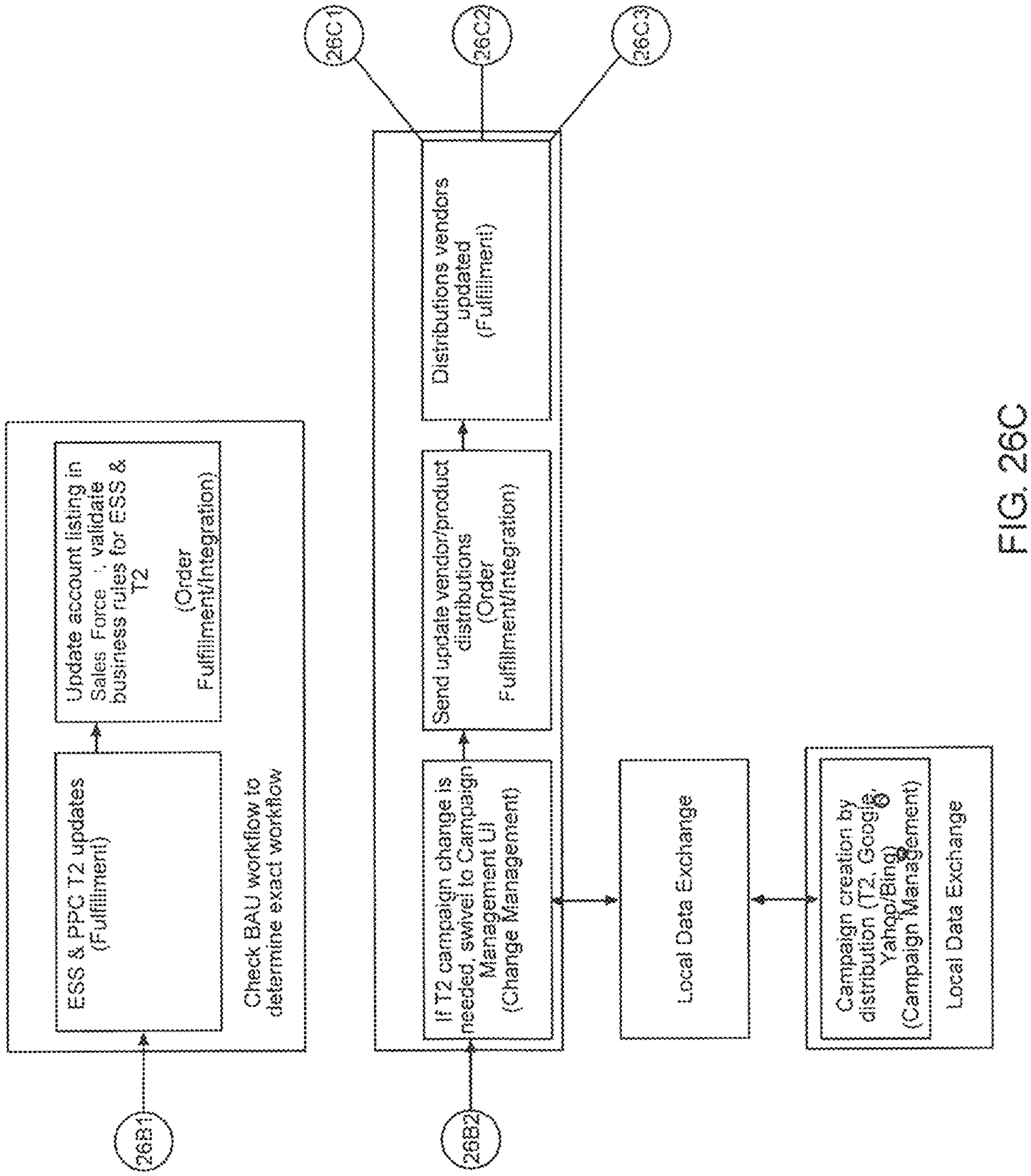
Figure 26D:
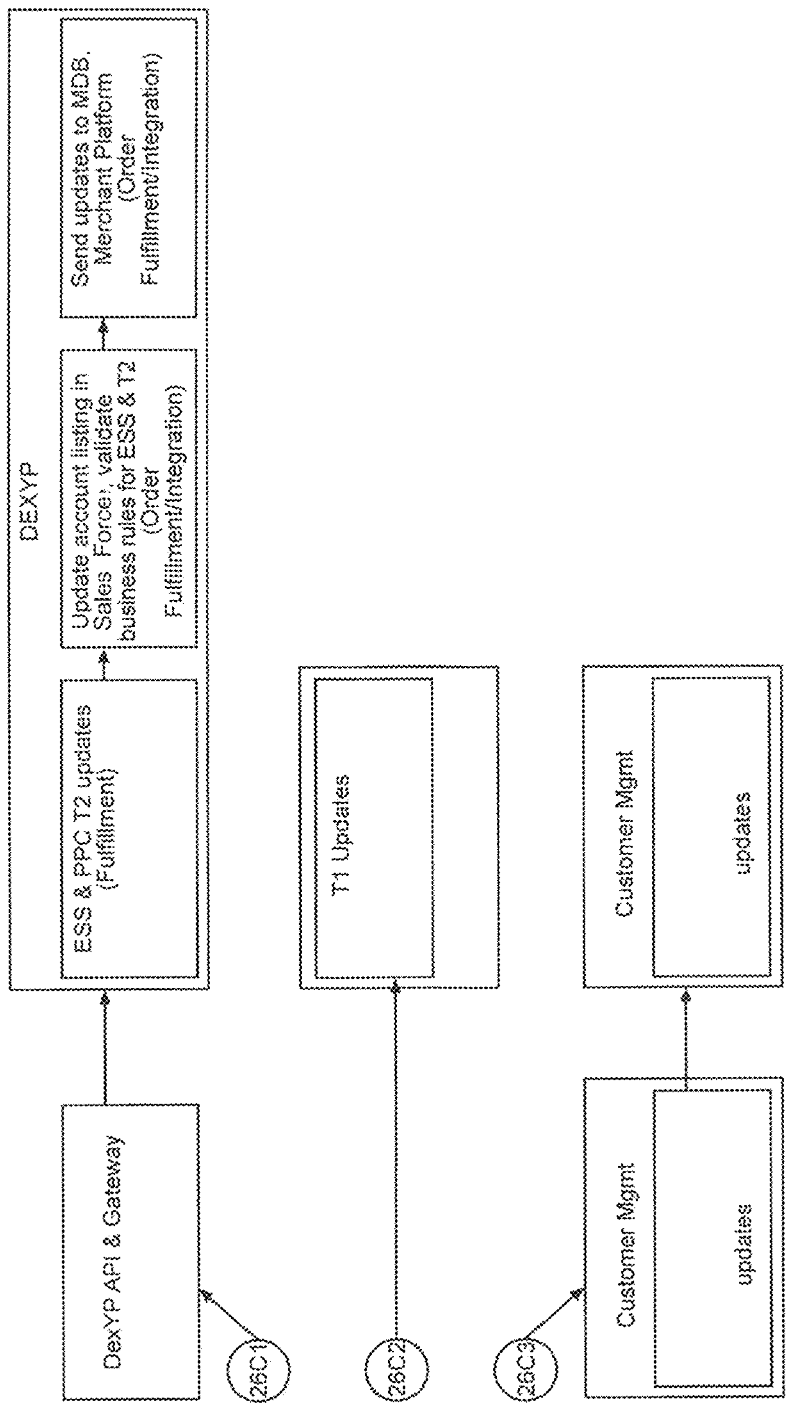
Figure 27A:
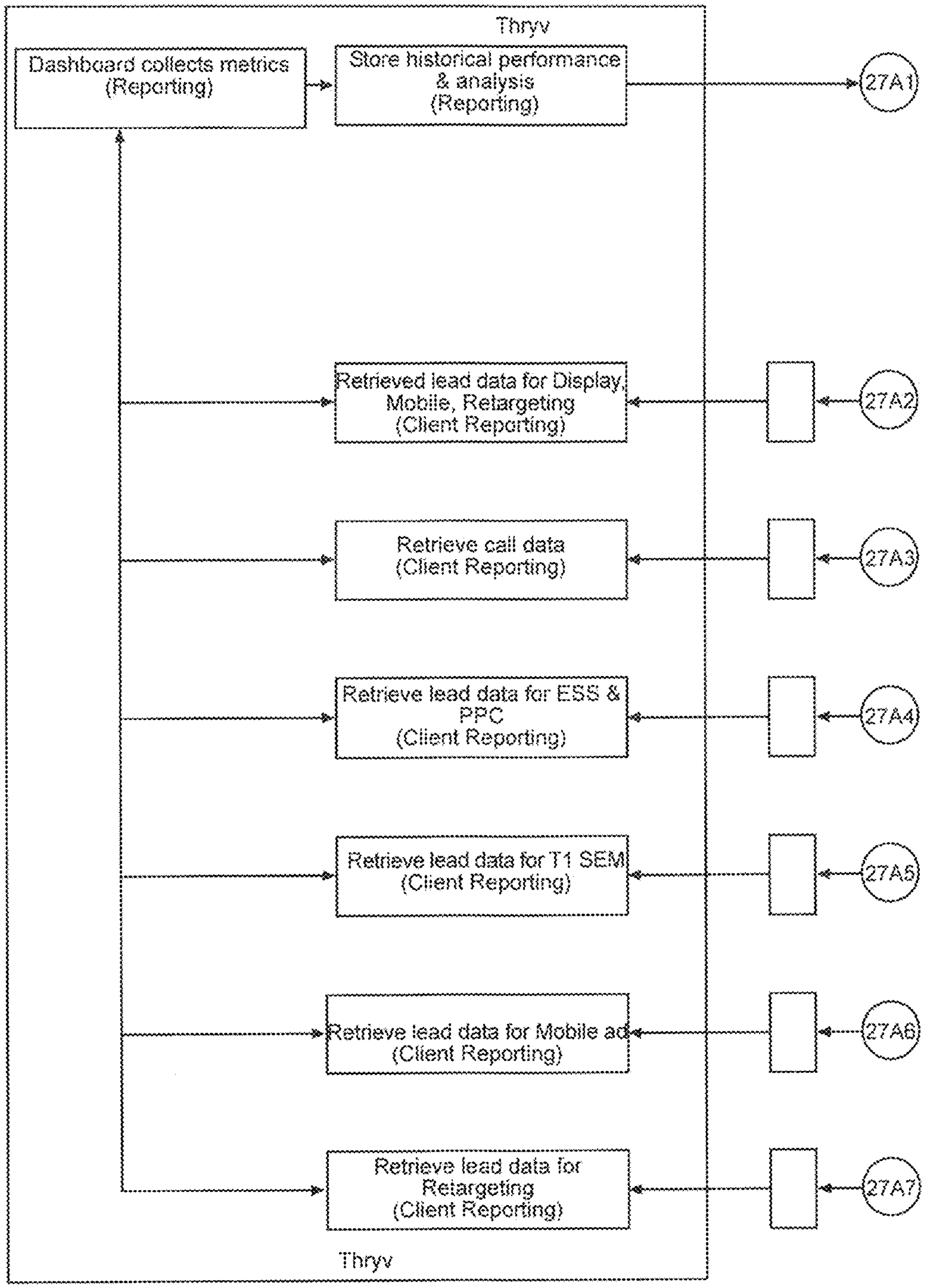
FIG. 27A thru 27B is an illustration of a functional flow for reporting.
Figure 27B:
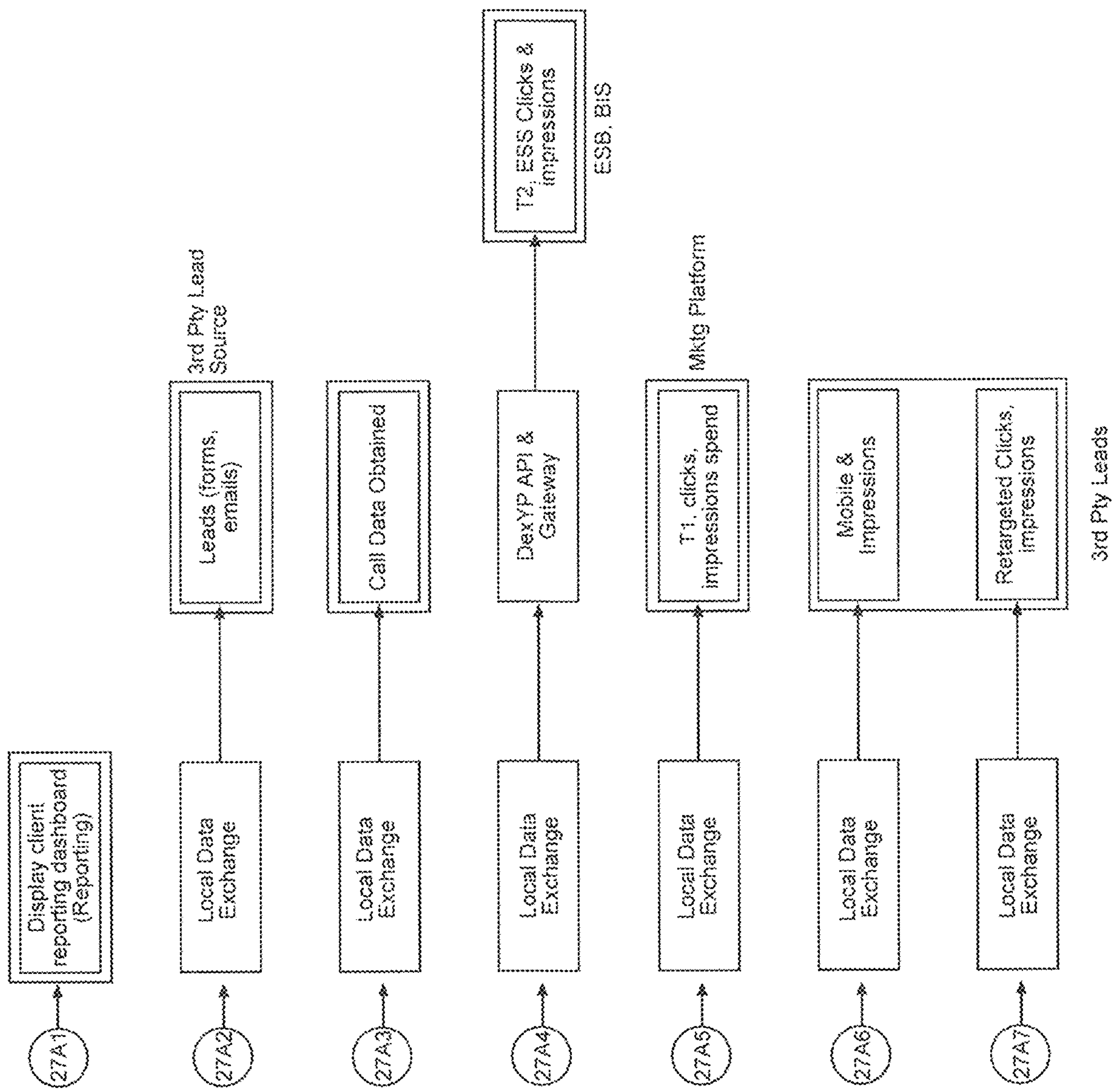
Figure 28:
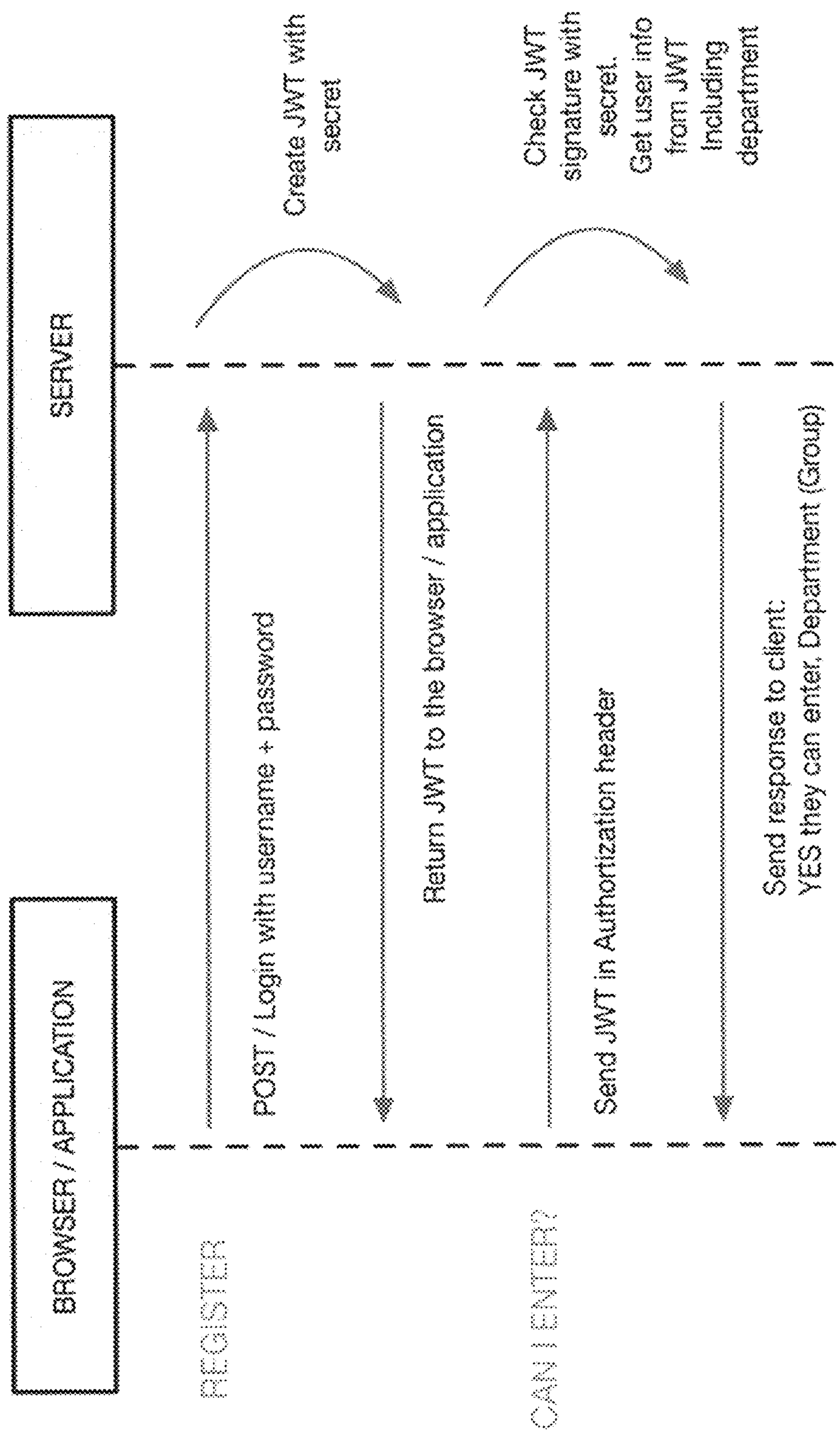
FIG. 28 is an illustration of a functional flow for browser and server.
Figure 29:
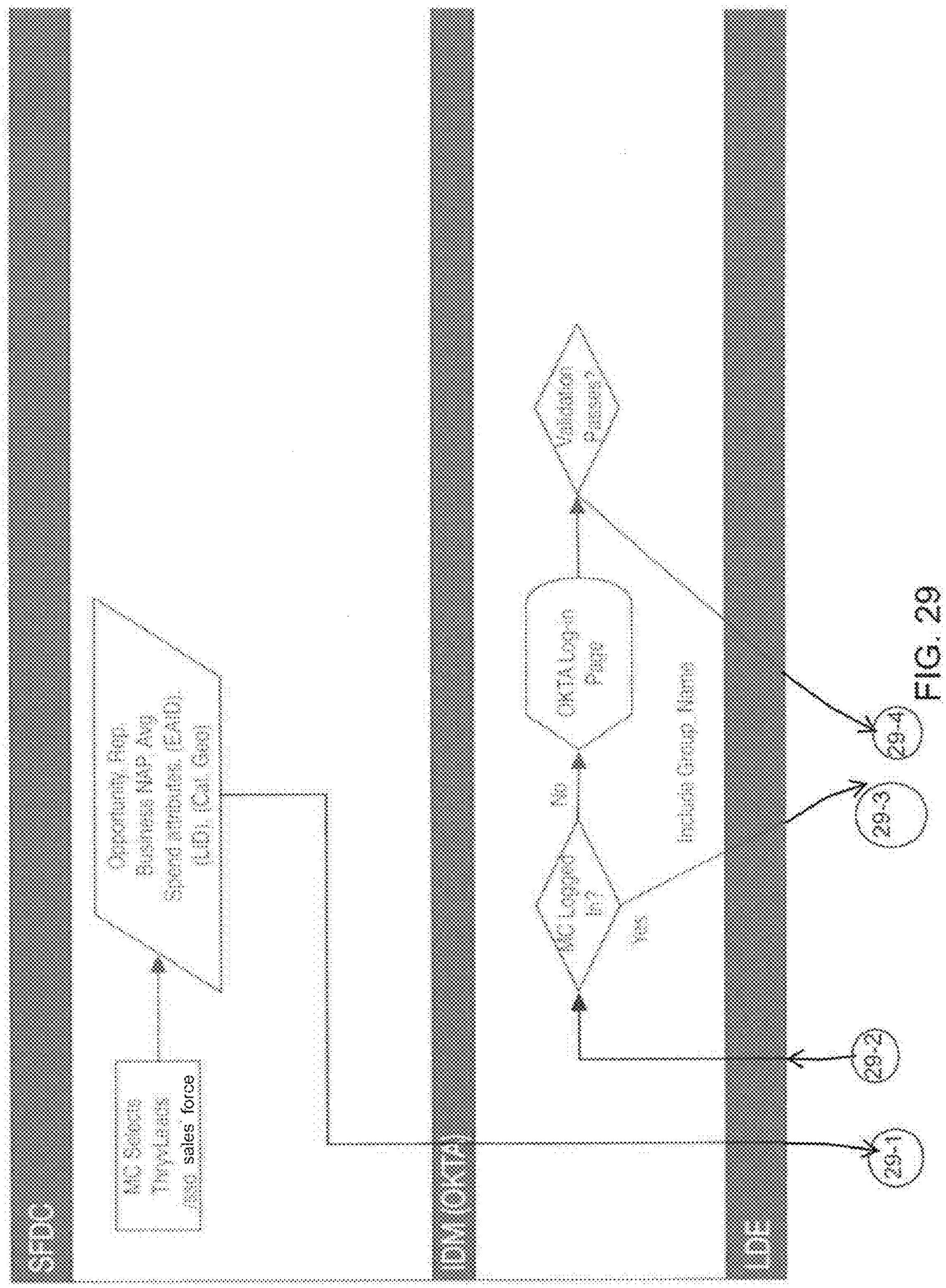
FIG. 29 is an illustration of a listing change.
Figure 30:
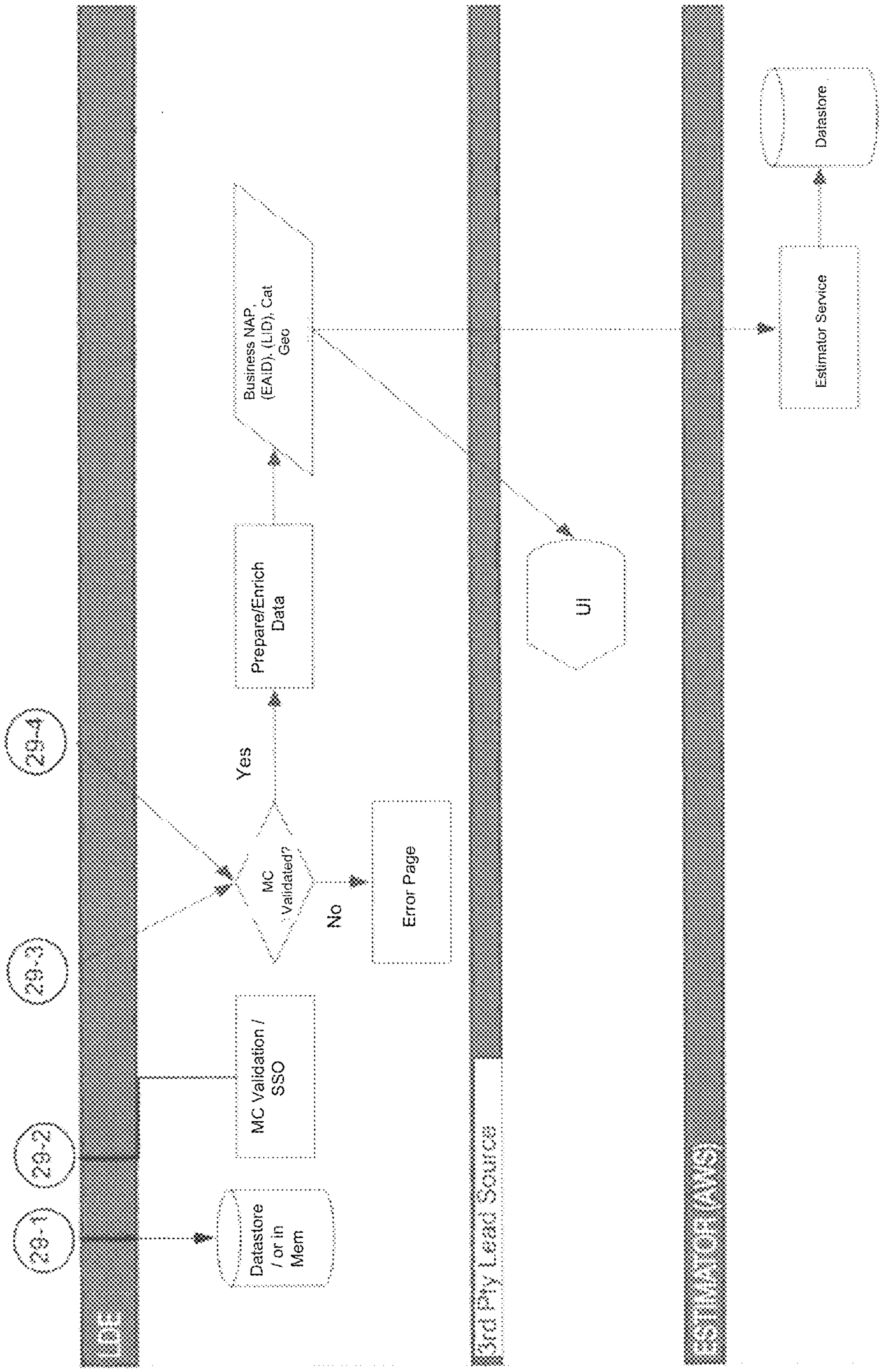
FIG. 30 is an illustration of a listing.

Referring to FIGS. 20A thru 20C, an illustration of a functional flow for contract close is provided. Referring to FIGS. 21A thru 21D, an illustration of a functional flow for daily yield management is provided. The yield management flow leverages machine learning and predictive analytics, calculates, and forecasts daily performance for monthly budget. The performance data is pulled including display impressions, clicks, leads, and call, and the budget is updated in order to meet performance goals based on the performance data. Referring to FIGS. 22A through 22C, an illustration of a functional flow for change management is provided. Referring to FIGS. 23A thru 23C, an illustration of a functional flow for downgrade product budget allocation management is provided based on performance data. Referring to FIGS. 24A thru 24C, an illustration of a functional flow for payment processing is provided. Referring to FIGS. 25A thru 25D, an illustration of a functional flow for listing change is provided. Referring to FIGS. 26A thru 26D is an illustration of a functional flow for updates to client account listings. Referring to FIGS. 27A thru 27B is an illustration of a functional flow for reporting of the performance data is provided. Referring to FIG. 28, an illustration of a functional flow between browser based user interface and the internal enterprise server system network is provided. Referring to FIGS. 29 and 20, an illustration of a listing change is provided.

Figure 31:
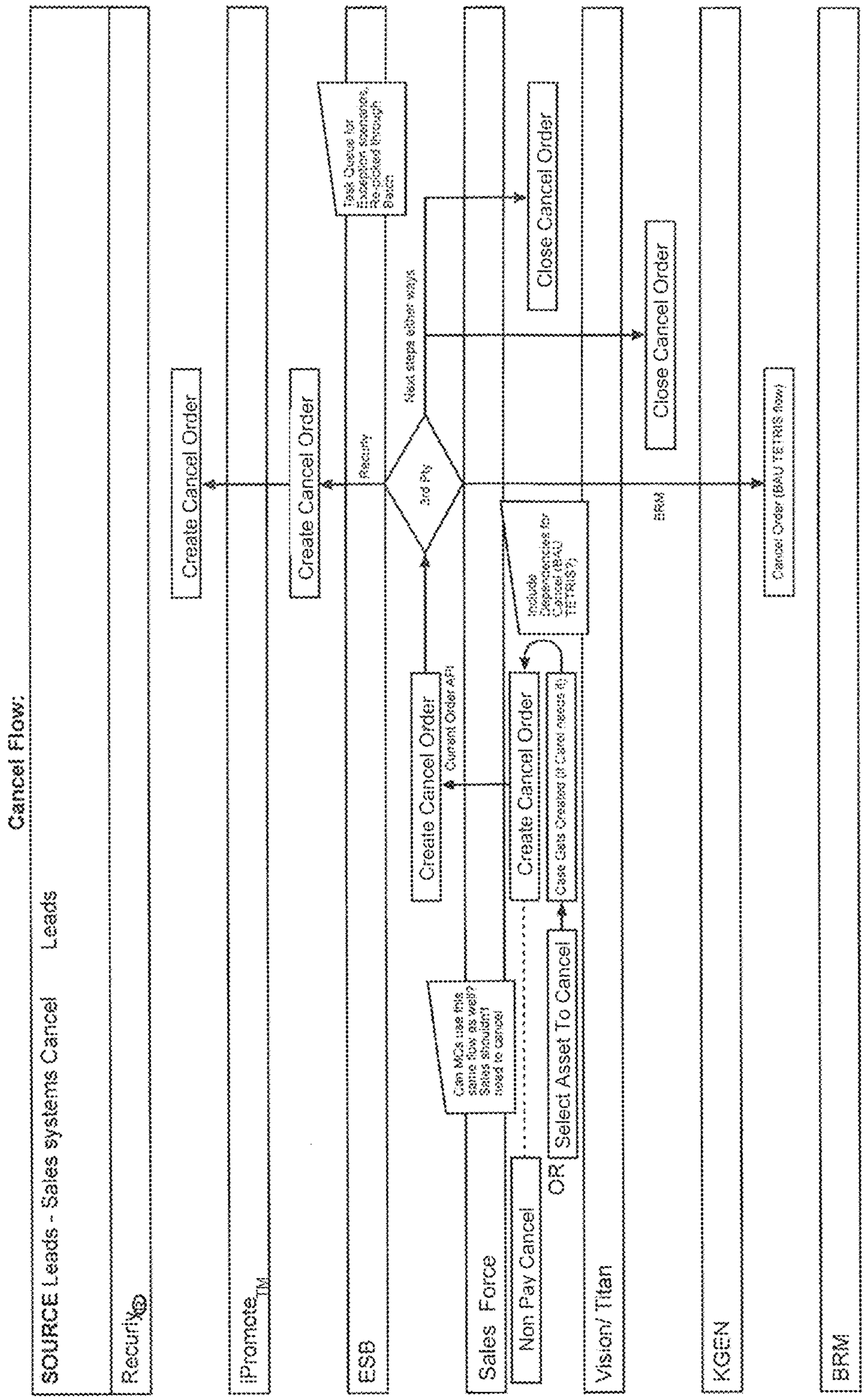
FIG. 31 is an illustration of the cancel order flow.
Figure 32:
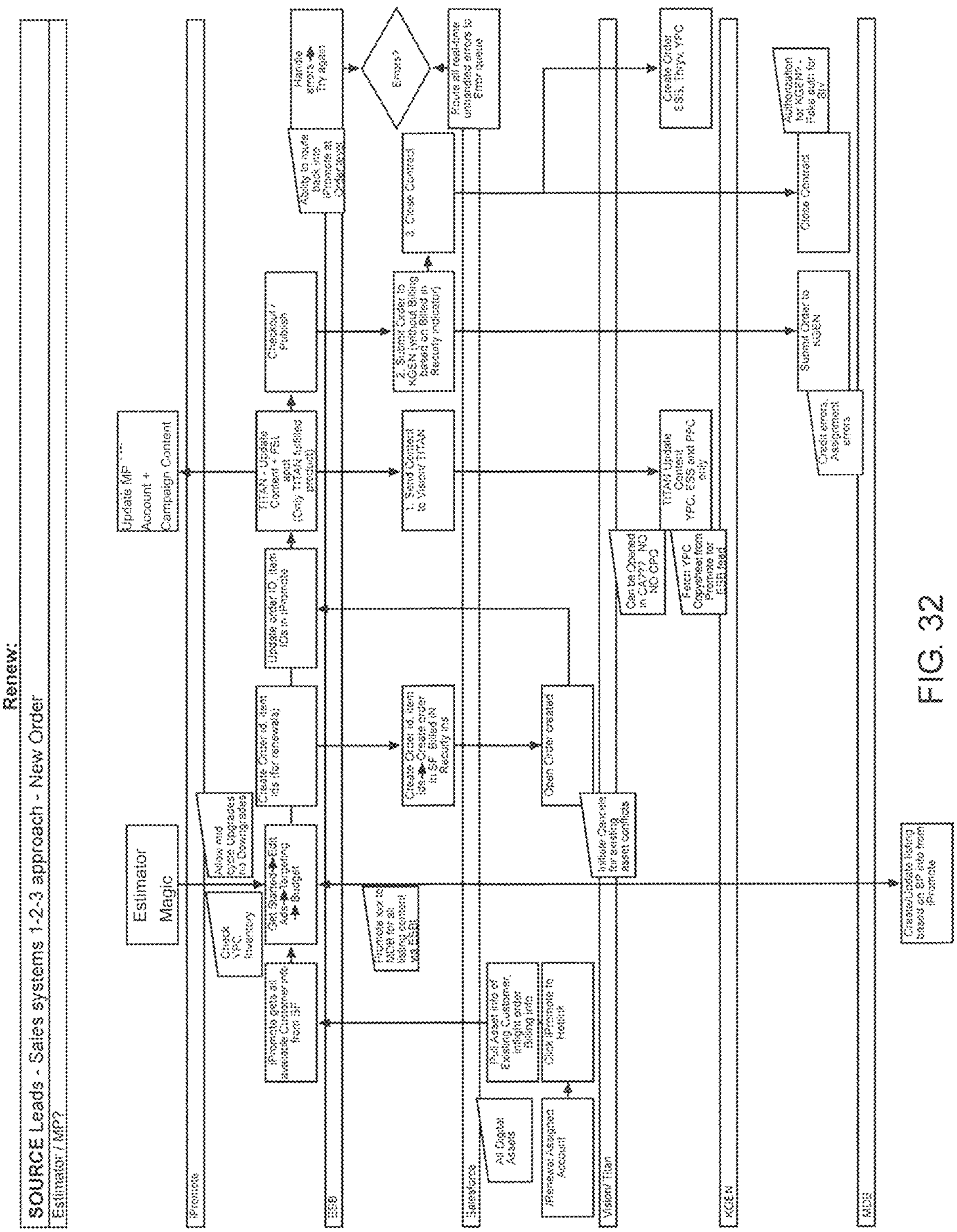
FIG. 32 is an illustration of source lead flow.

Referring to FIG. 31, an illustration of a cancel order flow is provided. The cancel order can be implemented for any third party platform campaign. Referring to FIG. 32, an illustration of renew source lead flow is provided, which can also be implemented for any lead source campaign.

Figure 33A:
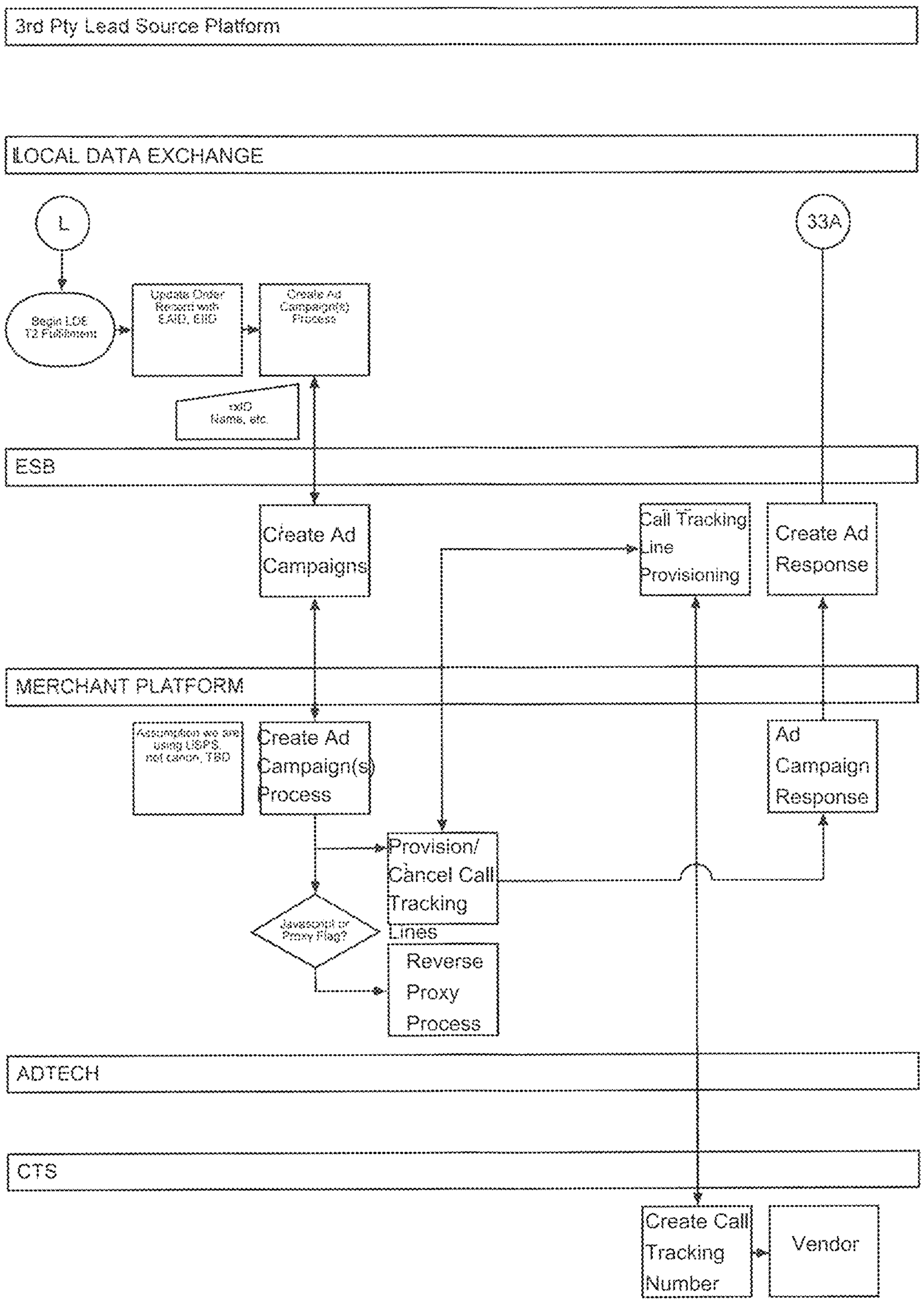
FIG. 33A thru 33B is an illustration of the ESB and Merchant lead source functional flow.
Figure 33B:
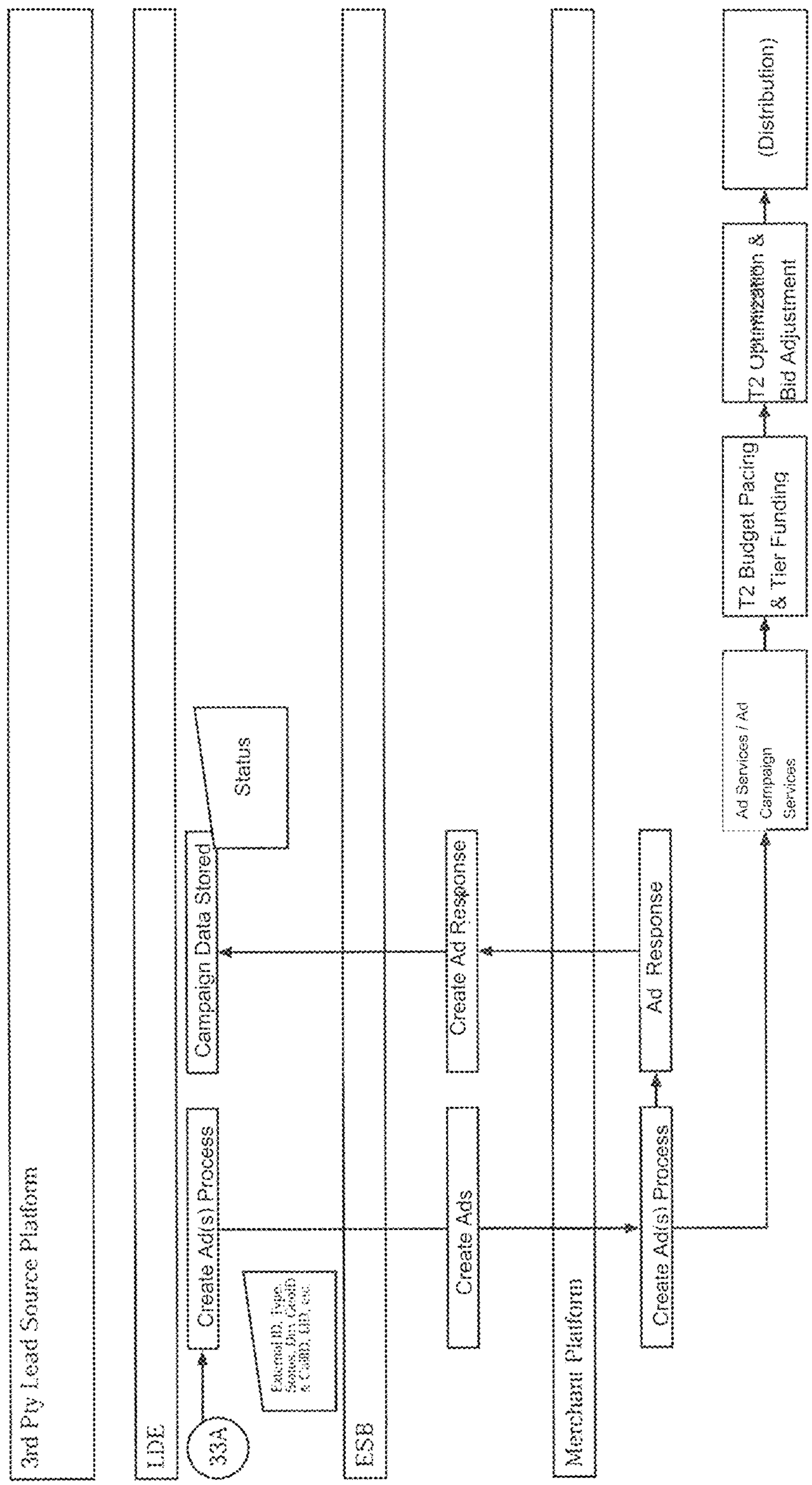
Figure 34A:
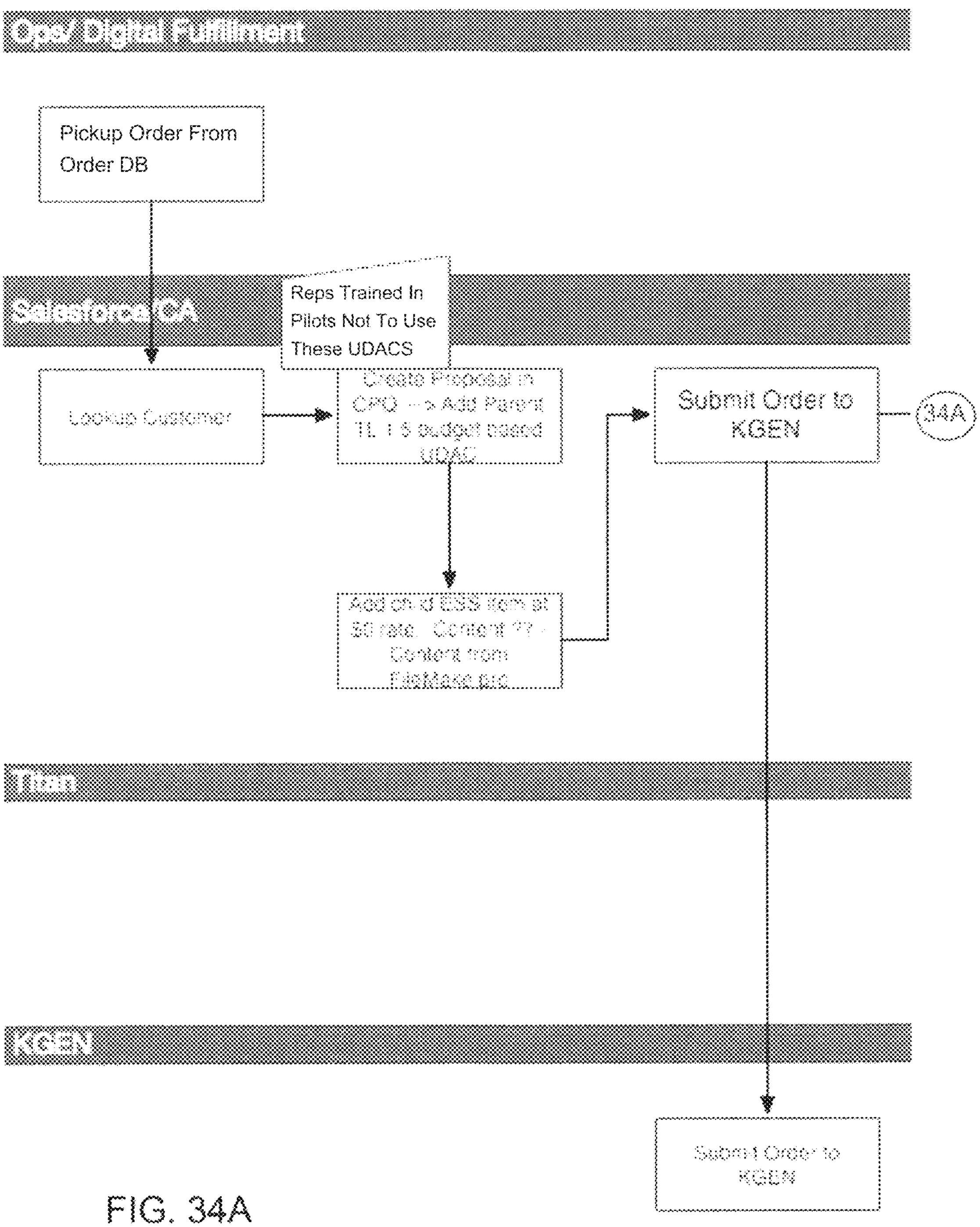
FIG. 34A thru 34B is an illustration of the fulfillment flow at the sales force level.
Figure 34B:
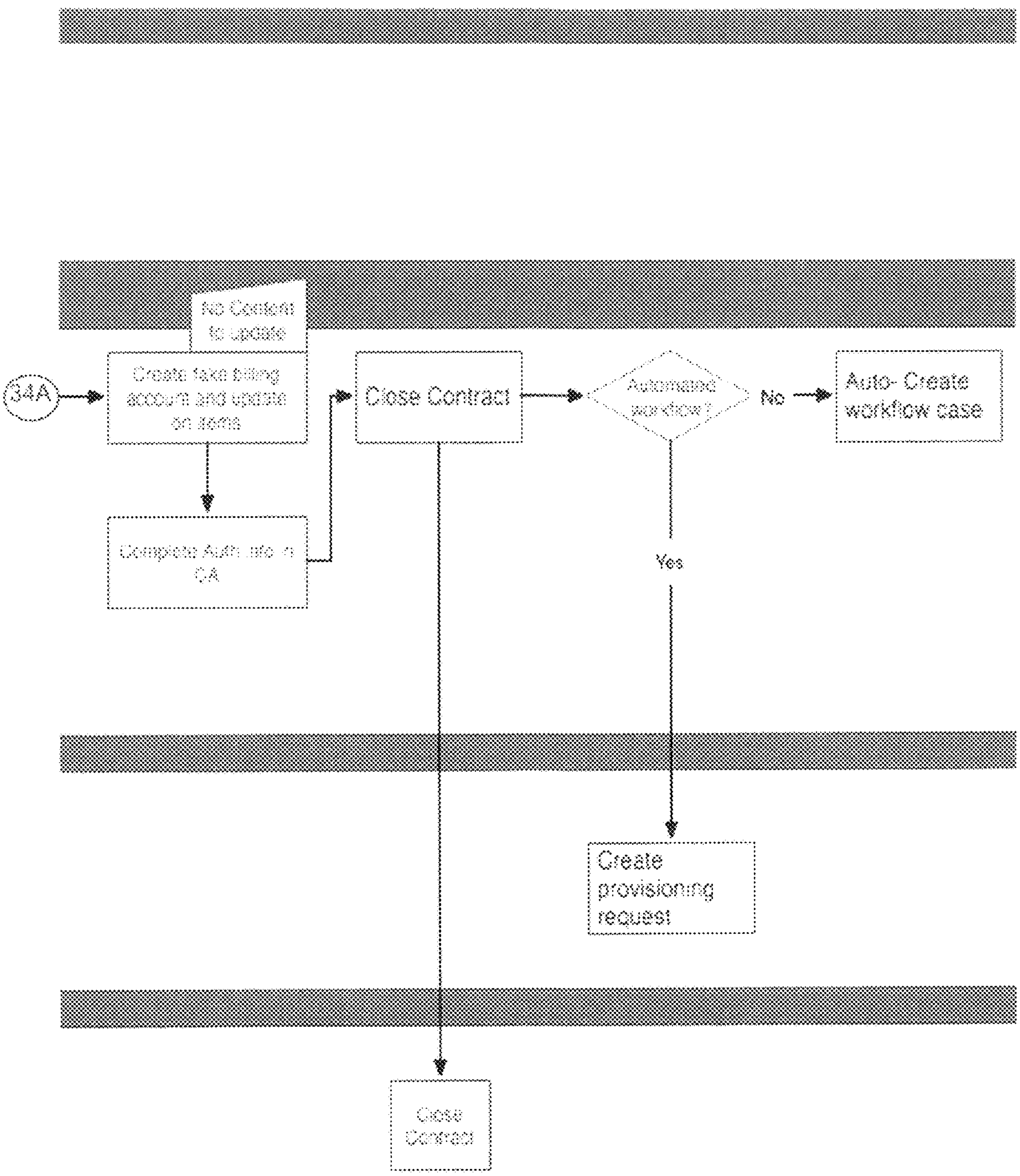
Figure 35A:
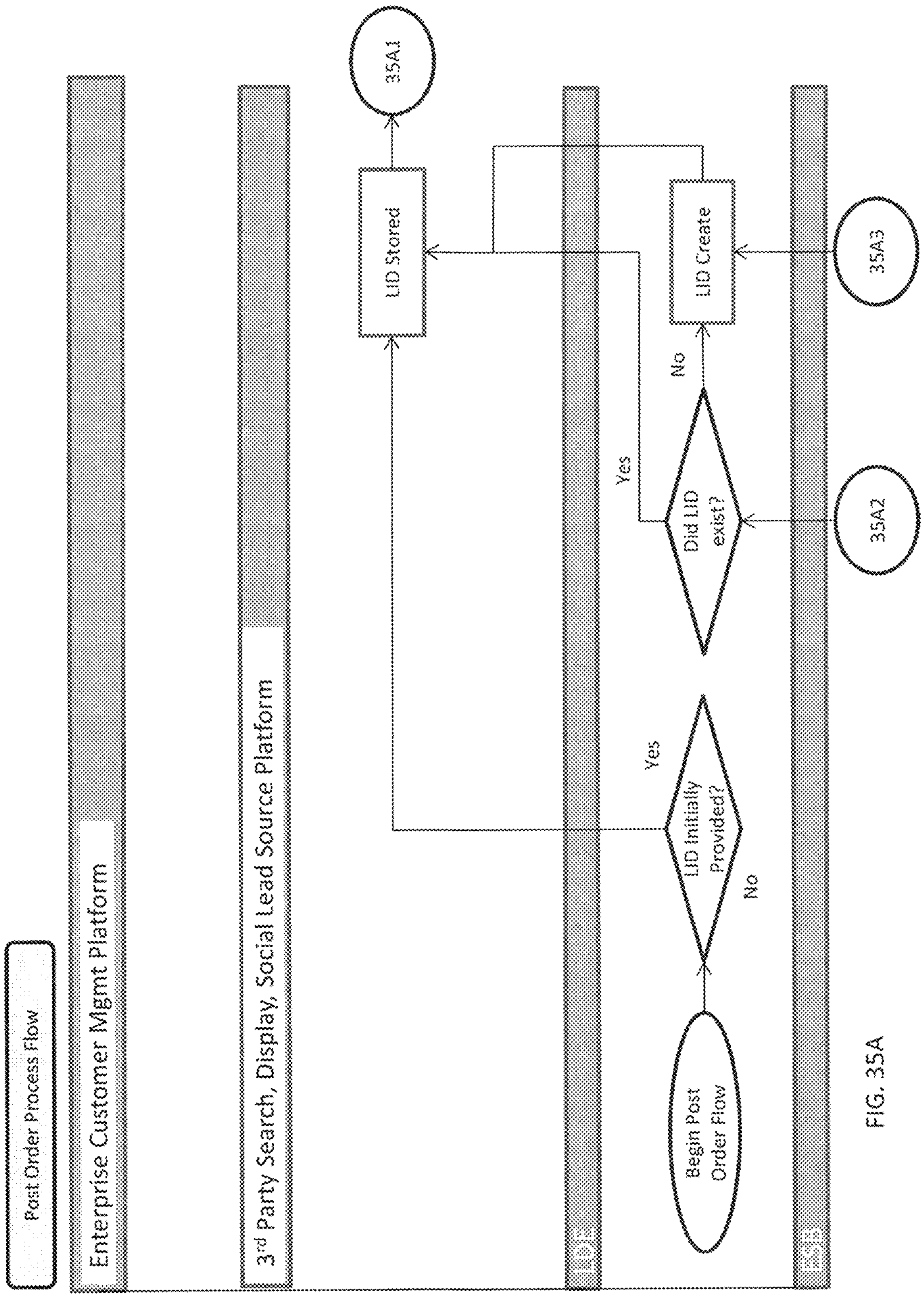
Figure 35B:
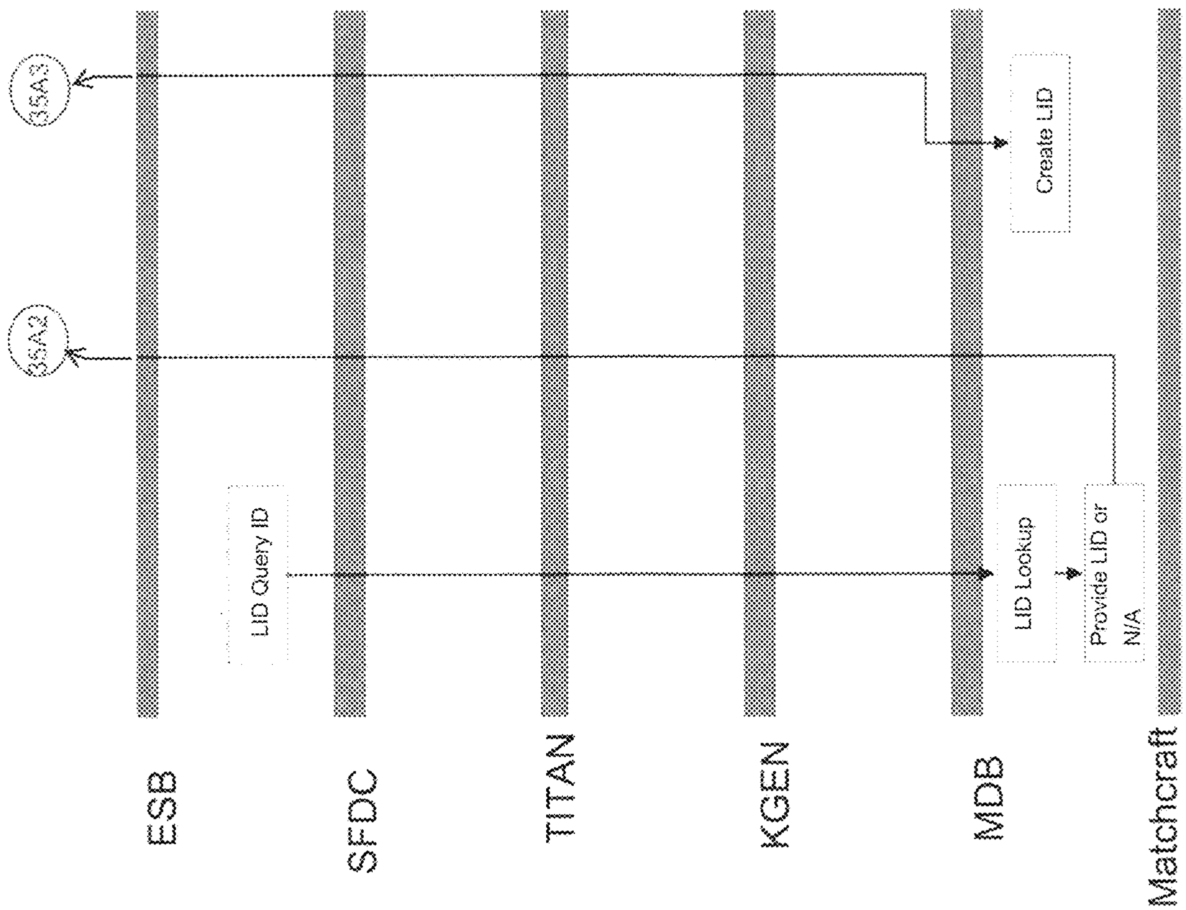
Figure 35C:
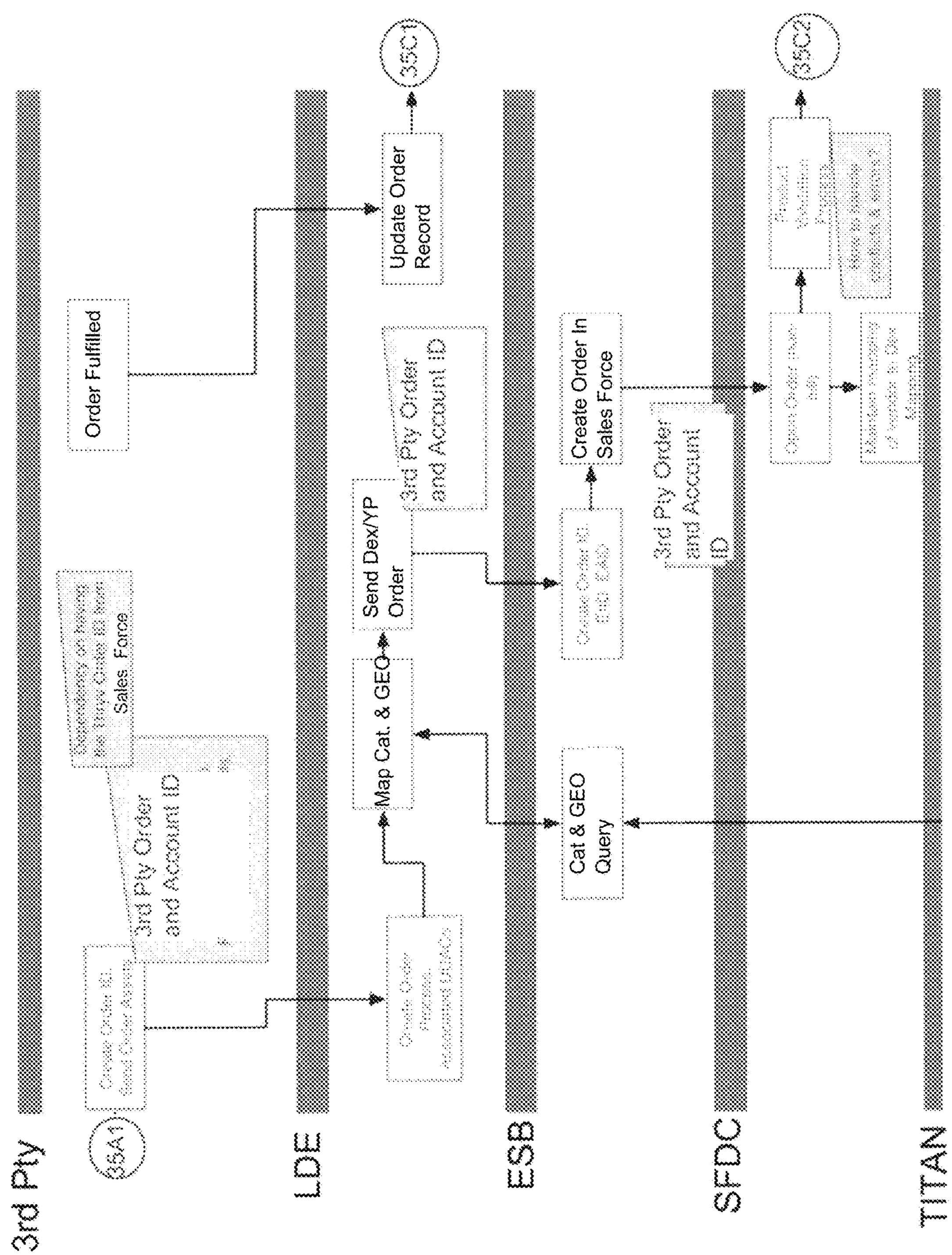
Figure 35D:
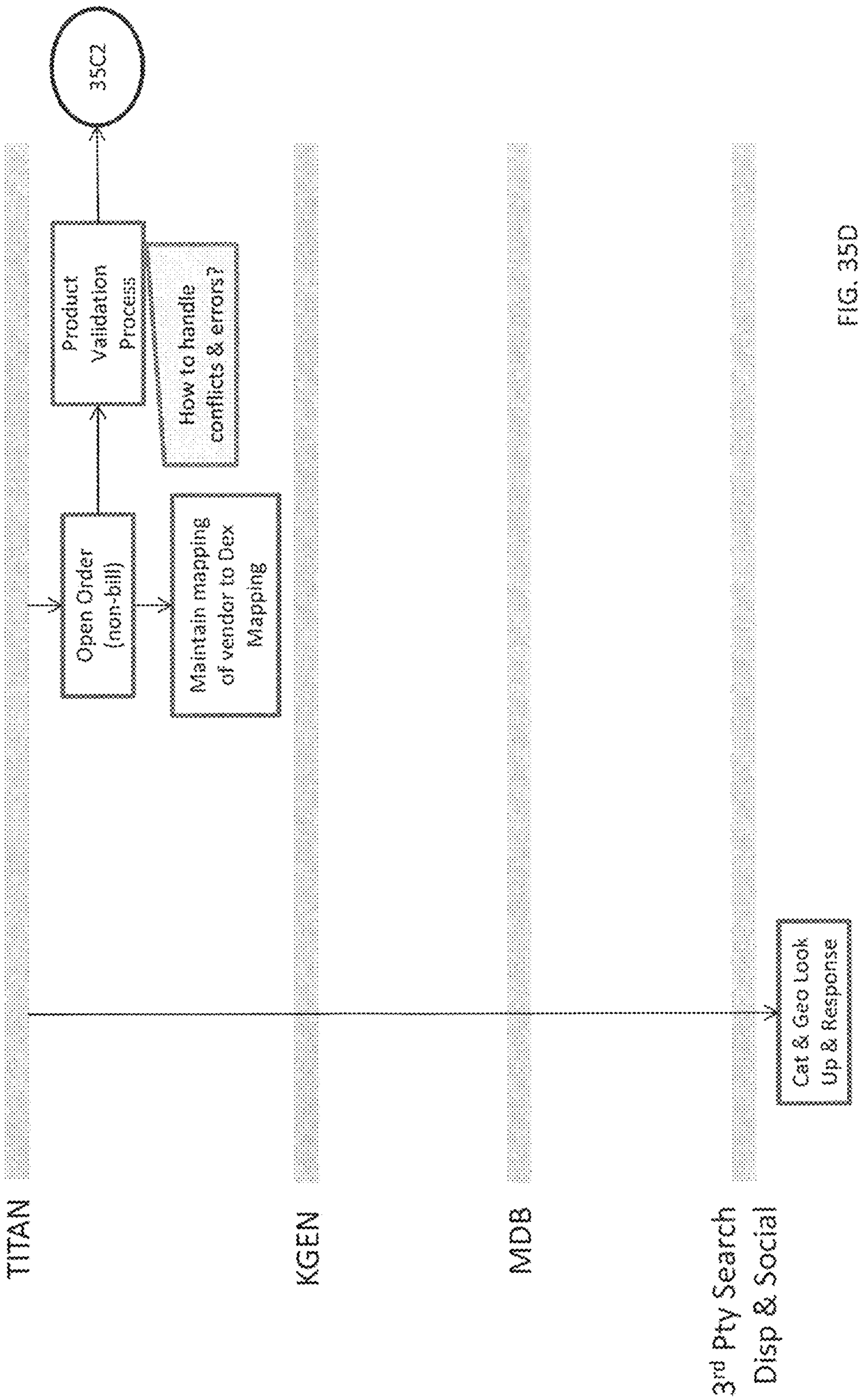
Figure 35E:
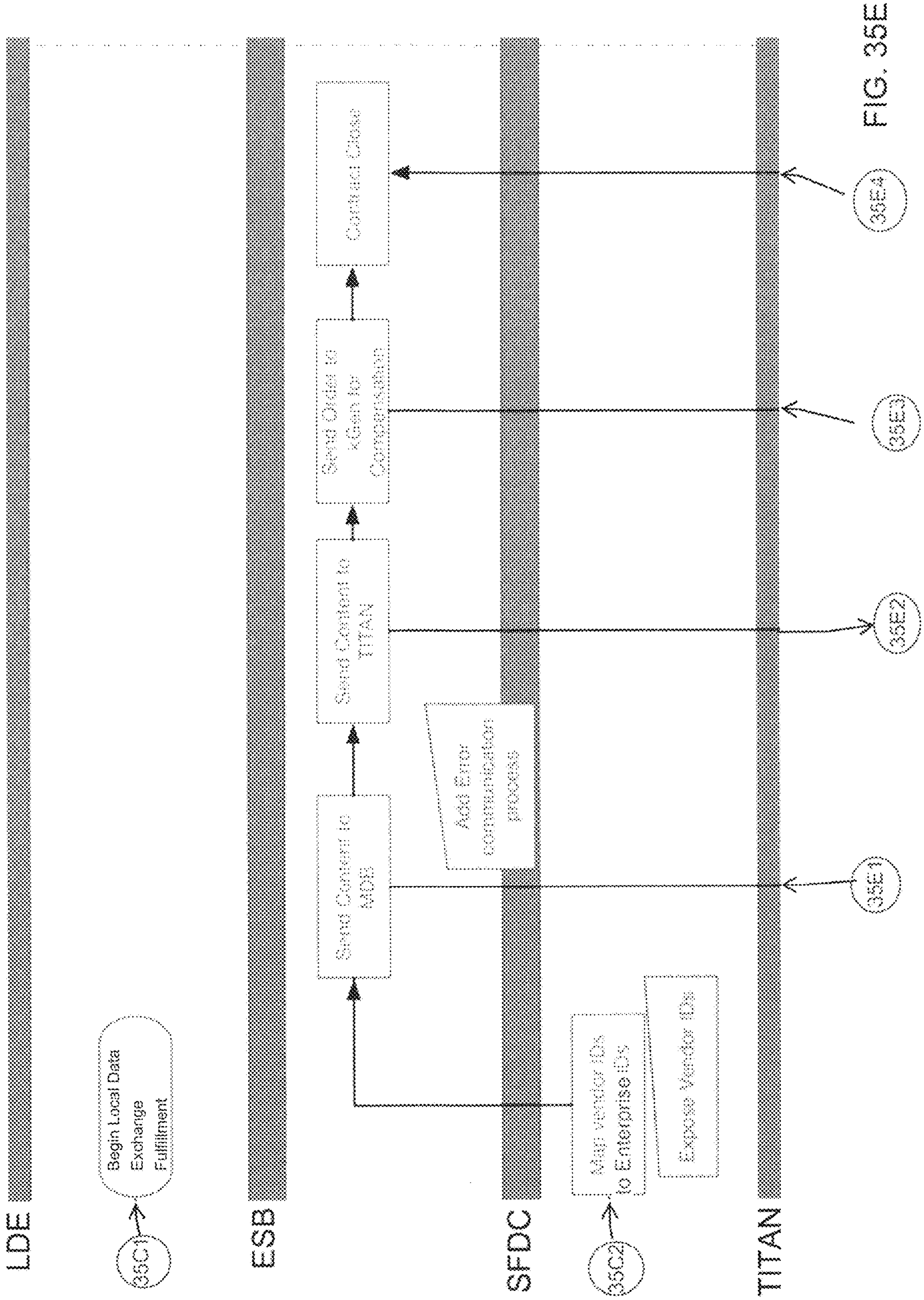
Figure 35F:
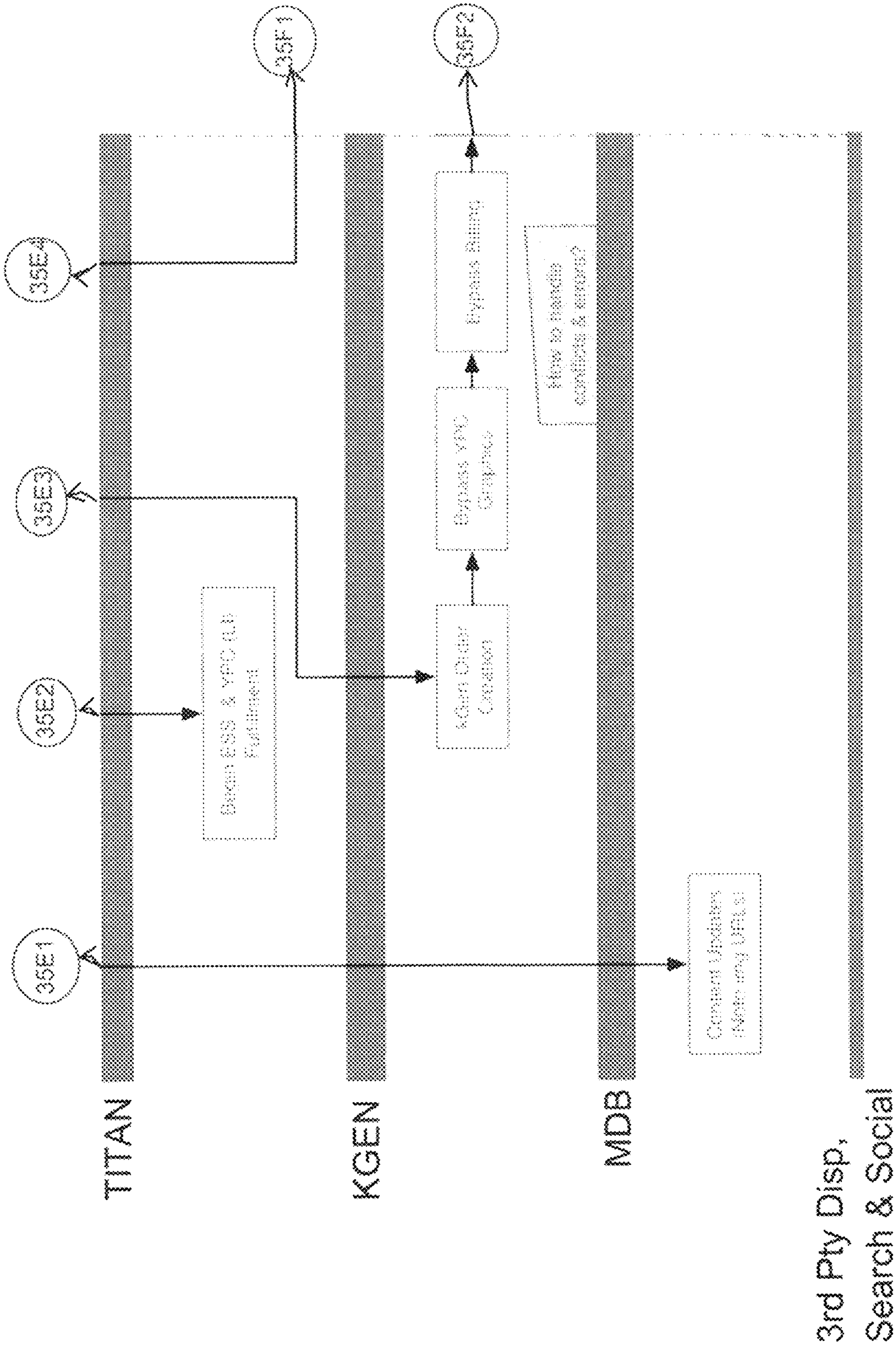
Figure 35G:
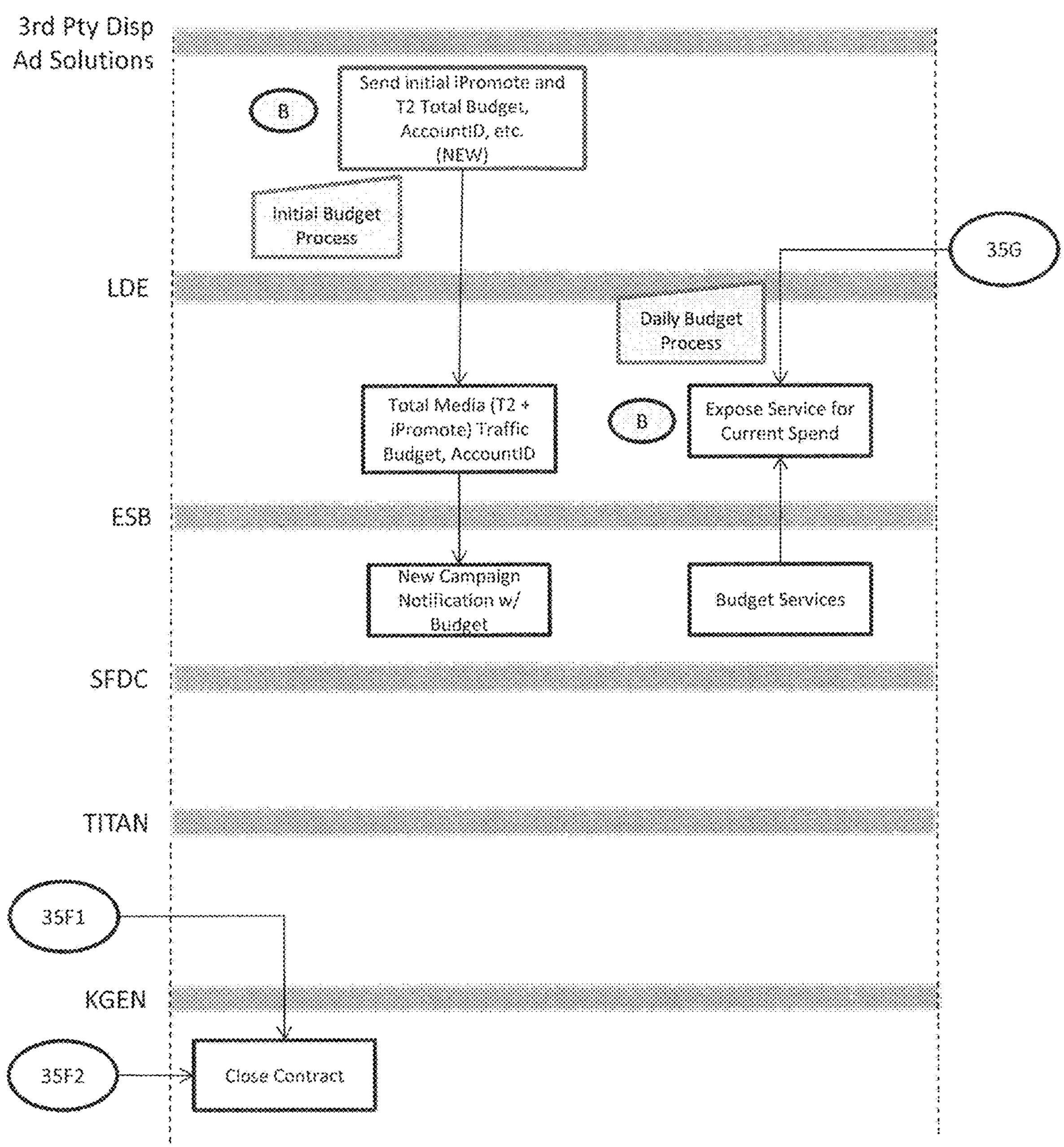
Figure 35H:
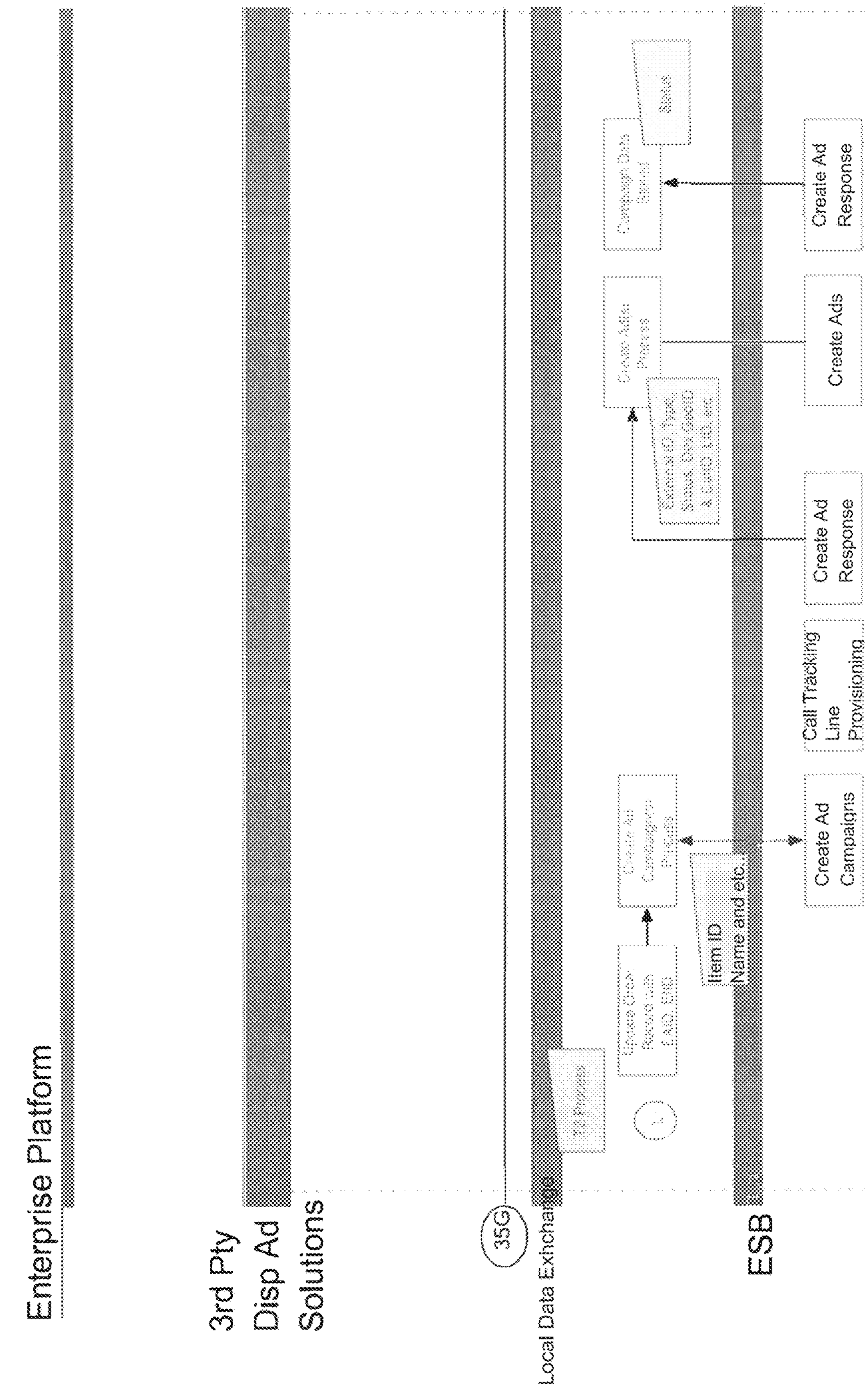
Figure 35I:
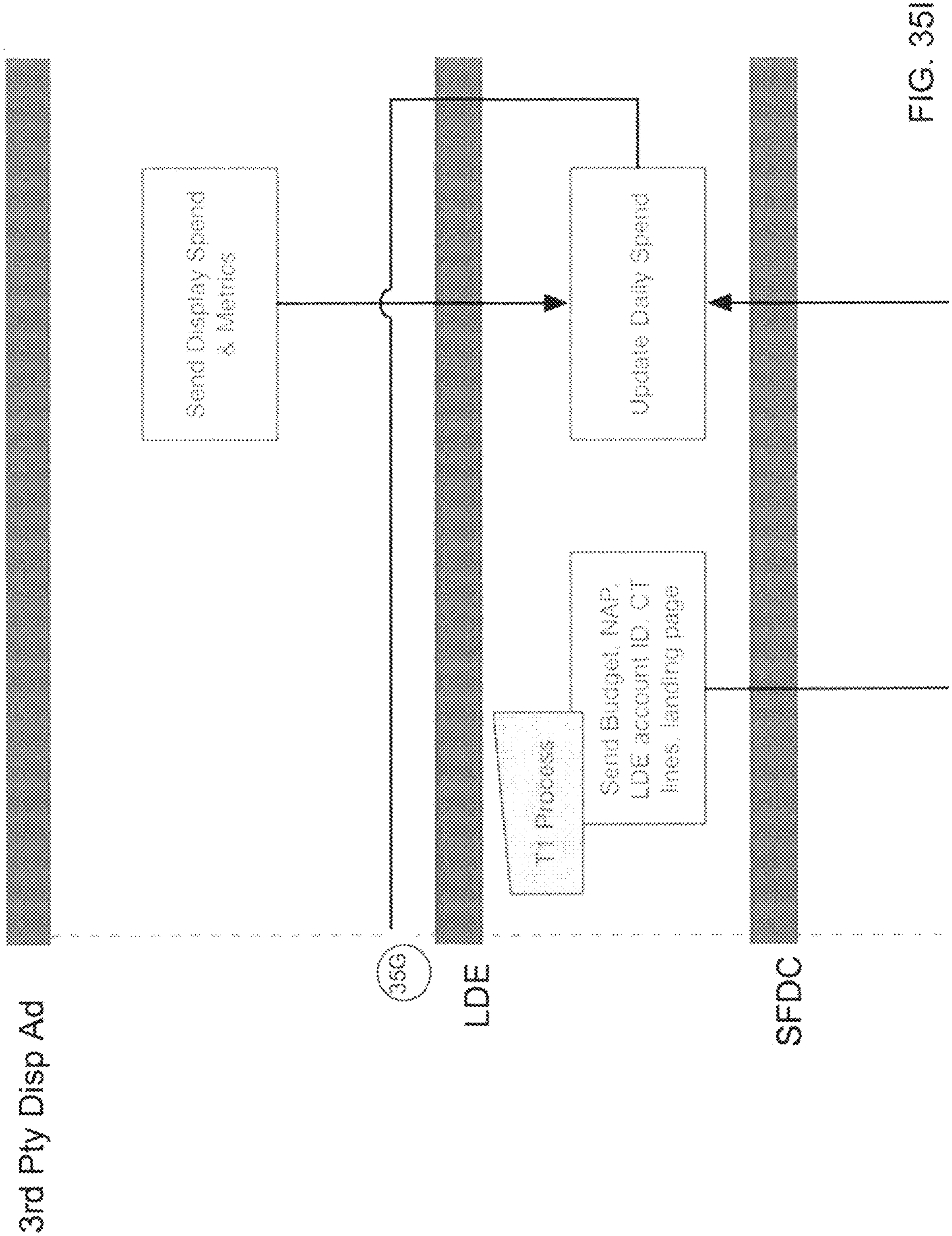
Figure 36A:
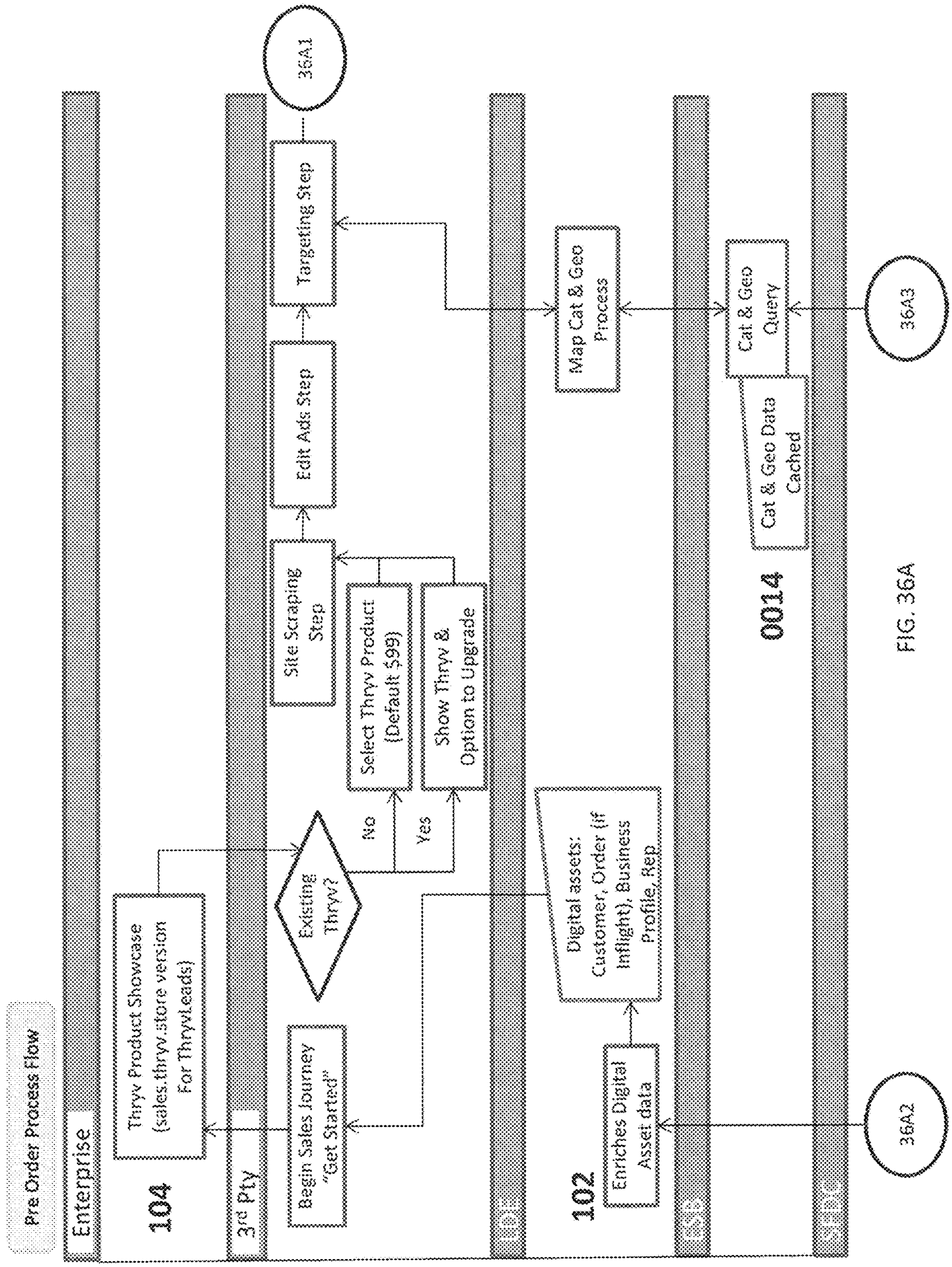
FIG. 36A thru 36F is an illustration of pre-order process flow.
Figure 36B:
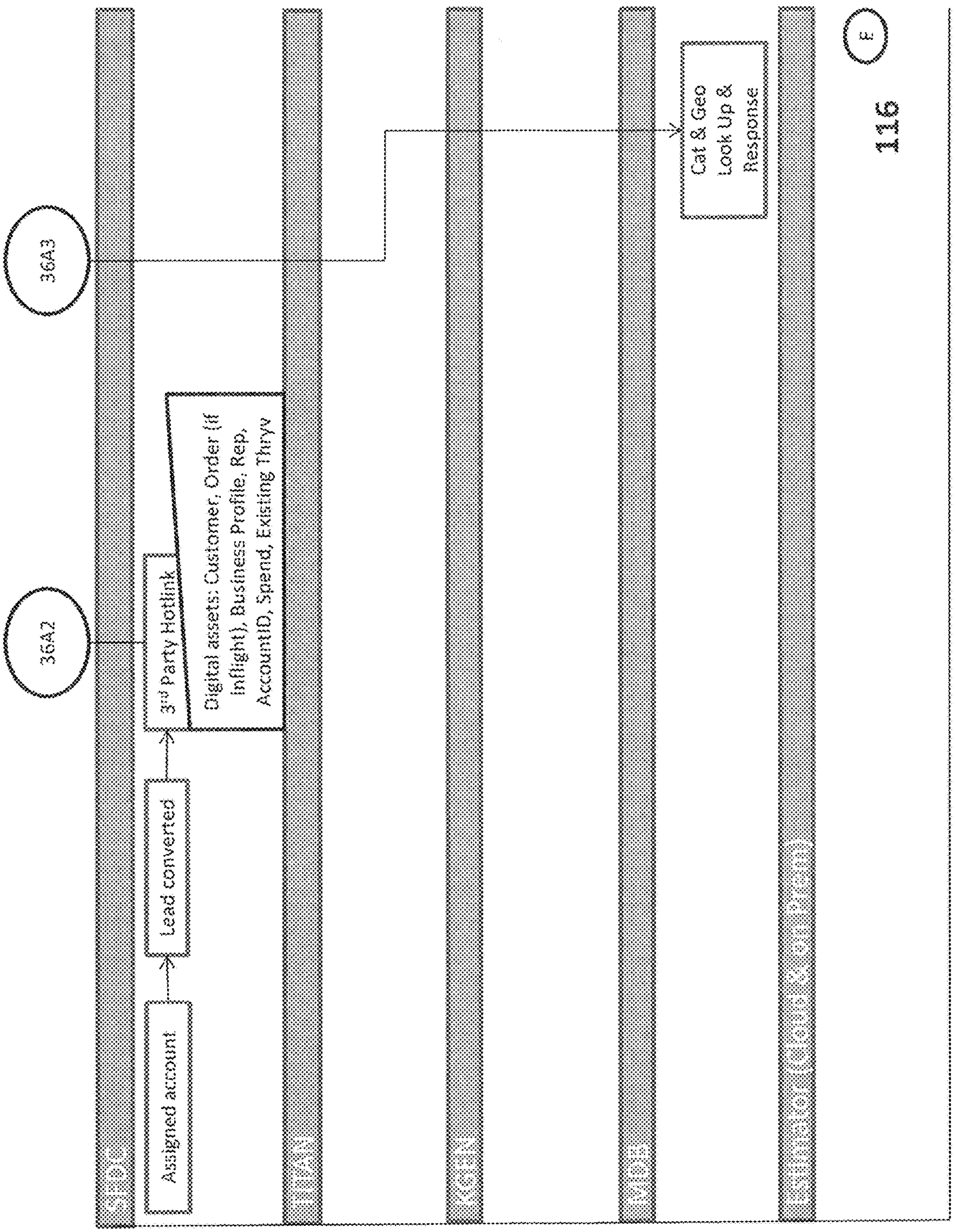
Figure 36C:
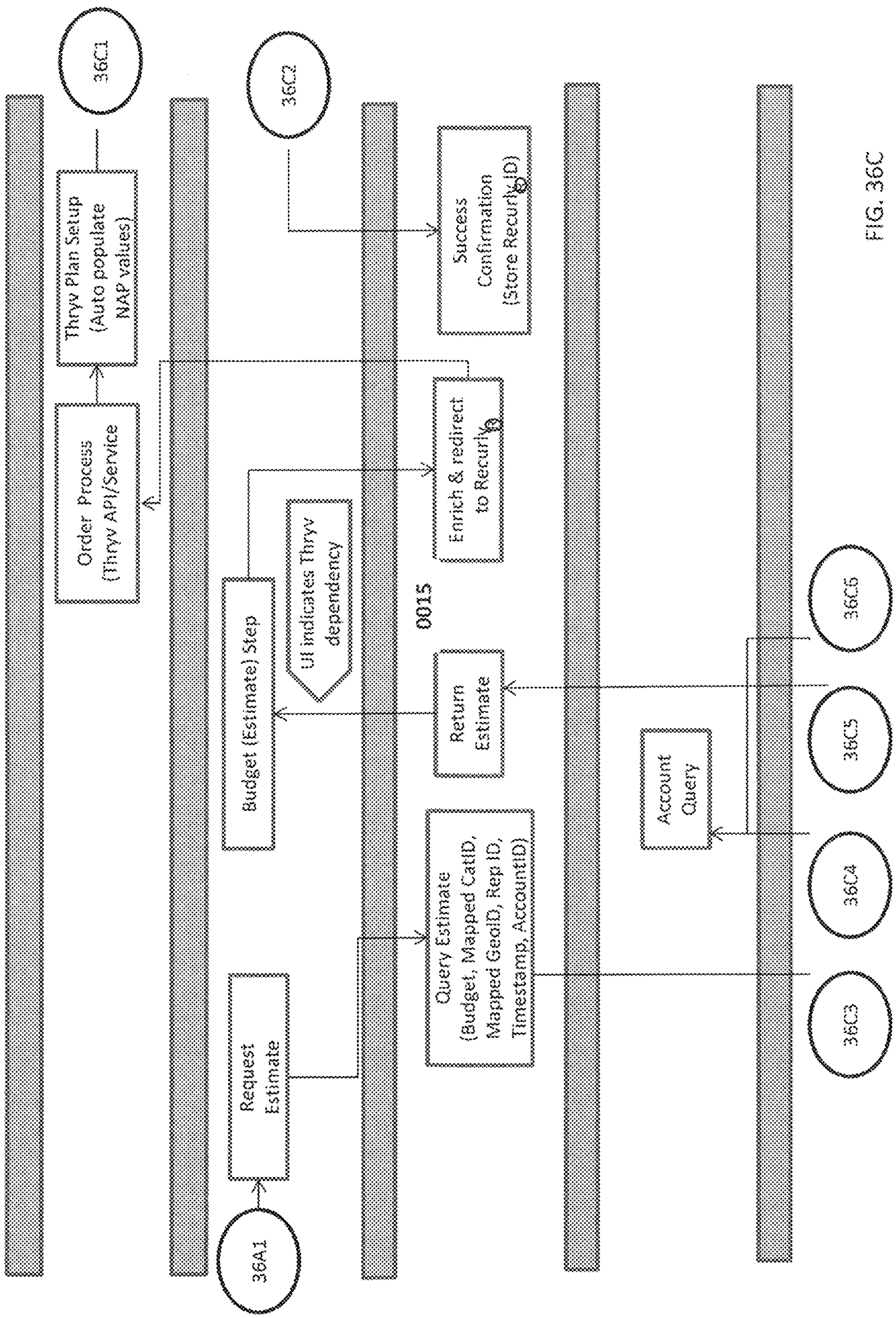
Figure 36D:
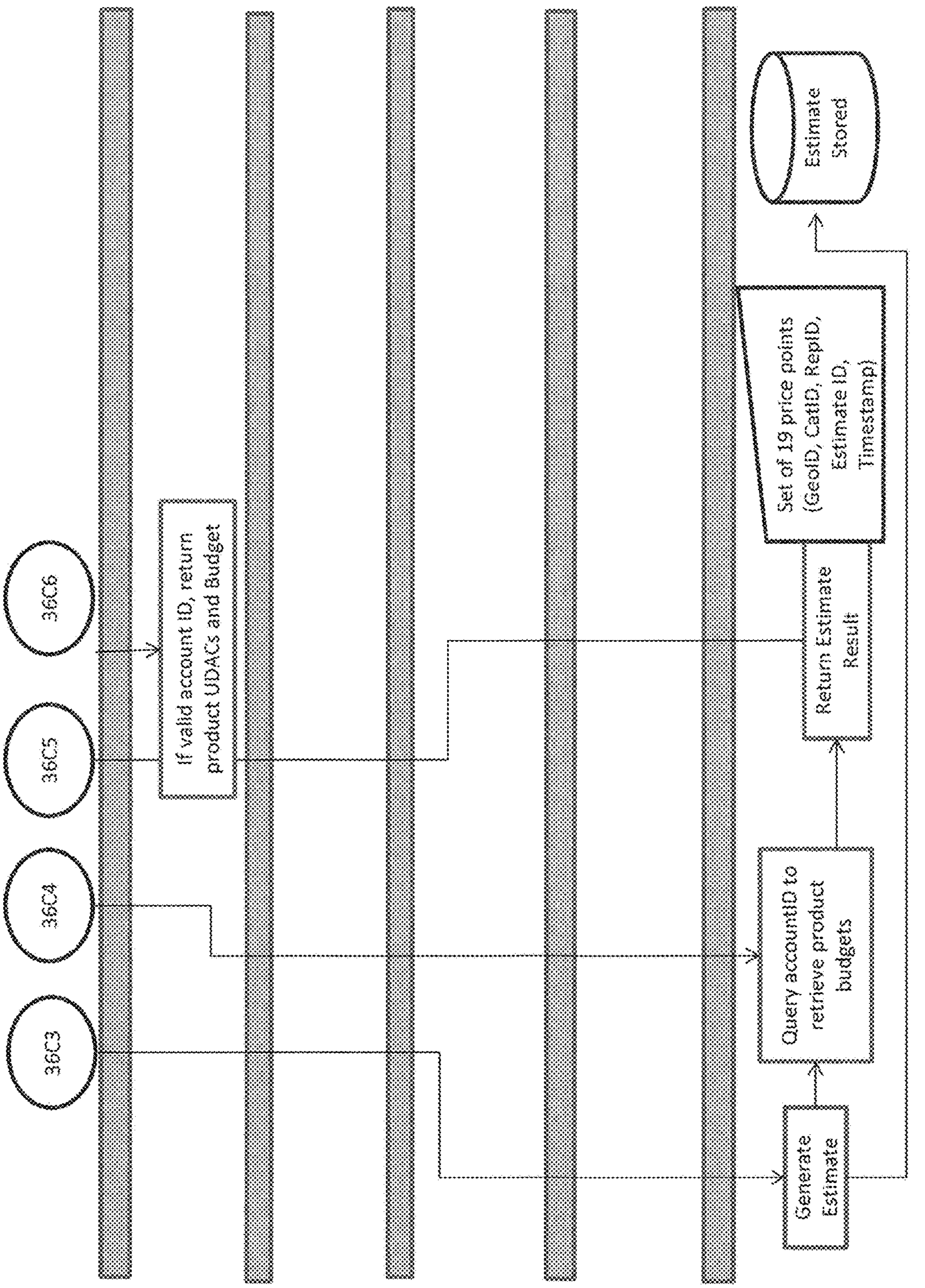
Figure 36E:
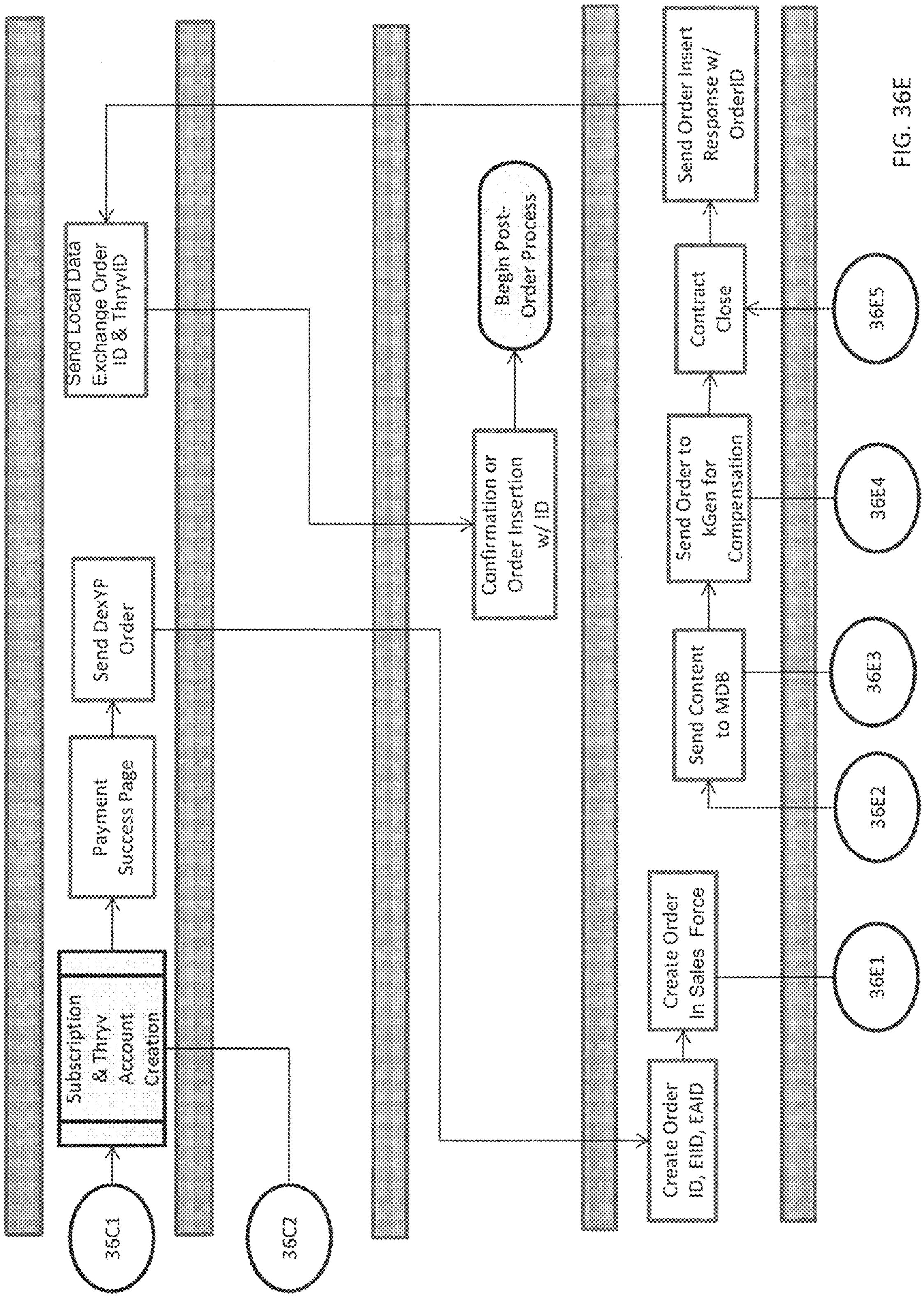
Figure 36F:
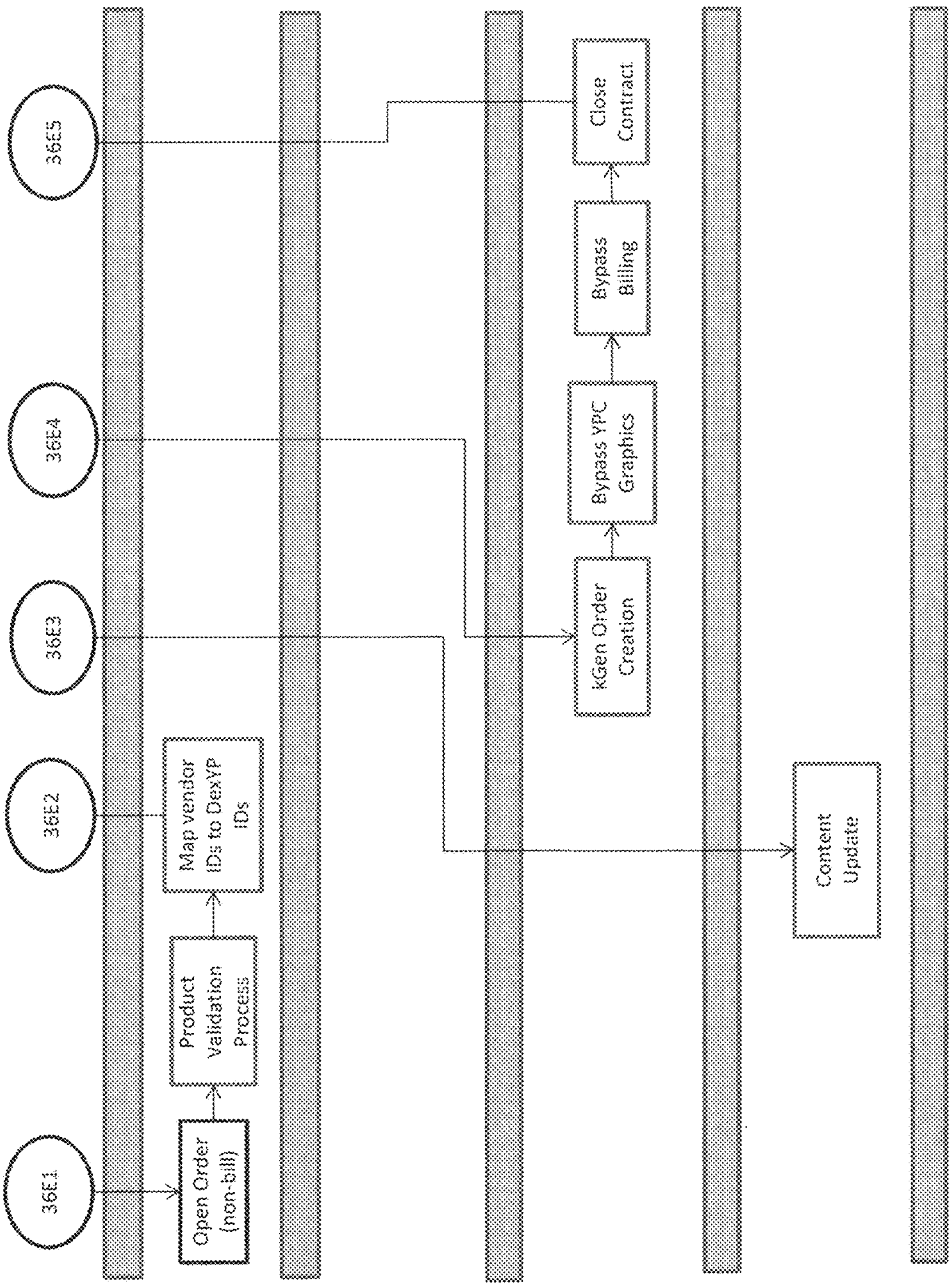
Figure 37A:
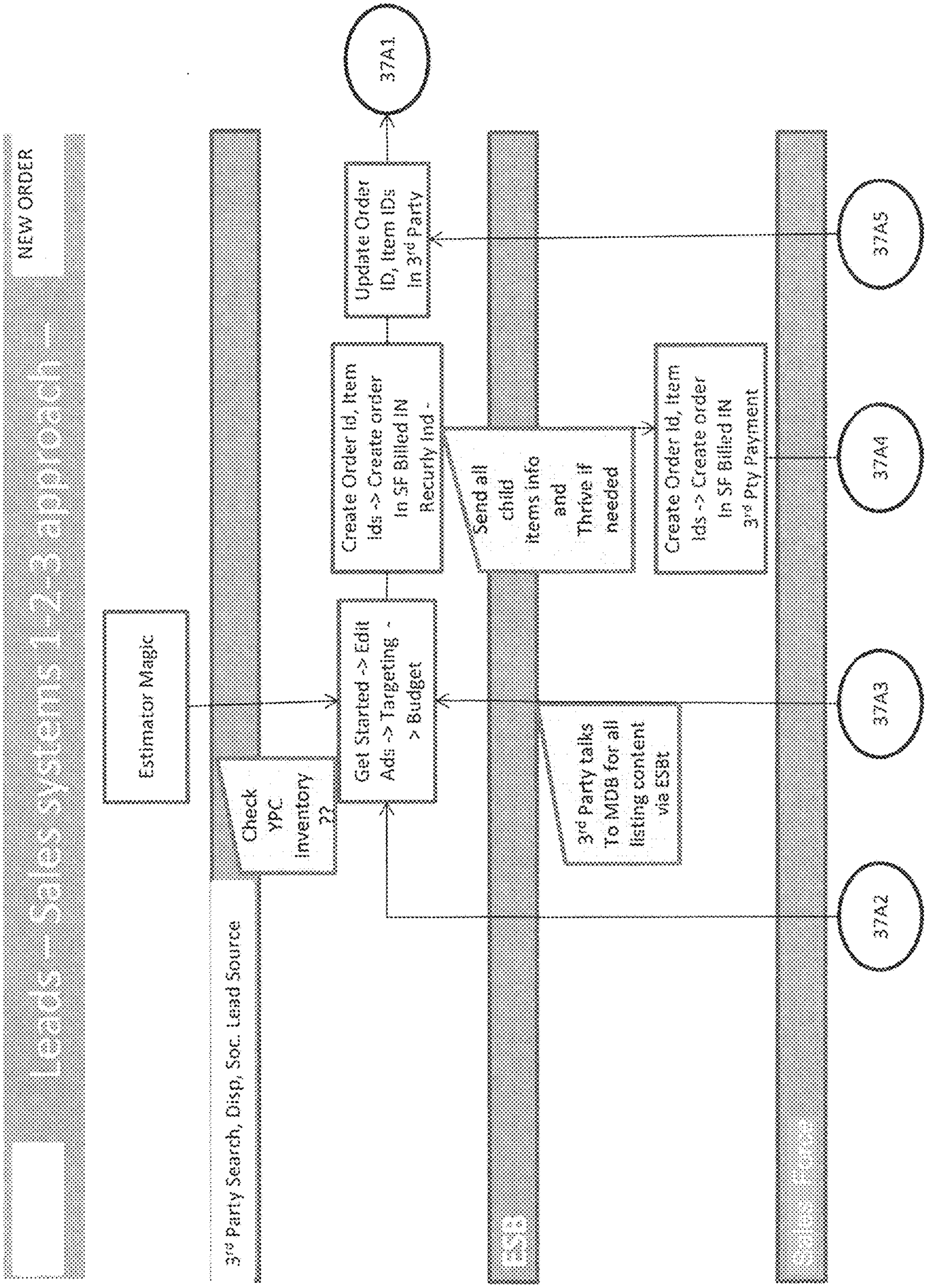
FIG. 37A thru 37F is an illustration of the source lead sales systems flow.
Figure 37B:
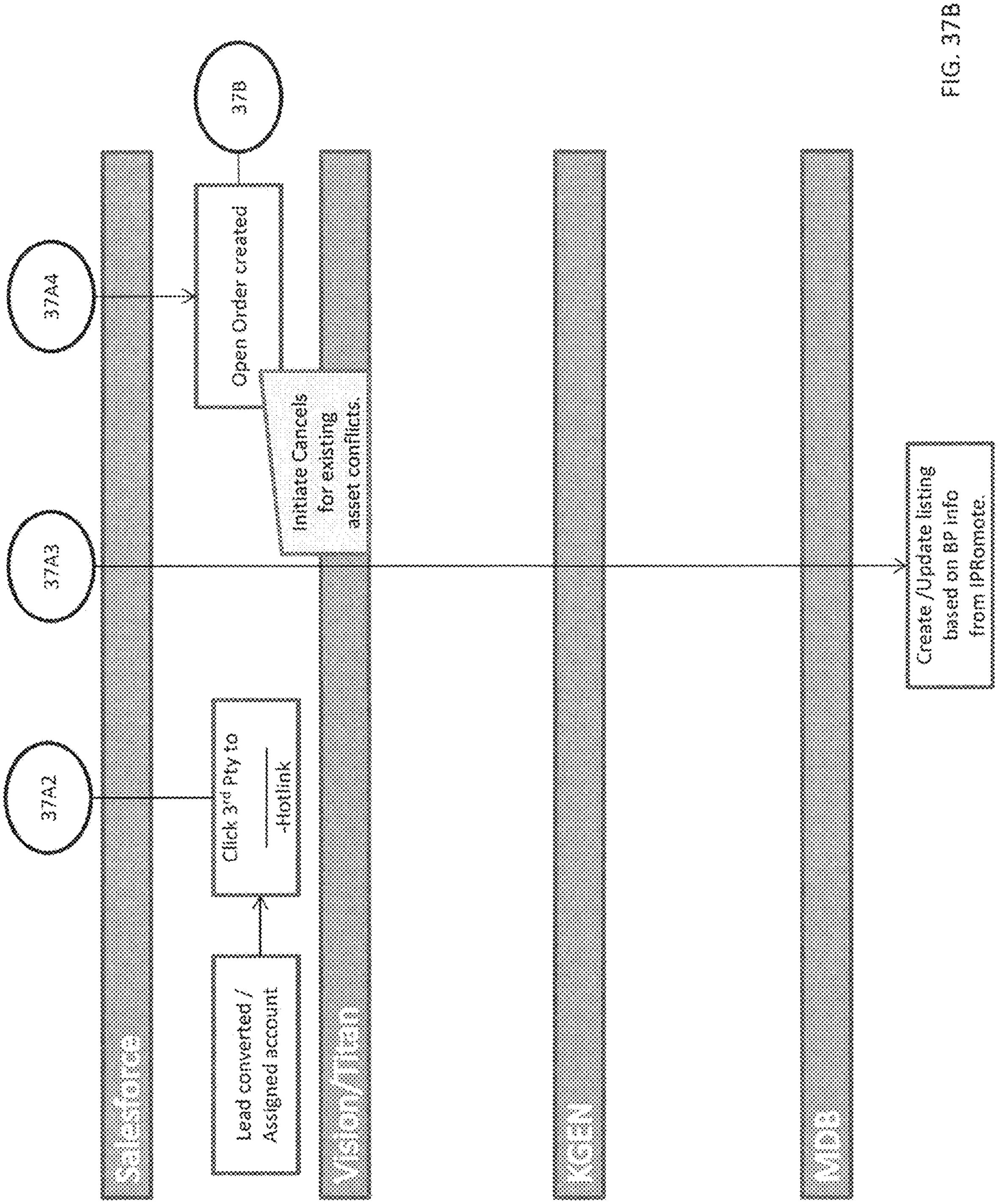
Figure 37C:
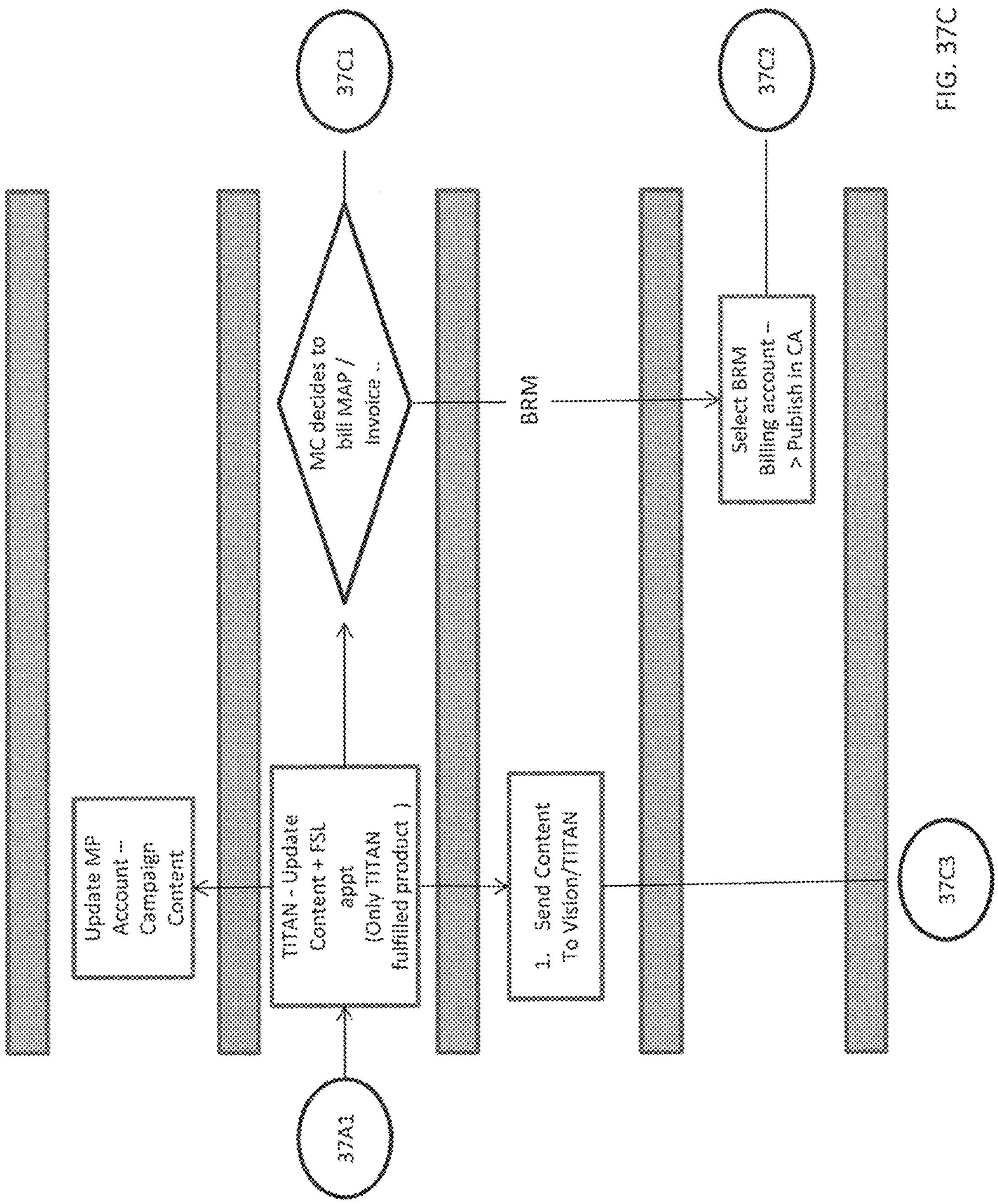
Figure 37D:
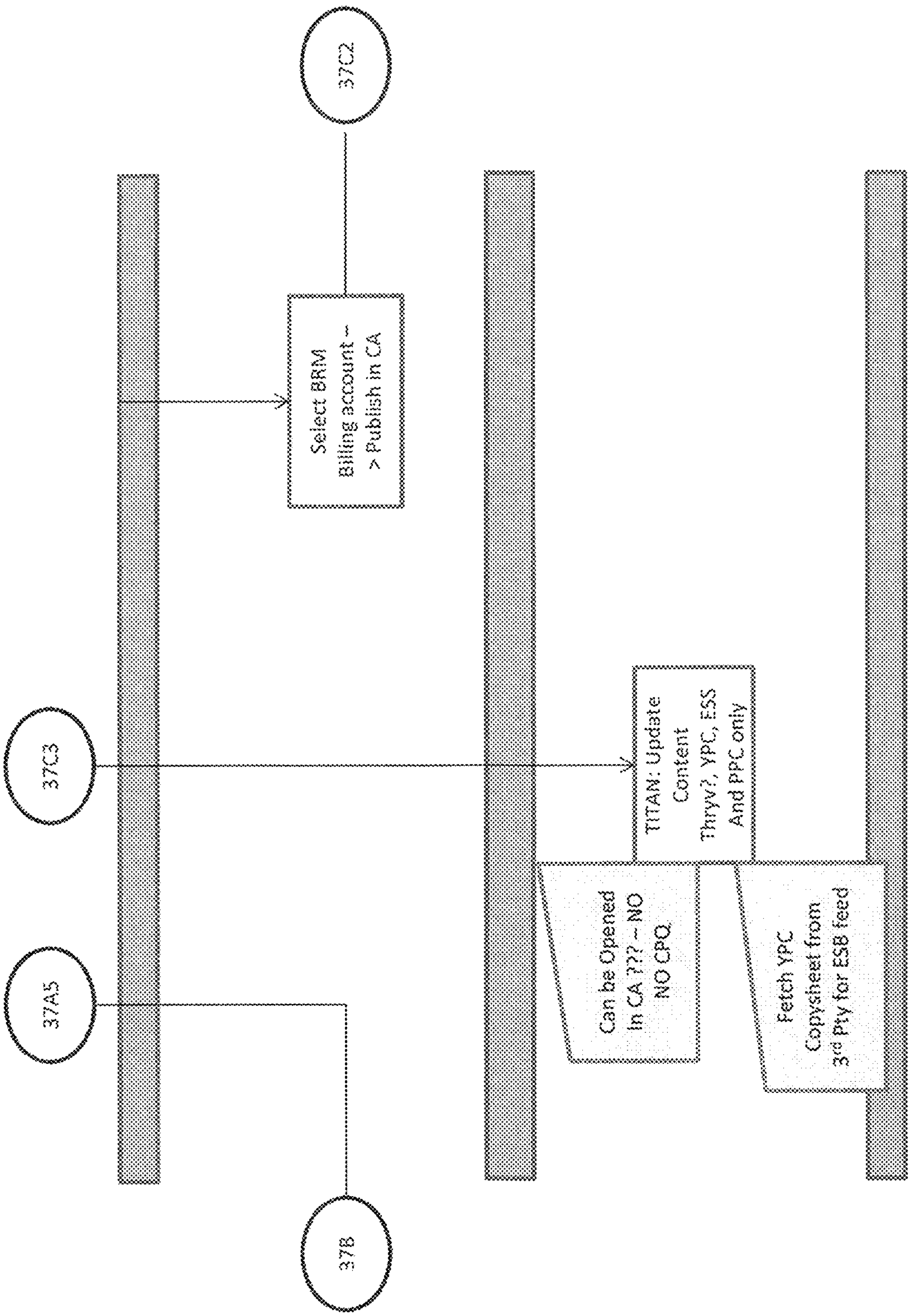
Figure 37E:
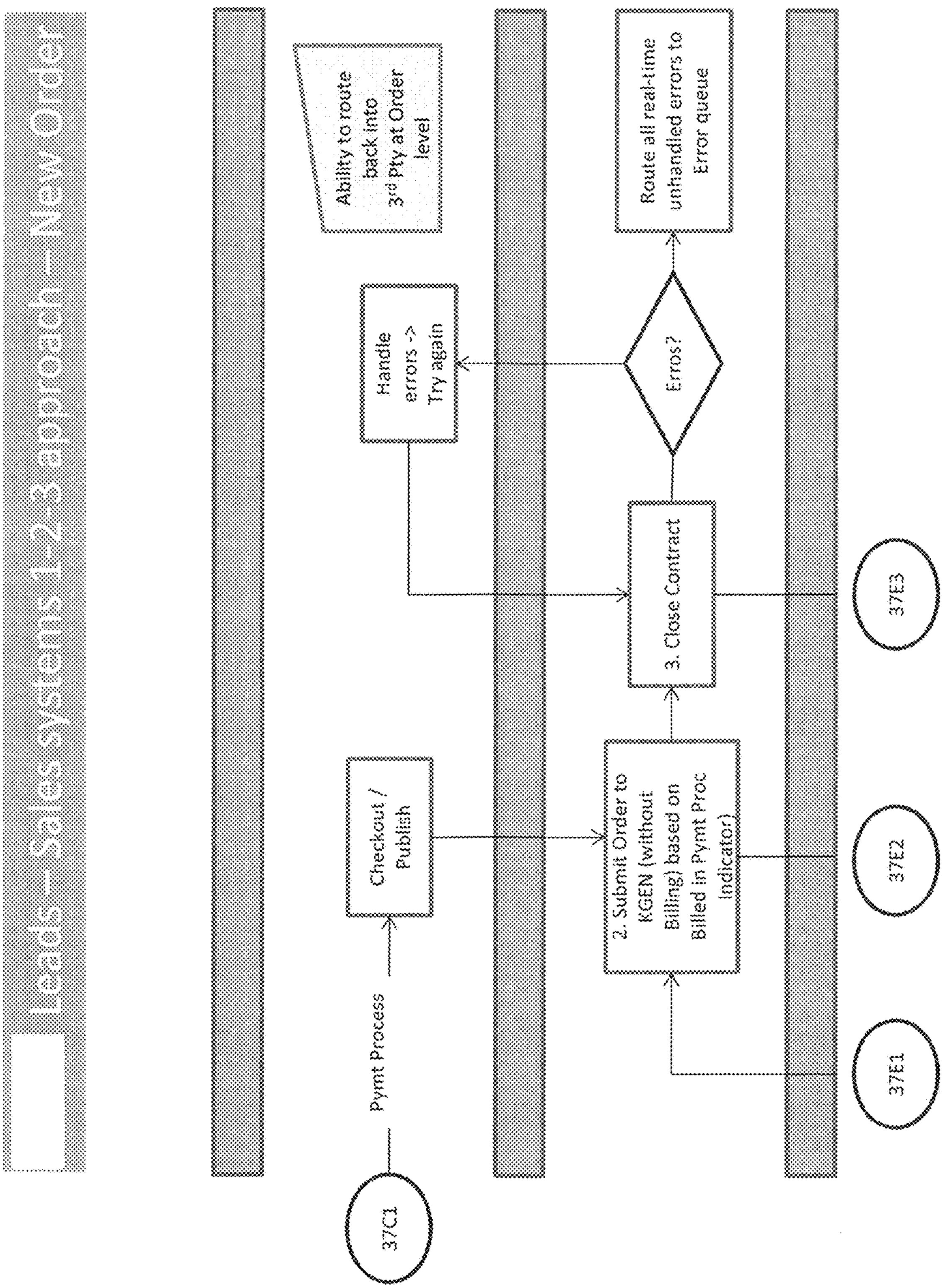
Figure 37F:
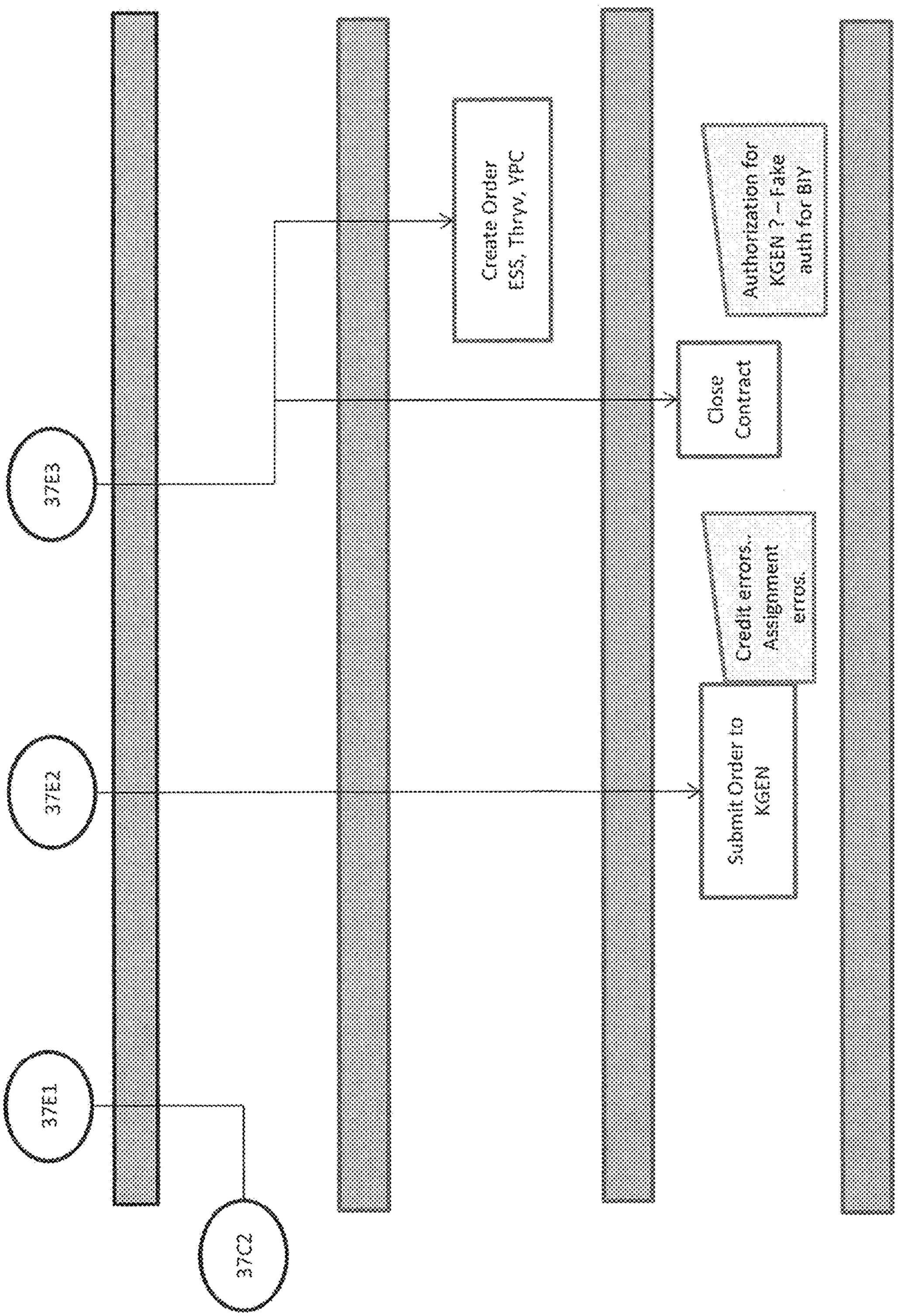
Figure 38A:
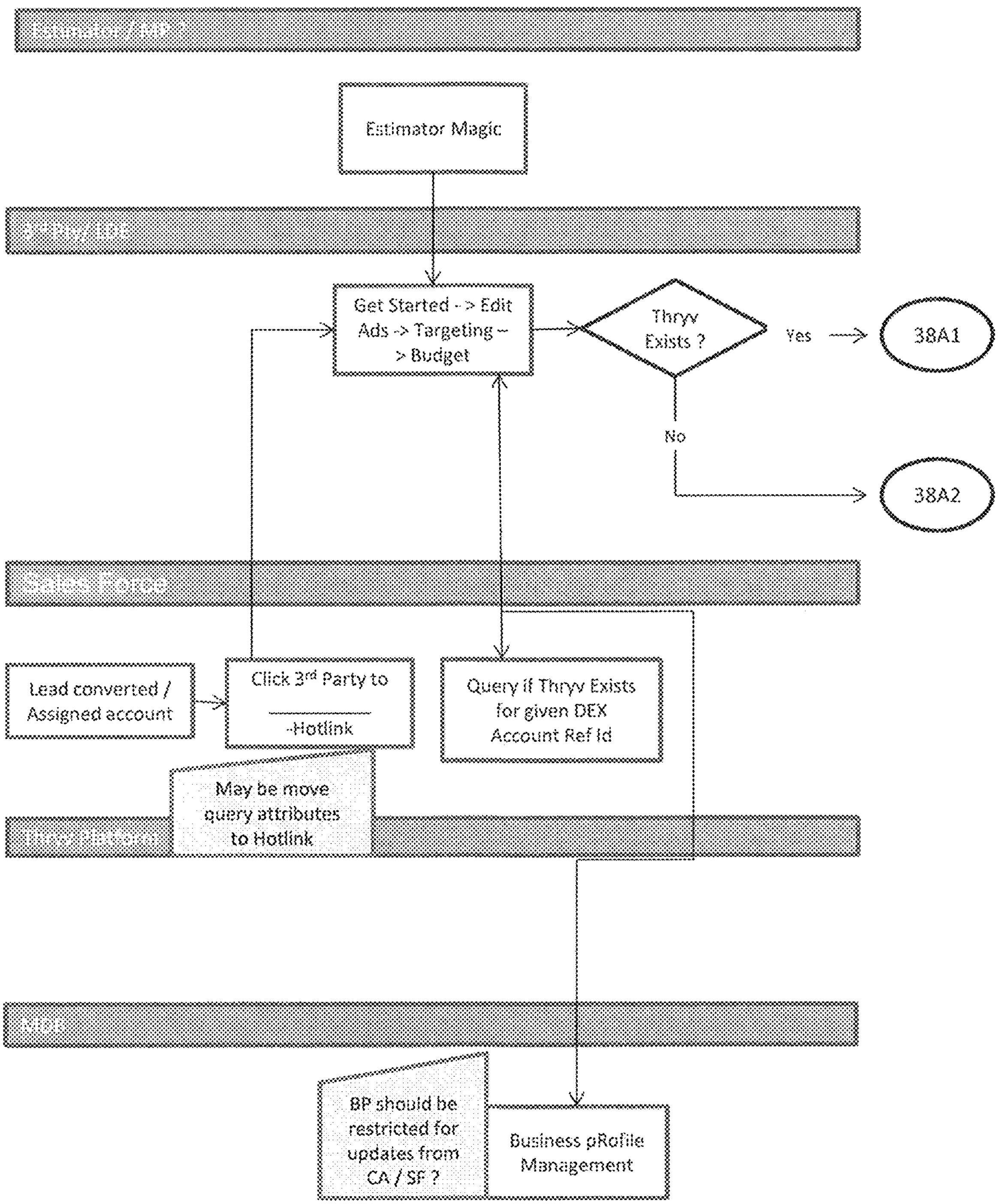
FIG. 38A thru 38B is an illustration of the estimator flow.
Figure 38B:
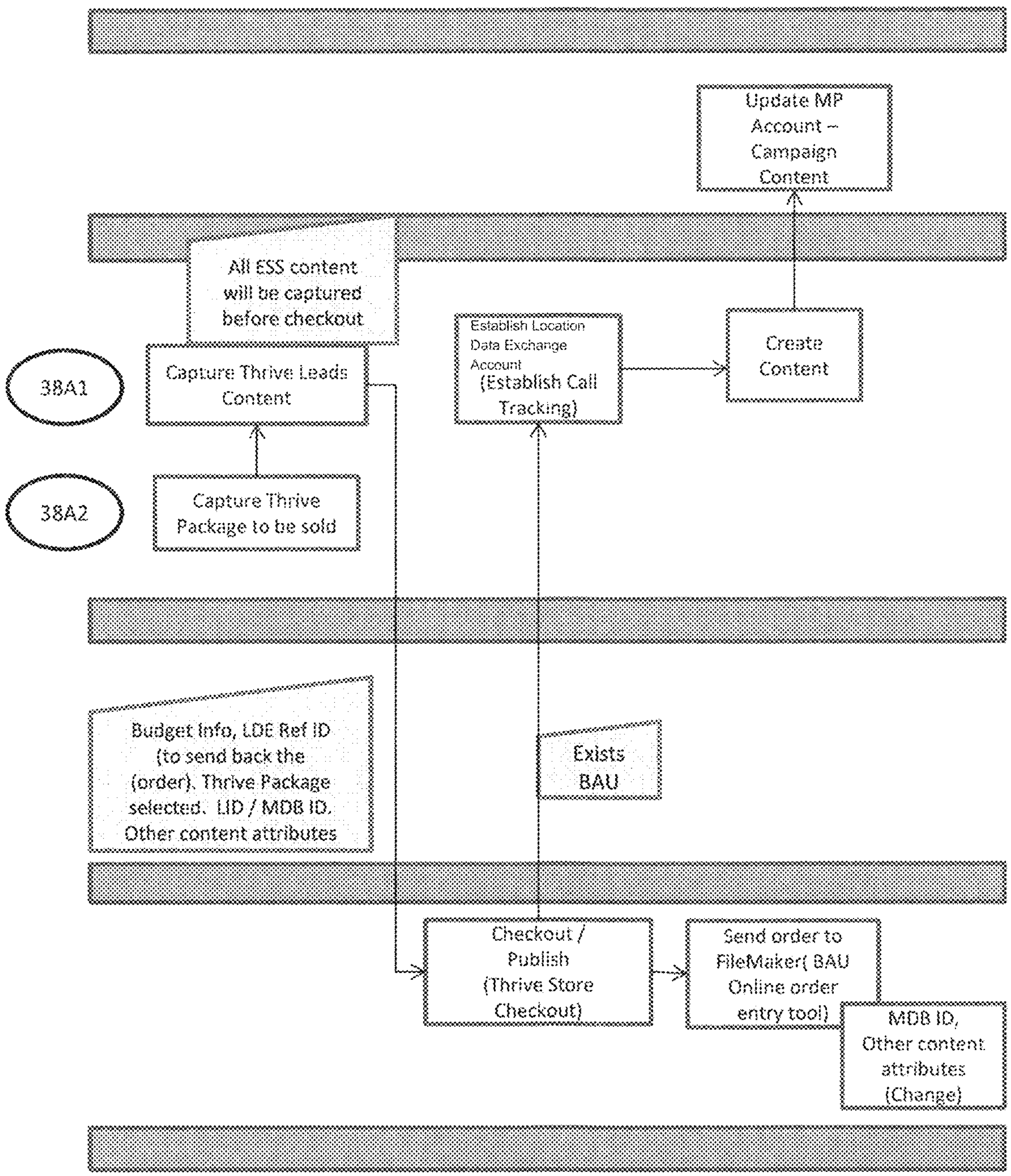
Figure 44A:
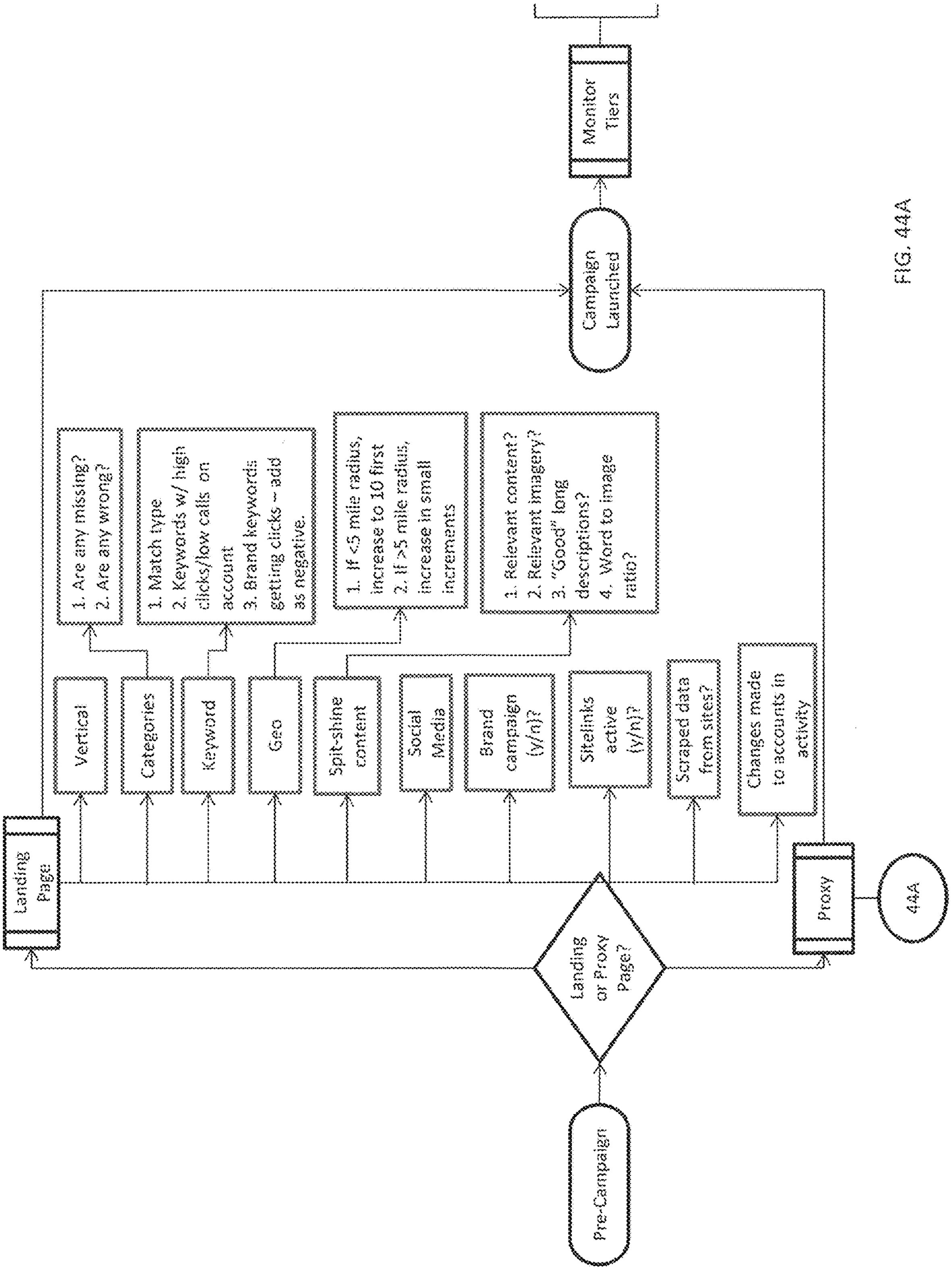
FIG. 44A thru 44C is an illustration of a workflow for optimizing search engine marketing (SEM) accounts.
Figure 44B:
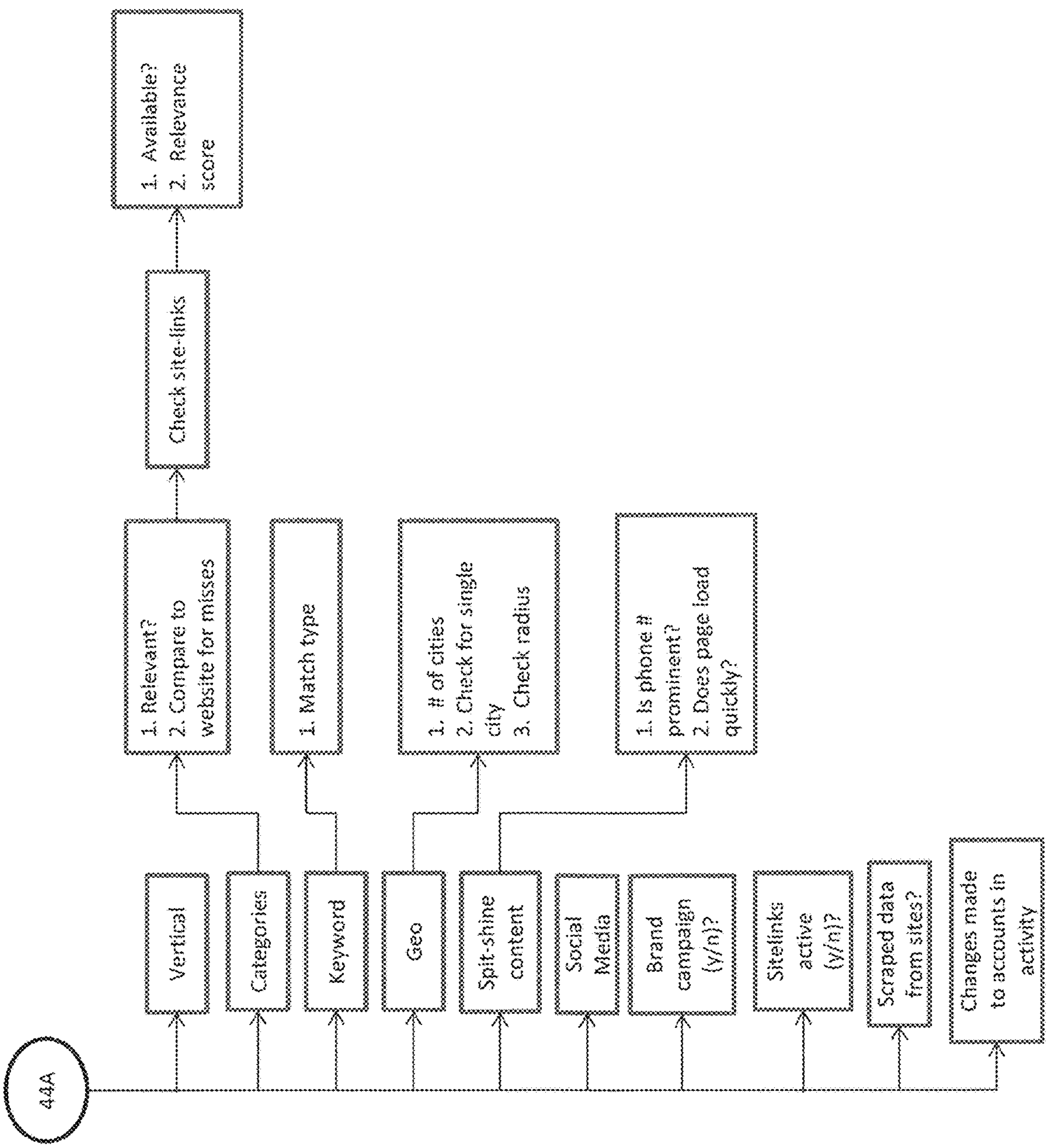
Figure 44C:
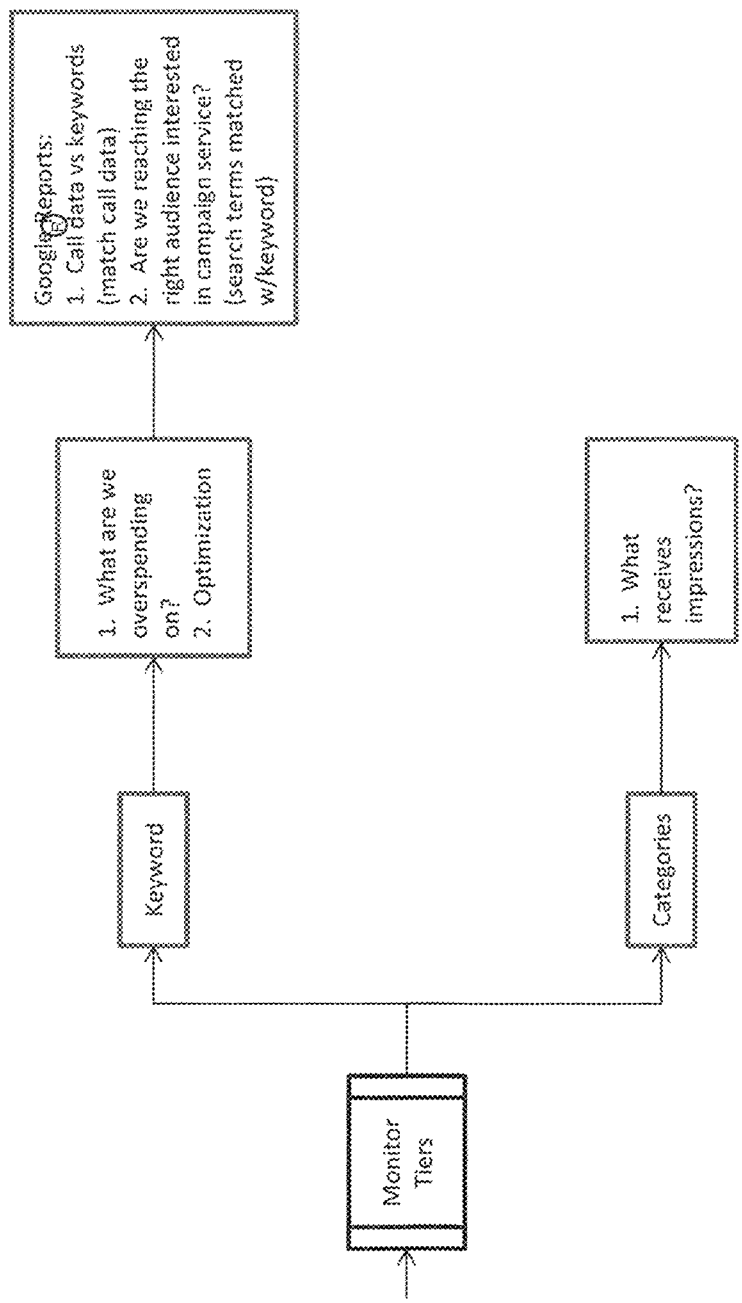

Referring to FIGS. 33A thru 33B, an illustration of the ESB and Merchant level lead source functional flow is provided. Referring to FIGS. 34A thru 34B an illustration of the fulfillment flow at the sales force level is provided. Referring to FIGS. 35A thru 351, an illustration of the post order process and fulfillment flow for both internal enterprise server system network functions and external 3rd party sever system network functions. Referring to FIGS. 36A thru 36F, an illustration of pre-order process flow is provided. Referring to FIGS. 37A thru 37F, an illustration of the source lead sales systems flow is provided. Referring to FIGS. 38A thru 38B, an illustration of the estimator flow is provided. Referring to FIGS. 44A thru 44C an illustration of a workflow for optimizing search engine marketing (SEM) accounts is provided.

Figure 39:
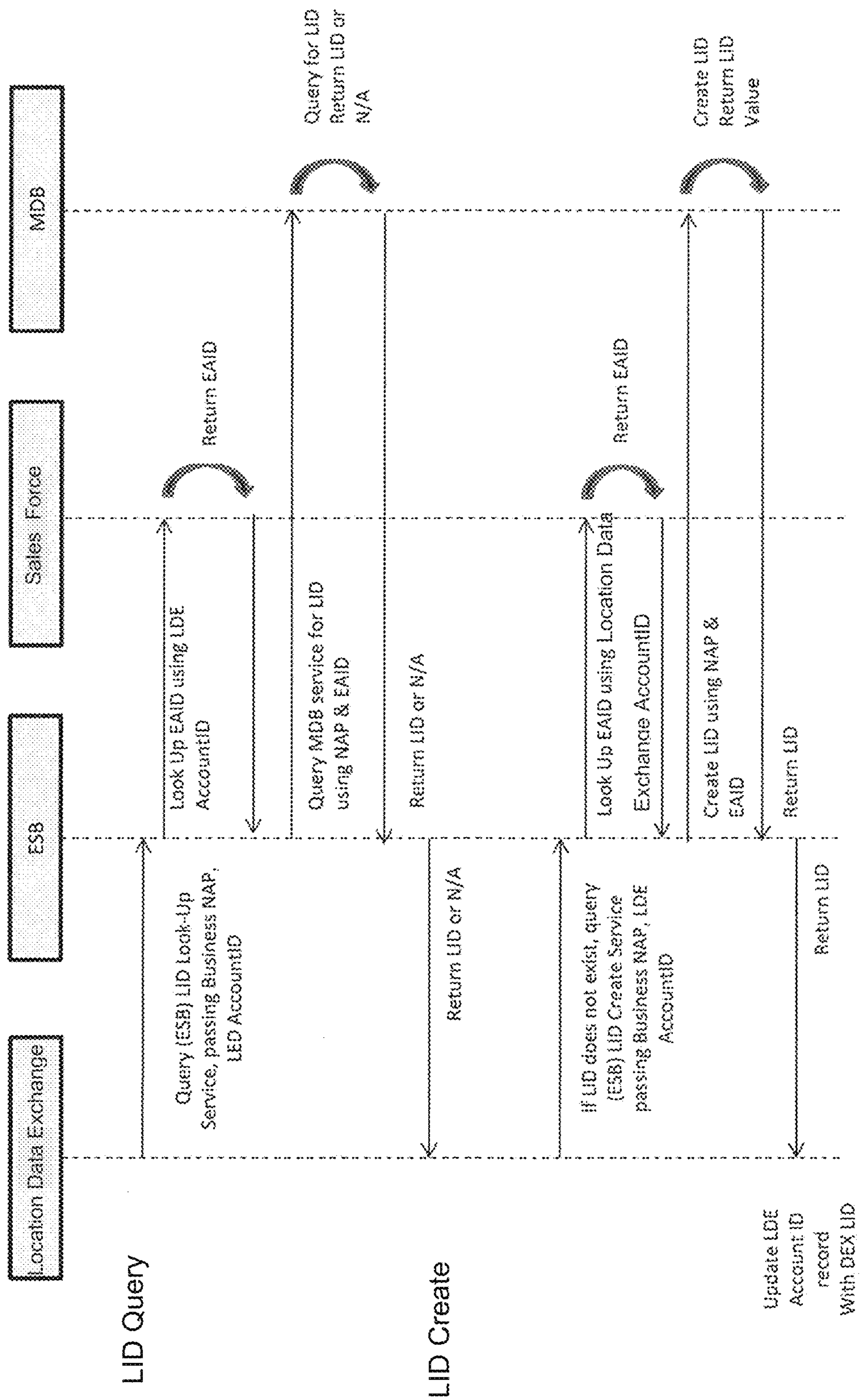
FIG. 39 is an illustration of system interfaces.
Figure 42:
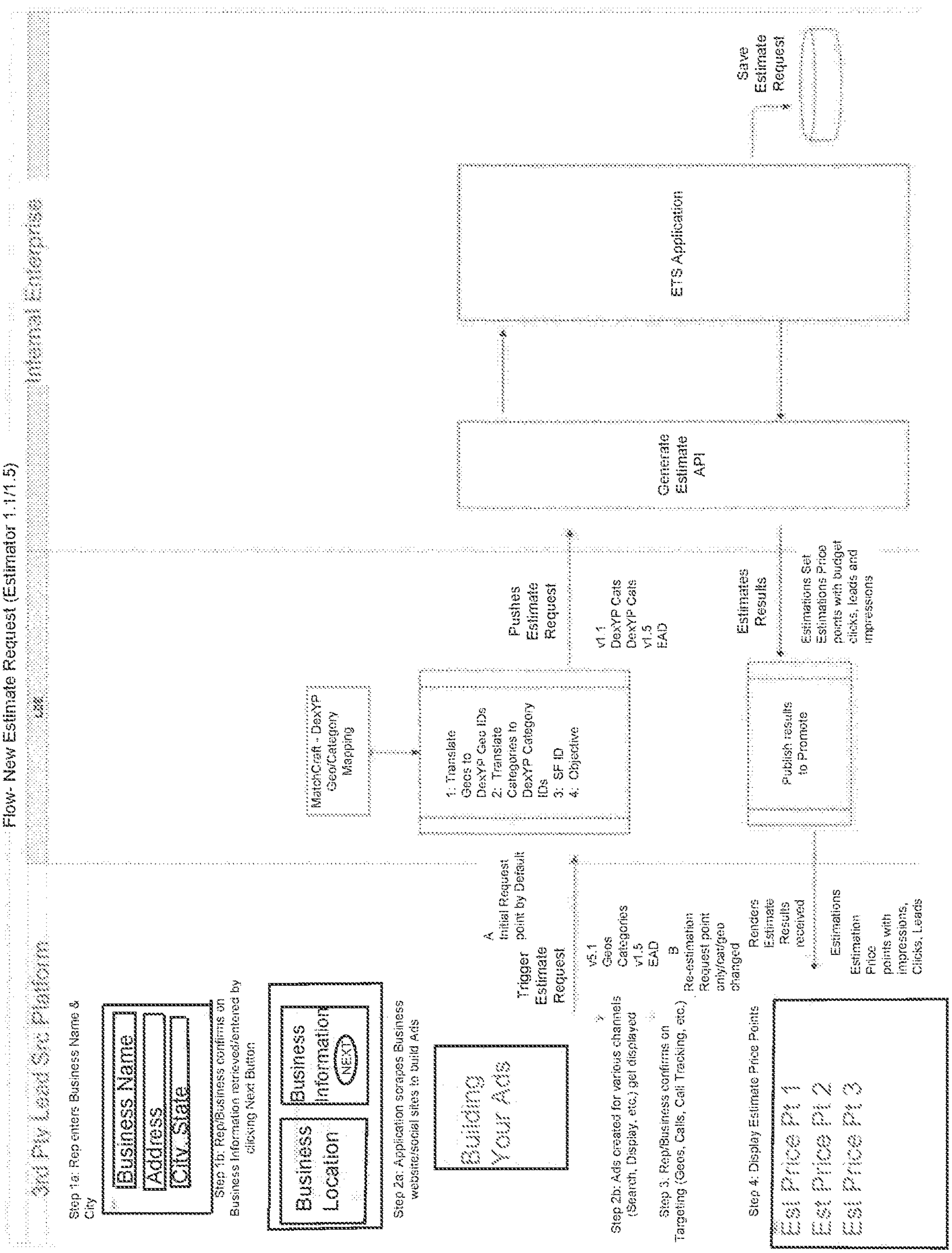
FIG. 42 is an illustration of the local data exchange interface.
Figure 43:
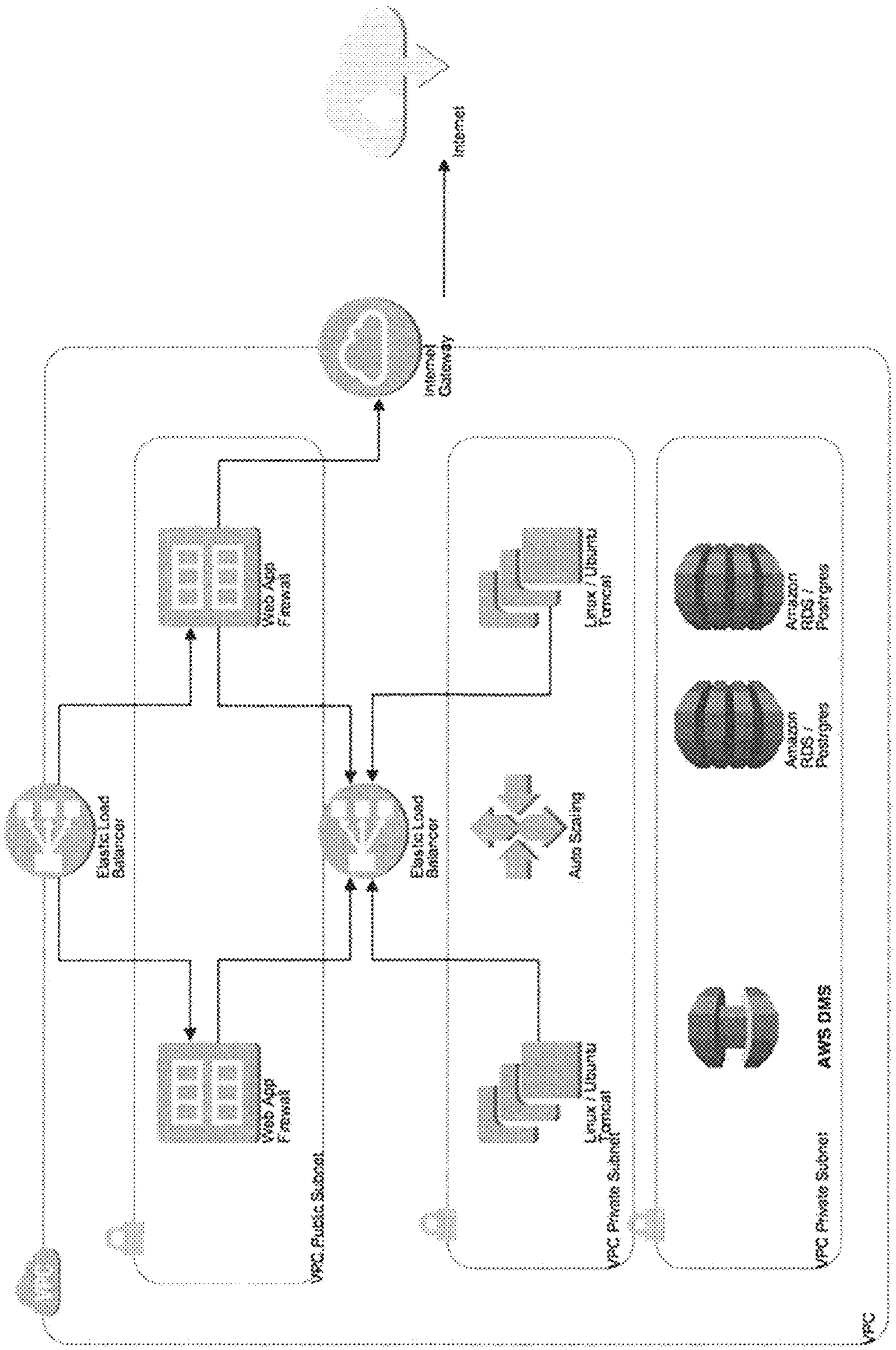
FIG. 43 is an illustration of the enterprise platform.

Referring to FIG. 39, an illustration of system interfaces is provided. Referring to FIG. 42, an illustration of the local data exchange interface between the external 3rd party lead source platform and the internal enterprise server system network customer management and customer retention platform. Referring to FIG. 43, an illustration of the enterprise platform is provided.

Figure 40A:
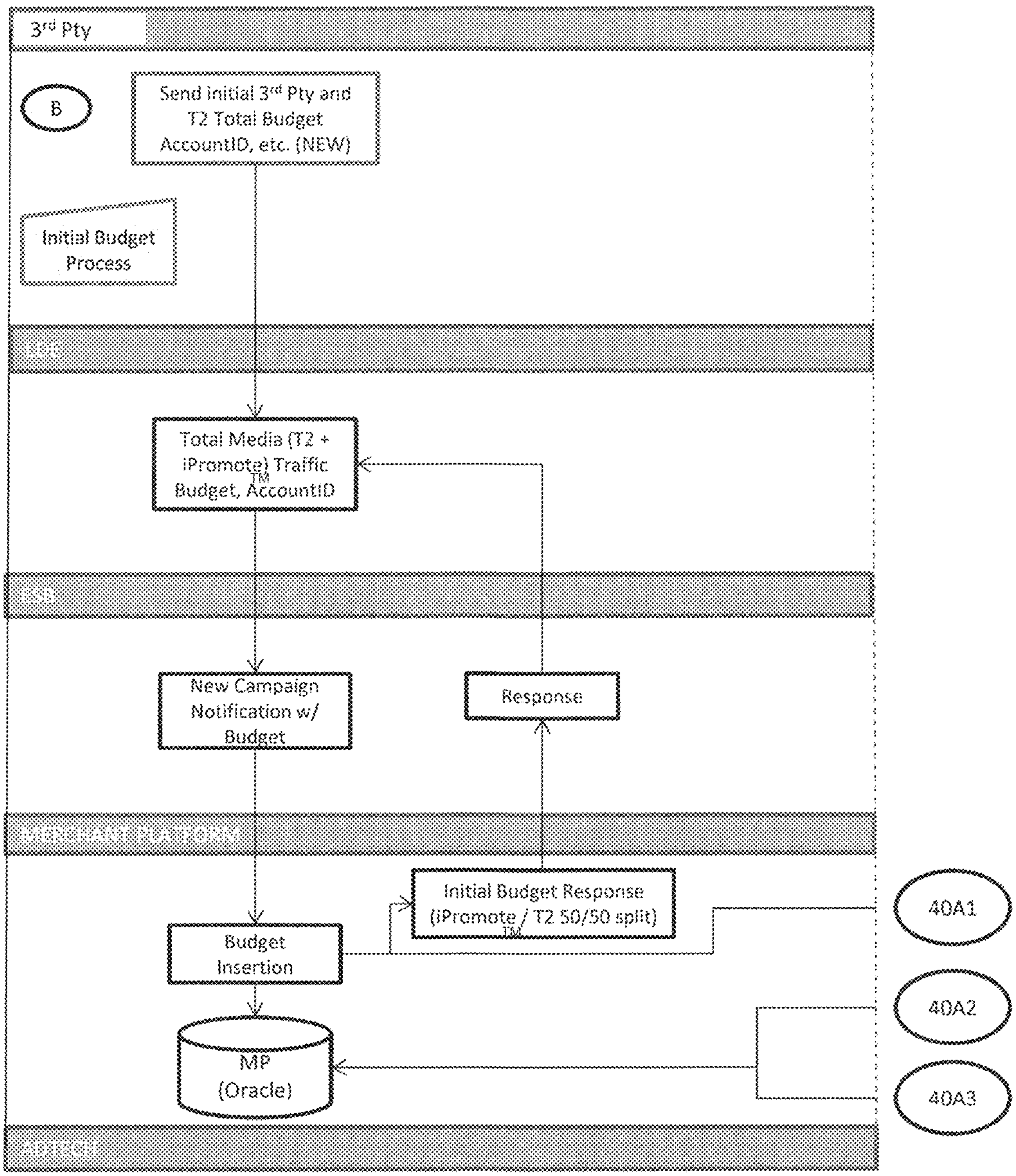
FIG. 40A thru 40C is an illustration of a budget management process flow.
Figure 40B:
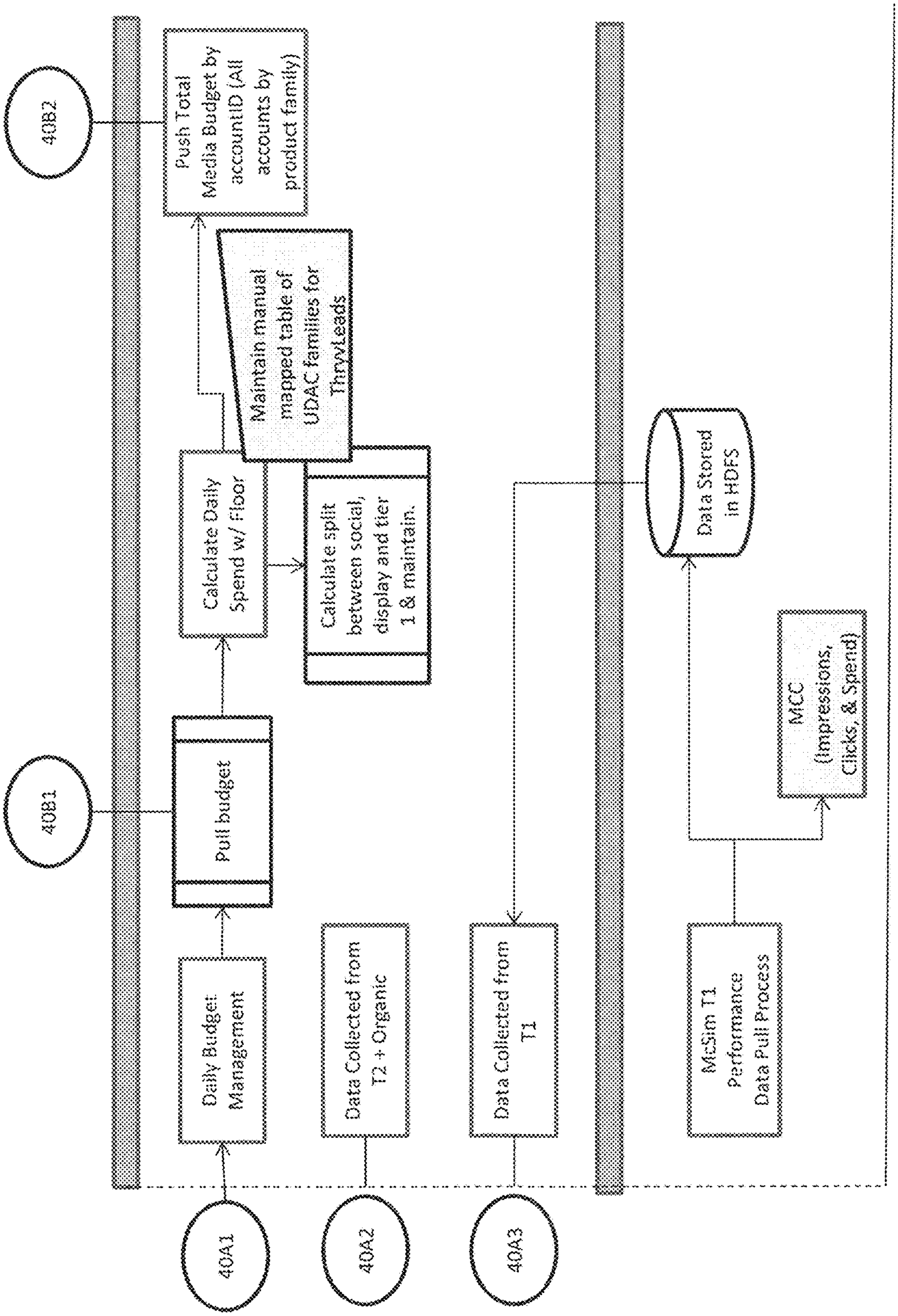
Figure 40C:
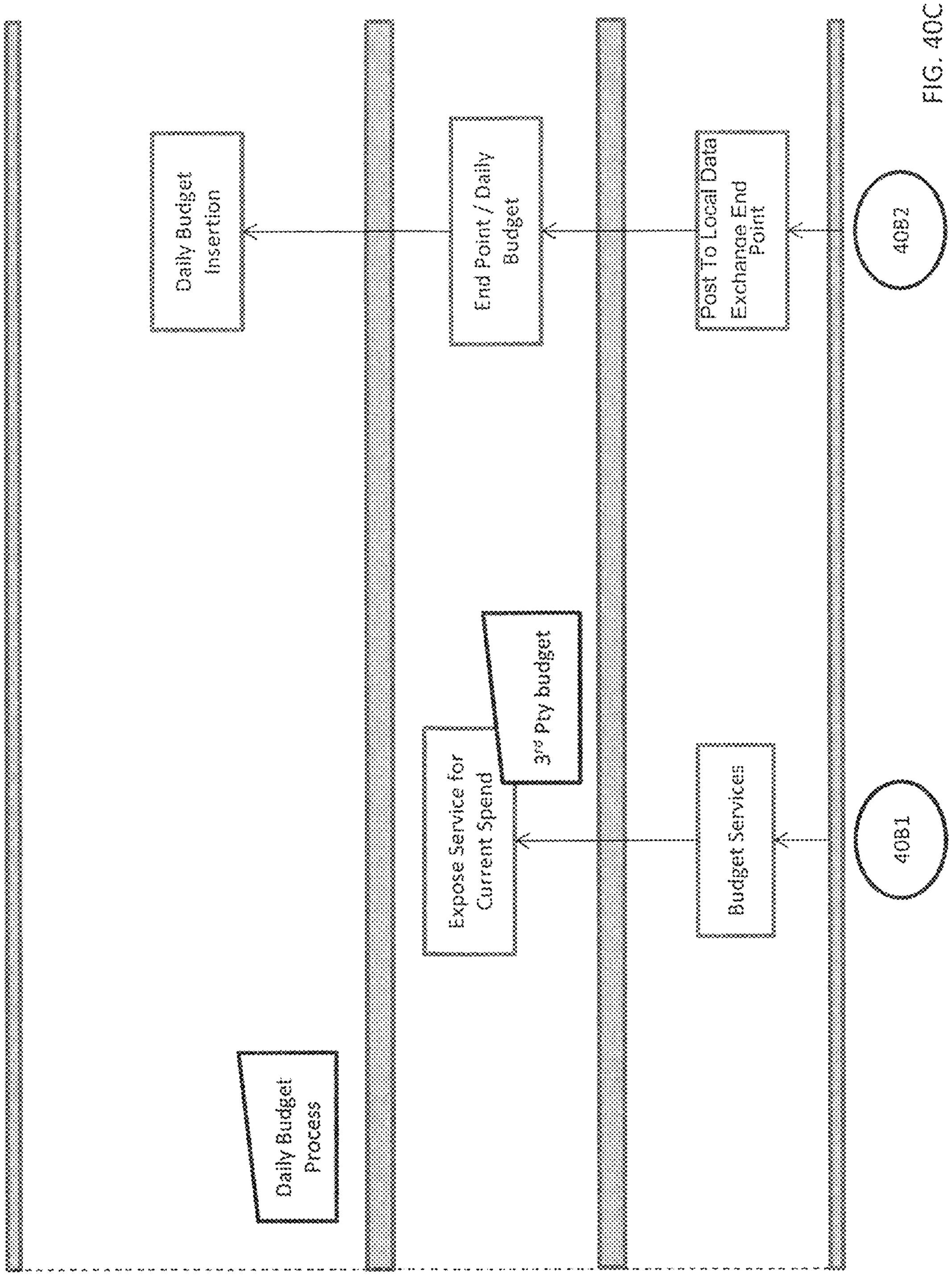
Figure 41A:
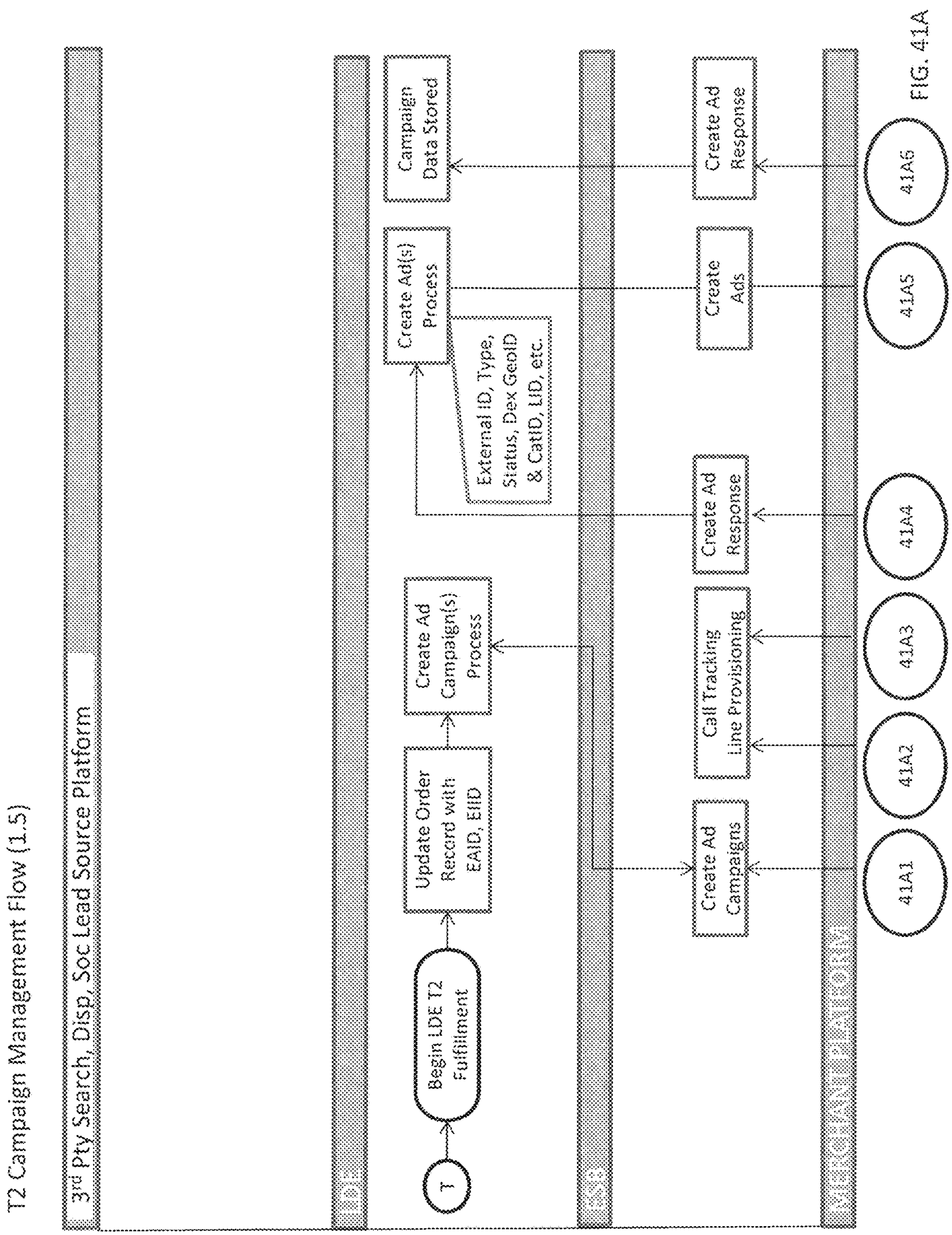
FIG. 41A thru 41C is an illustration of a campaign management flow.
Figure 41B:
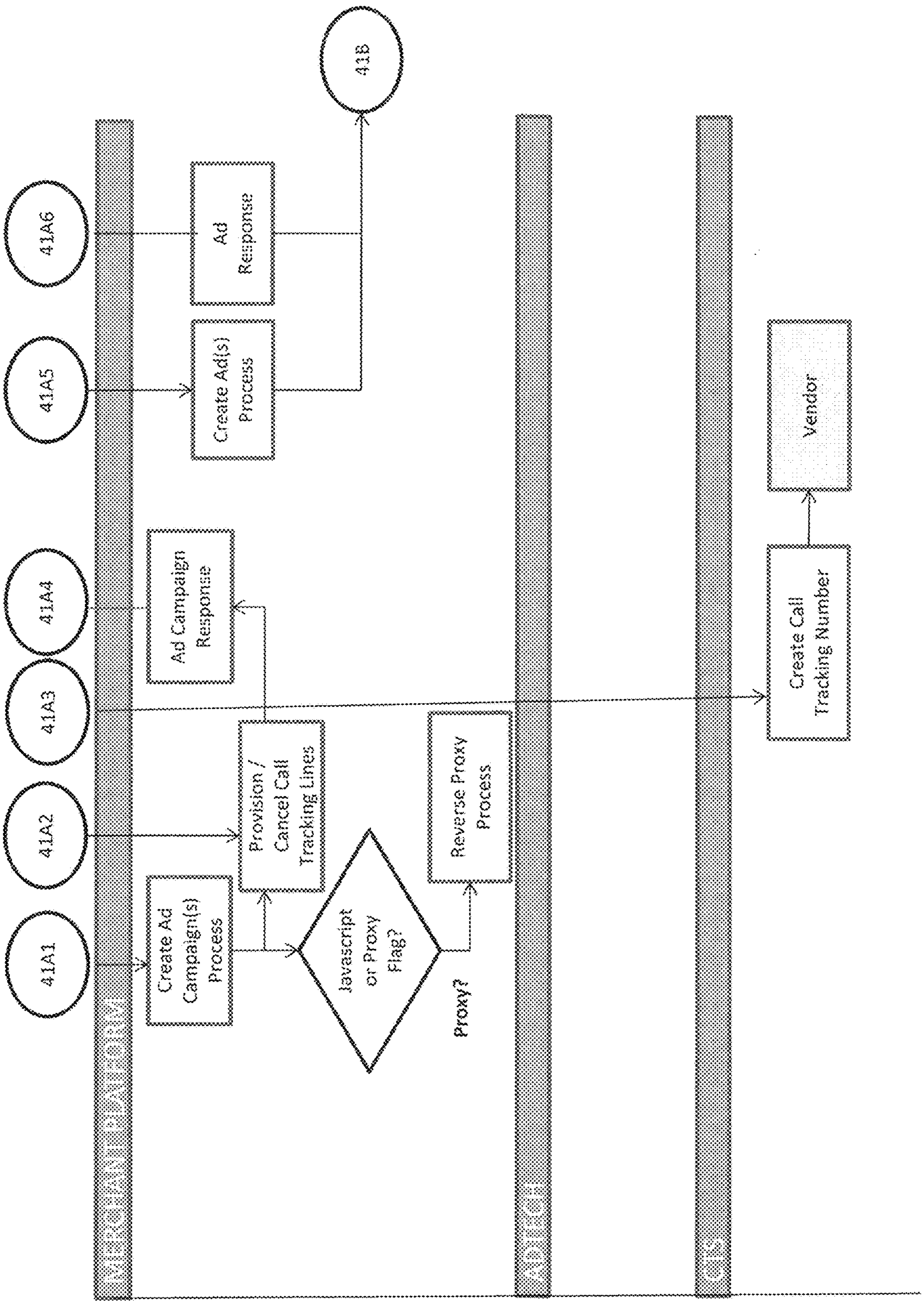
Figure 41C:
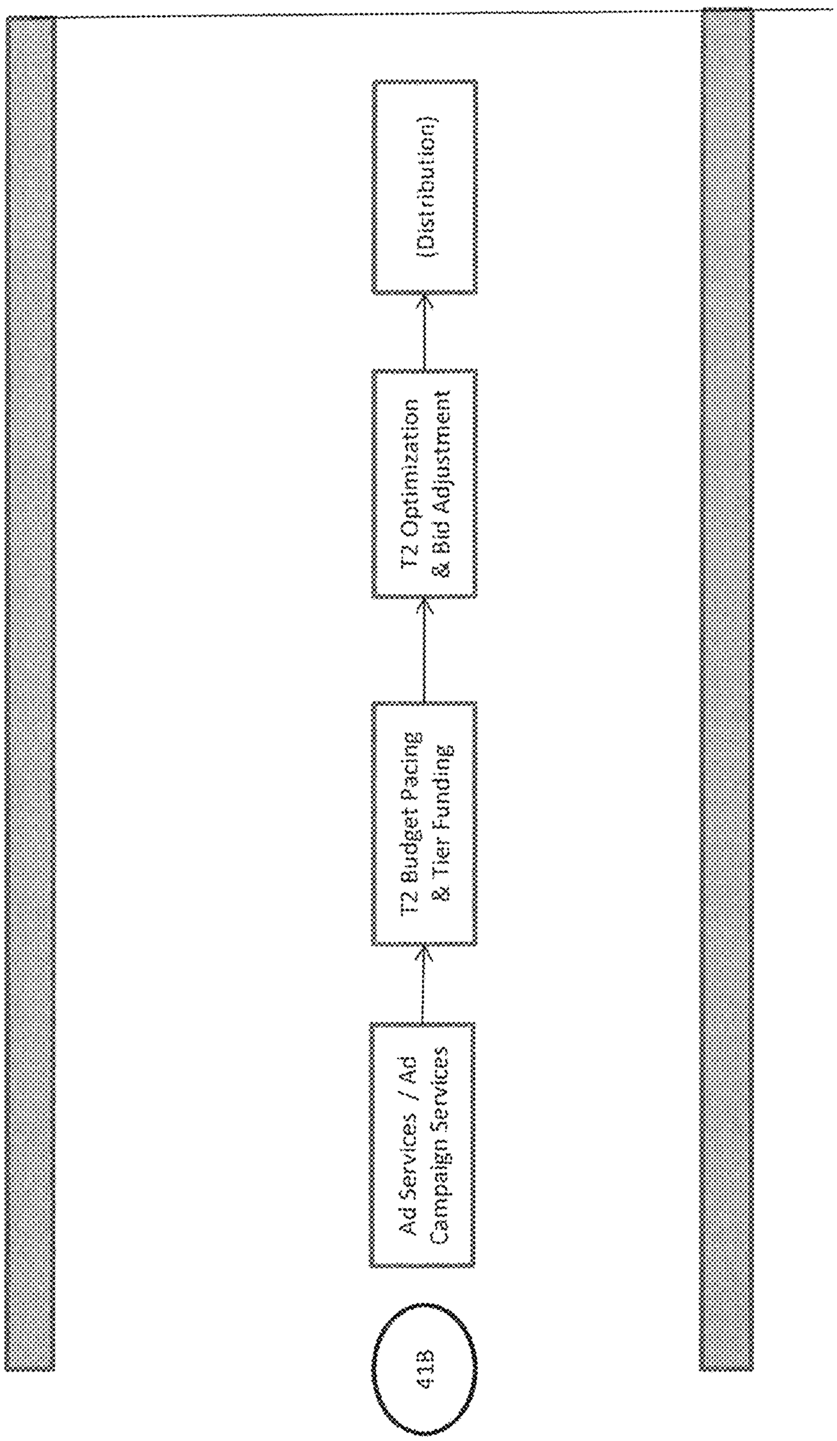

Referring to FIGS. 40A thru 40C, an illustration of a budget management process flow is provided, where a daily budget update is provided. Referring to FIGS. 41A thru 41C, an illustration of a Tier 2 campaign management flow is provided.

Certain systems, apparatus, applications or processes are described herein as including a number of modules or functions or tools. A module, function and/or tool may be a unit of distinct functionality that may be presented in software, hardware, or combinations thereof. When the functionality of a module is performed in any part through software, the module includes a computer-readable medium. The modules may be regarded as being communicatively coupled, whether over a wide area network, local area network, data bus structure or otherwise. The inventive subject matter may be represented in a variety of different implementations of which there are many possible permutations.

The methods and systems described herein do not have to be executed in the order or combinations described, or in any particular order or combination. Moreover, various activities described with respect to the methods identified herein can be executed in serial or parallel fashion. In the foregoing Detailed Description, it can be seen that various features are grouped together in a single embodiment and/or implementation for the purpose of streamlining the disclosure. This method of disclosure is not to be interpreted as reflecting an intention that the claimed embodiments or implementations require more features than are expressly recited in each claim. Rather, as the following claims reflect, inventive subject matter may lie in less than all features of a single disclosed embodiment or implementation. Thus, the following claims are hereby incorporated into the Detailed Description, with each claim standing on its own as a separate embodiment.

In an example implementation, the machine, module, function and/or system operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, smart phone, tablet, laptop, a web appliance, a network router, switch or bridge, or any machine capable of executing a set of instructions (sequential or otherwise) that specify actions to be taken by that machine or computing device. Further, while only a single machine is illustrated, the term "machine", function, module, and/or system shall also be taken to include any collection of machines that individually or jointly execute a set (or multiple sets) of instructions to perform any one or more of the methodologies or embody the systems discussed herein.

The example computer system and client computers can include a processor (e.g., a central processing unit (CPU) a graphics processing unit (GPU) or both), a main memory and a static memory, which communicate with each other via a bus. The computer system may further include a video/graphical display unit (e.g., a liquid crystal display (LCD) or a cathode ray tube (CRT)). The computer system and client computing devices can also include an alphanumeric input device (e.g., a keyboard), a cursor control device (e.g., a mouse), a drive unit, a signal generation device (e.g., a speaker) and a network interface device. The computer system may provide a graphical user interface and includes a desktop environment.

The drive unit includes a computer-readable medium on which is stored one or more sets of instructions (e.g., software) embodying any one or more of the methodologies or systems described herein. The software may also reside, completely or at least partially, within the main memory and/or within the processor during execution thereof by the computer system, the main memory and the processor also constituting computer-readable media. The software may further be transmitted or received over a network via the network interface device.

The term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing or encoding a set of instructions for execution by the machine and that cause the machine to perform any one or more of the methodologies of the present implementation. The term "computer-readable medium" shall accordingly be taken to include, but not be limited to, solid-state memories, and optical media, and magnetic media.

The various implementations and examples shown above illustrate a method and system for a fully integrated business management platform that is comprised on individual components that collectively provide a consistent end user experience. A user of the present method and system may choose any of the above implementations, or an equivalent thereof, depending upon the desired application. In this regard, it is recognized that various forms of the subject method and system could be utilized without departing from the scope of the present technology and various implementations as disclosed.

As is evident from the foregoing description, certain aspects of the present implementation are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the and scope of the present implementation(s). Accordingly, the specification and drawings are to be regarded in an illustrative rather than a restrictive sense.

Other aspects, objects and advantages of the present technology as disclosed can be obtained from a study of the drawings, the disclosure and the appended claims.

What is claimed is:

1. An online marketing/advertisement campaign on a customer relationship and customer retention platform comprising:

one or more communicably coupled integrated in network servers communicably coupled to one or more third party servers by a wide area network, where the integrated in network servers are processing a customer management platform generating in network lead sources and said third party servers are processing one or more marketing platforms generating external lead sources, said marketing platforms including one or more display ad channels, search channels and social channels;

said customer management platform processing on the integrated in network servers and having integrated in network lead source channels and third party lead source channels communicably coupled to an estimator/allocator server function processing on the integrated in network servers and providing estimation, allocation and optimization of lead source budgets;

said customer management platform having a customer relationship management server function processing on the integrated in network servers and communicably coupled to the estimator/allocator server function and thereby said customer relationship management server function receiving lead estimate and optimized allocated lead source data from the estimator/allocator server function; and said customer relationship management server function providing customer retention and customer management including transmitting lead estimations and optimized allocations of lead source budget campaigns, and transmitting campaign payment processing to an integrated sales force user interface tool, where the optimized allocations of lead source budget campaigns utilizes and integrates a combination of the integrated in network lead source channels and third party lead source channels optimized for a lead source budget spend, and transmitting the optimized allocation to and displaying with the integrated sales force user interface tool.

2. The online marketing/advertisement campaign on a customer relationship and customer retention platform as recited in claim 1, where the estimator/allocator server function is communicably coupled through a translation application interface and a data exchange to the third party lead source channels, whereby the estimator/allocator server function controls the translation application interface and data exchange to add and remove the communicable coupling with third party lead source channels based on performance.

3. The online marketing/advertisement campaign on a customer relationship and customer retention platform as recited in claim 2, where said estimator/allocator server function receives and utilizes optimization results provided by the third party lead source channels and further performs secondary optimizations based on in network lead source channels when deriving the estimated and optimized allocated lead source data for a mix of in network and third party lead source channels.

4. The online marketing/advertisement campaign on a customer relationship and customer retention platform as recited in claim 3, where the customer relationship management server function utilizes the estimated and optimized allocated lead source data to develop and managed search bid/budget, display ads, directories and social media marketing campaigns for businesses through the integrated sales force user interface tool.

5. The online marketing/advertisement campaign on a customer relationship and customer retention platform as recited in claim 2, where the integrated sales force user interface tool includes a front end sales basing component that presents a display page including display fields illustrating campaign packages for customer and customer sales force representative viewing and user interactive display fields providing campaign selectivity, where the integrated sales force user interface tool is provided on one or more of a mobile computing device and a desktop computing device.

6. The online marketing/advertisement campaign on a customer relationship and customer retention platform as recited in claim 5, where the user interactive display fields provide campaign ordering and payment processing selectivity.

7. The online marketing/advertisement campaign on a customer relationship and customer retention platform as recited in claim 6, where the customer relationship management server function provides a multiple integration point lead tracking and reporting component that provides lead tracking report data to a drive dashboard function and to an estimator database, where the multiple integration point lead tracking includes one or more of call tracking, email tracking, form fill tracking and appointment tracking, and where the lead multiple integration point lead tracking and reporting component appendages the lead tracking report data to a related lead generated for a customer and providing the appendage lead tracking report data through the drive dash board.

8. The online marketing/advertisement campaign on a customer relationship and customer retention platform as recited in claim 5, where the user interactive display fields provide a user interface slider function that selectively increases or decreases lead estimates/budgets.

9. The online marketing/advertisement campaign on a customer relationship and customer retention platform as recited in claim 5, where the user interactive display fields provide a summary display user interface displaying a main navigation tool bar that provides navigation elements that can be selected for navigation to a different view where the user interface is populated with the appropriately formatted information where the navigation elements displayed include one or more of a selectable Consumer tab, Content tab, Budget tab, Cart and Result tab navigation elements.

10. The online marketing/advertisement campaign on a customer relationship and customer retention platform as recited in claim 9, where the budget tab is selected launching a budget page user interface displaying lead estimate display elements for three levels, Maintain, Grow and Leader, a bottom window displaying estimated lead display elements by category, a return on investment display element, a campaign lead source mix display element, a campaign start display element, and the user interface slider function is a slider button display element for increasing or decreasing overall budget allocation where the slider button display element selectively slides to the right to increase budget.

11. The online marketing/advertisement campaign on a customer relationship and customer retention platform as recited in claim 10, where the campaign lead source mix display element is selected redirecting the display page to a payment processing site where the payment is processed, and where the campaign start display element is selected once the payment is processed, and where the estimator/allocator server function initiates a campaign fulfillment process with the third party and in network lead source channels and initiates performance tracking, analysis of performance data and a learning function.

12. The online marketing/advertisement campaign on a customer relationship and customer retention platform as recited in claim 2, where the customer relationship management server function provides a scheduling component, where said scheduling component automatically distributes hyperlinks across online listing sites to collect appointments real time and automatically schedules display ad content.

13. A method for online marketing/advertisement campaign on a customer relationship and customer retention platform comprising:

communicably coupling one or more integrated in network servers and further communicably coupling to one or more third party servers via a wide area network, and processing a customer management platform on the integrated in network servers thereby generating in network lead sources and processing one or more marketing platforms on said third party servers and thereby generating external lead sources, said marketing platforms including one or more display ad channels, search channels and social channels;

integrating the customer management platform processing on the integrated in network services with in network lead source channels and third party lead source channels by communicably coupling the in network and third party lead source channels with an in network estimator/allocator server function processing on the integrated network servers thereby providing estimating, allocating and optimizing of lead source budgets;

communicably coupling a customer relationship management server function of said customer management platform to the estimator/allocator server function and thereby receiving lead estimate and optimized allocated lead source data from the estimator/allocator server function; and providing customer retention and customer management with said customer relationship management server function including transmitting lead estimations and optimized allocations of lead source budget campaigns, and transmitting campaign payment processing to an integrated sales force user interface tool, where the optimized allocations of lead source budget campaigns utilizes and integrates a combination of in network lead source channels and third party lead source channels optimized for a lead source budget spend, and transmitting the optimized allocation to and displaying on the integrated sales force user interface tool.

14. The method for online marketing/advertisement campaign on a customer relationship and customer retention platform as recited in claim 13, comprising:

communicably coupling the estimator/allocator server function through a translation application interface and a data exchange to the third party lead source channels, whereby the estimator/allocator server function is controlling the translation application interface and data exchange selectively adding and removing communications with third party lead source channels based on performance.

15. The method for online marketing/advertisement campaign on a customer relationship and customer retention platform as recited in claim 14, comprising:

receiving and utilizing optimization results with said estimator/allocator server function as provided by the third party lead source channels and said estimator/allocation server function further performing secondary optimizations based on in network lead source channels when deriving estimated and optimized allocated lead source data for a mix of in network and third party lead source channels.

16. The method for online marketing/advertisement campaign on a customer relationship and customer retention platform as recited in claim 15, where the customer relationship management server function utilizes the estimated and optimized allocated lead source data to develop and managed search bid/budget, display ads, directories and social media marketing campaigns for businesses through the integrated sales force user interface tools.

17. The method for online marketing/advertisement campaign on a customer relationship and customer retention platform as recited in claim 14, comprising:

presenting a display page to the integrated sales force user interface tool with a front end sales basing component thereby presenting a display page including display fields illustrating campaign packages for customer and customer sales force representative viewing and user interactive display fields providing campaign selectivity, where the sales force user interface is provided on one or more of a mobile computing device and a desktop computing device.

18. The method for online marketing/advertisement campaign on a customer relationship and customer retention platform as recited in claim 17, where the user interactive display fields provide campaign ordering and payment processing selectivity.

19. The method for online marketing/advertisement campaign on a customer relationship and customer retention platform as recited in claim 18, where the customer relationship management server function provides a multiple integration point lead tracking and reporting component thereby providing lead tracking report data to a drive dashboard function and to an estimator database, where the multiple integration point lead tracking includes one or more of call tracking, email tracking, form fill tracking and appointment tracking, and where the multiple integration point lead tracking and reporting component appendages lead tracking report data to a related lead generated for a customer and providing the appendage lead tracking report data through the drive dash board.

20. The method for online marketing/advertisement campaign on a customer relationship and customer retention platform as recited in claim 17, where the user interactive display fields provide a user interface slider function for increasing or decreasing lead estimates/budgets.

21. The method for online marketing/advertisement campaign on a customer relationship and customer retention platform as recited in claim 17, comprising:

providing a summary display user interface with the user interface display fields thereby displaying a main navigation tool bar providing navigation elements that are be selected thereby navigating to a different view where the user interface is populated with the appropriately formatted information where the navigation elements displayed include one or more of a selectable Consumer tab, Content tab, Budget tab, Cart and Result tab navigation elements.

22. The method for online marketing/advertisement campaign on a customer relationship and customer retention platform as recited in claim 21, comprising:

receiving the budget tab selection indication at the user interface resulting in launching a budget page user interface displaying lead estimate display elements for three levels, Maintain, Grow and Leader, a bottom window displaying estimated lead display elements by category, a return on investment display element, a campaign lead source mix display element, a campaign start display element, and where the user interface slider function includes a slider button display element for increasing or decreasing overall budget allocation where the slider button display element selectively slides to the right to increase budget.

23. The method for online marketing/advertisement campaign on a customer relationship and customer retention platform as recited in claim 22, comprising:

receiving the campaign lead source mix display element at the user interface thereby redirecting the display page to a payment processing site where the payment is processed; and selecting the campaign start display element once the payment is processed, and where the estimator/allocator server function initiates a campaign fulfillment process with the third party and in network lead source channels and initiates performance tracking, analysis of performance data and a learning function.

24. The method for online marketing/advertisement campaign on a customer relationship and customer retention platform as recited in claim 14, where the customer relationship management server function provides a scheduling component;

and automatically distributing hyperlinks across online listing sites thereby collecting appointments real time and automatically scheduling display ad content.

* * * * *